(12) United States Patent
Harris

(10) Patent No.: US 12,085,194 B2
(45) Date of Patent: Sep. 10, 2024

(54) SYSTEM AND METHOD FOR PROTECTION OF UNDER-SLAB UTILITIES FROM CHANGES IN SOIL VOLUME

(71) Applicant: Benchmark Harris, Aledo, TX (US)

(72) Inventor: Benchmark Harris, Aledo, TX (US)

( * ) Notice: Subject to any disclaimer, the term of this patent is extended or adjusted under 35 U.S.C. 154(b) by 0 days.

(21) Appl. No.: 17/901,524

(22) Filed: Sep. 1, 2022

(65) Prior Publication Data
US 2023/0091971 A1    Mar. 23, 2023

Related U.S. Application Data

(63) Continuation of application No. 17/512,612, filed on Oct. 27, 2021, now Pat. No. 11,480,267.

(60) Provisional application No. 63/253,515, filed on Oct. 7, 2021, provisional application No. 63/245,835, filed on Sep. 18, 2021.

(51) Int. Cl.
| | |
|---|---|
| *F16L 1/028* | (2006.01) |
| *F16L 1/06* | (2006.01) |
| *F16L 3/14* | (2006.01) |
| *H02G 1/06* | (2006.01) |

(52) U.S. Cl.
CPC .............. *F16L 1/028* (2013.01); *F16L 1/06* (2013.01); *F16L 3/14* (2013.01); *H02G 1/06* (2013.01)

(58) Field of Classification Search
CPC ..... F16L 1/028; F16L 1/06; F16L 3/14; F16L 1/0246; H02G 1/06
See application file for complete search history.

(56) References Cited

U.S. PATENT DOCUMENTS

| | | | | |
|---|---|---|---|---|
| 1,362,245 | A * | 12/1920 | Farley | F16L 3/14 248/58 |
| 1,596,317 | A * | 8/1926 | Skinner | F16L 3/00 248/59 |
| 1,605,996 | A * | 11/1926 | Stewart | F16L 3/14 248/62 |
| 1,701,380 | A * | 2/1929 | Livingston | F16L 3/14 248/58 |
| 1,758,040 | A * | 5/1930 | Hess | F16L 3/14 248/62 |
| 1,804,420 | A * | 5/1931 | Kelley | E04B 9/18 52/351 |
| 1,837,930 | A * | 12/1931 | Waite | F16L 3/00 52/39 |
| 3,298,645 | A * | 1/1967 | Morris | F16L 3/14 411/39 |
| 3,769,190 | A * | 10/1973 | Barnes | F16L 3/2053 204/196.15 |
| 3,769,774 | A * | 11/1973 | Barnes | F16L 3/14 52/39 |
| 4,268,189 | A * | 5/1981 | Good | F16L 1/06 405/172 |
| 4,549,385 | A * | 10/1985 | Cohen | E02D 27/00 52/741.11 |

(Continued)

*Primary Examiner* — Benjamin F Fiorello

(57) ABSTRACT

The present invention relates to a utility support framing system for structurally suspended concrete slab over void form foundation systems. The inventive utility support framing system avoids problems created by expansive soils which damage utility lines under foundation systems. The inventive utility support framing system permits suspending utility pipes within an interior space of the foundation system while avoiding the problems of the prior art.

30 Claims, 24 Drawing Sheets

(56) References Cited

U.S. PATENT DOCUMENTS

| | | | | |
|---|---|---|---|---|
| 5,350,141 | A * | 9/1994 | Perrault | F16B 9/01 248/327 |
| 5,937,609 | A * | 8/1999 | Roth | E04B 1/4157 52/700 |
| 6,017,005 | A * | 1/2000 | Smith | F16L 3/14 248/58 |
| 6,634,151 | B1 * | 10/2003 | Roth | E04C 5/18 52/700 |
| 9,334,997 | B1 * | 5/2016 | Tokumasu | F16M 13/027 |
| 10,584,460 | B1 * | 3/2020 | Wheeler | F16L 1/16 |
| 2007/0271860 | A1 * | 11/2007 | Gonzalez | E02D 27/02 52/169.1 |
| 2010/0301178 | A1 * | 12/2010 | Myers | F16B 2/12 248/74.1 |
| 2012/0167487 | A1 * | 7/2012 | Culp | E02D 27/12 52/745.19 |
| 2013/0099068 | A1 * | 4/2013 | Lacour | E04C 5/122 248/62 |
| 2015/0191921 | A1 * | 7/2015 | Hoyle | E04G 9/021 249/1 |
| 2019/0086001 | A1 * | 3/2019 | Turner | E02D 29/10 |
| 2020/0256482 | A1 * | 8/2020 | Krause | H02G 3/383 |

* cited by examiner

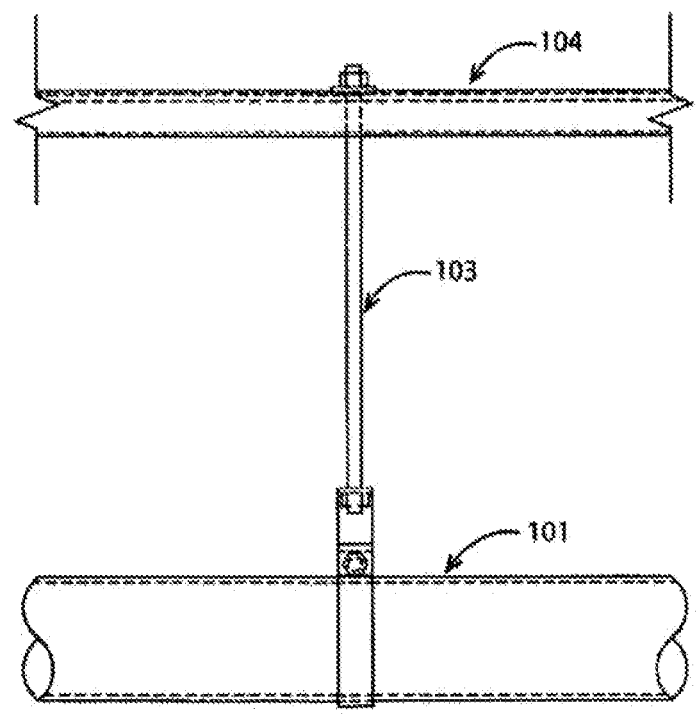
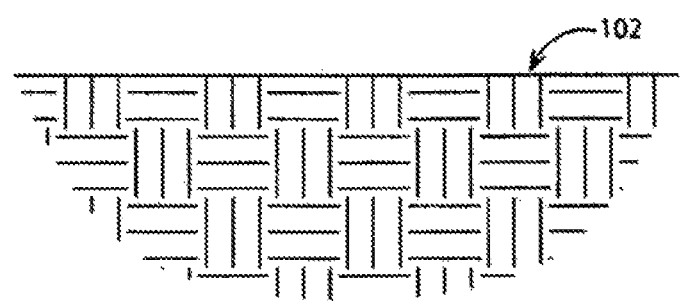
FIG. 2

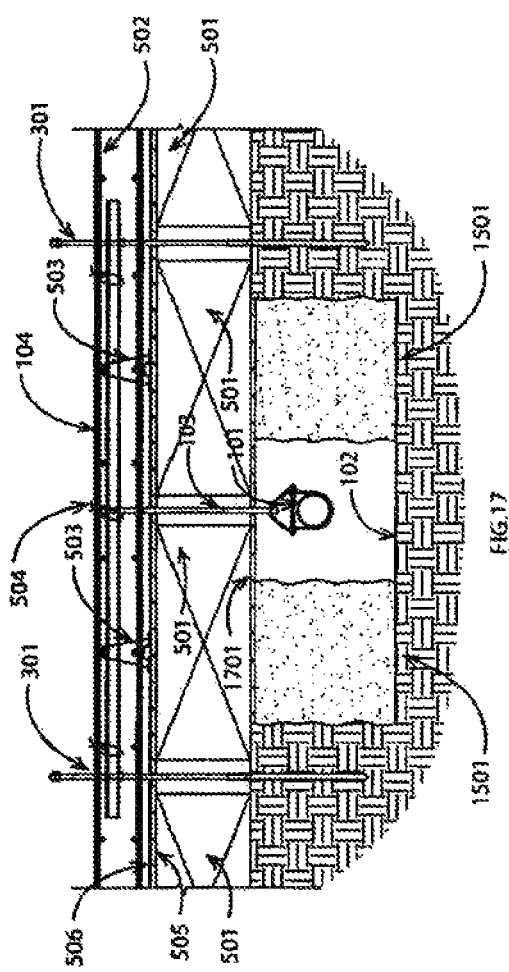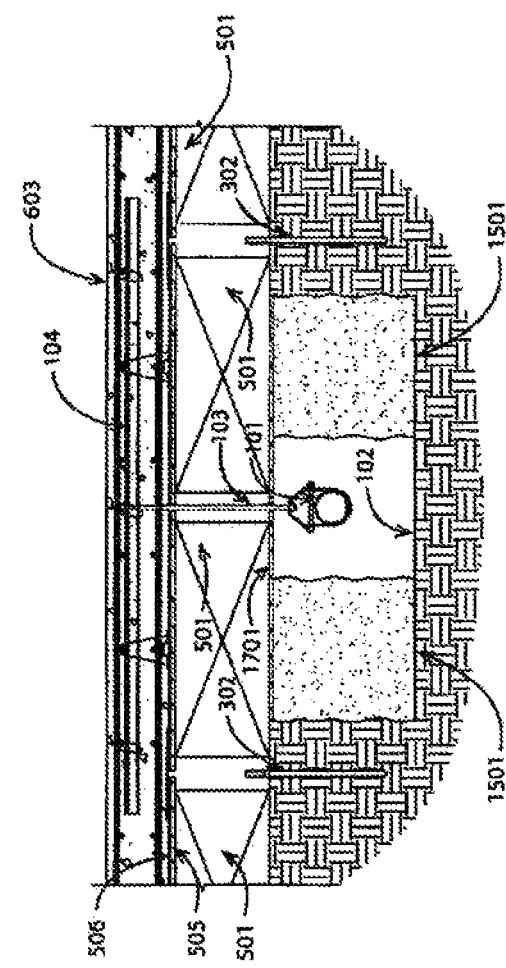

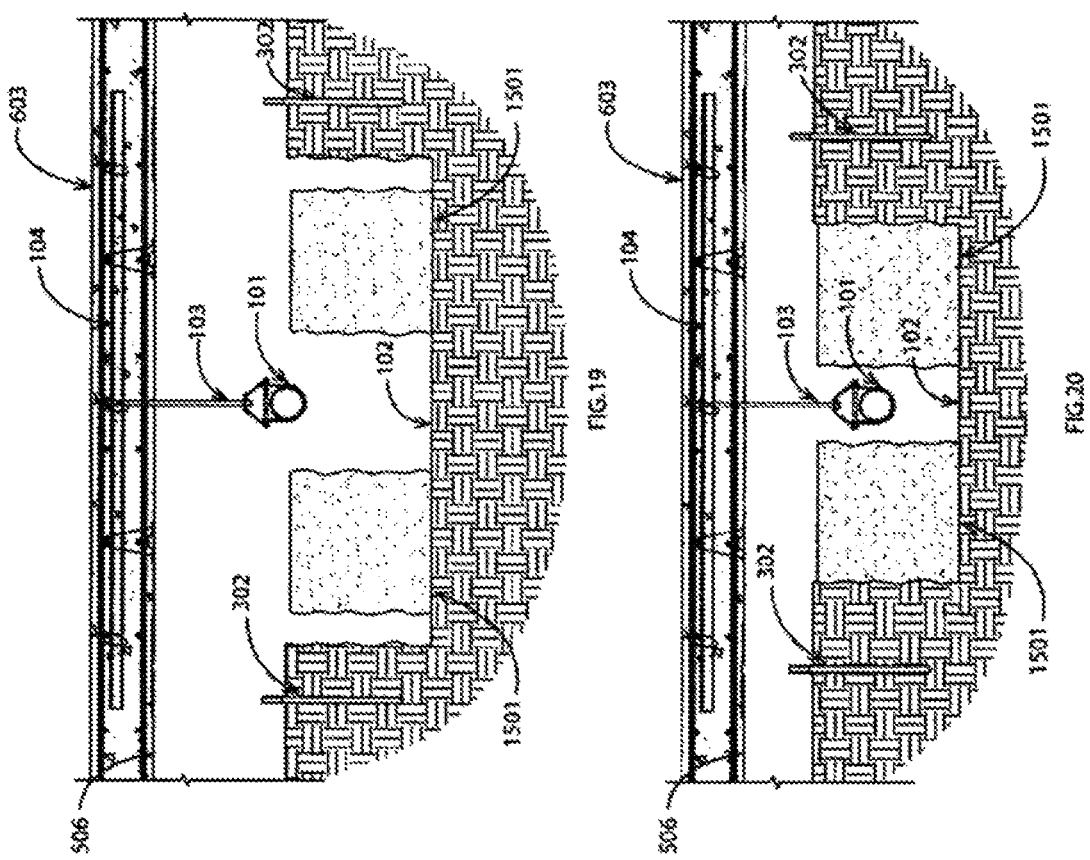

SYSTEM AND METHOD FOR PROTECTION OF UNDER-SLAB UTILITIES FROM CHANGES IN SOIL VOLUME

PRIORITY

This application claims priority to U.S. Provisional Patent Application Nos. 63/253,515, 63/245,835, 63/225,467 and 63/106,191 and U.S. Non-Provisional patent application Ser. No. 17/512,612.

TECHNICAL FIELD

The present application relates generally to an improved system and method for protecting plumbing lines, electrical lines and other utility lines under a slab that is isolated from soils that exhibit volumetric changes after construction, in which the under-slab utilities are isolated from these soils to protect them from the damage these soils can cause, and in which flexible expansion joints in the utilities at the perimeter of the slab allow the utilities to transition from an isolated condition under the slab to a soil-supported condition outside of the slab, allowing utilities outside of a building to move due to changes in soil volume without impairing the function or damaging the under-slab portions of the utility lines.

BACKGROUND OF THE INVENTION

Problems due to expansive soils have been reported in many countries all around the world. Every year they cause millions of dollars in repair costs due to their severe damage to structures. Expansive soils often contain clay minerals such as bentonite, montmorillonite, and smectite that have the potential to expand and shrink significantly due to changes in moisture content. The expansive potential of the clay is greater near the ground surface where the profile is subjected to seasonal and environmental changes in moisture content and has less soil overburden pressure, from soil above, to counteract expansion. Increasing the moisture content of the clay often causes dramatic increases in volume, especially near the ground surface where the ground surface can rise up to 18 inches or more in some areas, with an estimated 6 inches of potential upward movement being common in many urban areas where highly expansive soils are present. Similarly, decreasing the moisture content of the clay often causes dramatic decreases in volume, especially near the ground surface where the ground elevation can drop in elevation as much as it is rises when the clay gets wet. Fissures in the soil can develop during periods of time when the clay dries out due to seasonal variations in rain, growth of trees, or other sources. These fissures often allow water to penetrate to deeper layers when water is present. This often produces a cycle of shrinkage and swelling that causes the soil to undergo progressively greater amounts of volumetric changes over time. This movement in the soil often results in damage to buildings, especially in lightweight infrastructure such as sidewalks, driveways, basement floors, pipelines and shallow foundations that are not isolated from the volumetric changes and do not have sufficient weight and/or stiffness to resist the changes in stress caused by the volumetric changes in the soil.

The depth at which expansive soils can cause damage is also significant. As noted the 2014 Senior Thesis titled "An Examination of Changes within the Active Zone Moisture Content and Soil Swell Potential of Expansive Clay Soils at a Site in Denton County, Texas" by Marc William Cappell with Oklahoma State University, "Deep-seated swell is the additional upward soil swell movement that could result from moisture changes and soil swelling below a typical 10 foot (305 cm) deep active-zone (Farrow and Roland 2005)." As noted in a paper by Nelson, Overton and Durkee, all from Colorado, that was published for the Shallow Foundation and Soil Properties Committee Sessions at the 2001 American Society of Civil Engineers (ASCE) Civil Engineering Conference, titled "Depth of Wetting and the Active Zone," "The term "active zone" generally refers to the zone of soil that either is contributing to or has the potential to produce heave." The 2001 paper describes how, for any specific soil profile with expansive clay, there is a "Depth of Potential Heave" at "which the overburden vertical stress", from the weight of the soil above, "equals or exceeds the swelling pressure of the soil", with the "swelling pressure" being the pressure required to prevent swelling. As noted in the Discussion and Conclusions of the 2001 paper, "There is no sound rationale behind assuming that the depth of wetting will stop at some assumed depth. Instead, a more prudent assumption is to assume that, in time, the depth of wetting will extend throughout the entire depth of potential heave. This in fact, is realistic and conservative." Therefore, for the purposes of this application, the term "active zone" will refer to the region of soil from the ground surface down to the depth of potential heave.

There are other types of soil conditions which can cause changes in volume similar to expansive soil. These other soil conditions can include without limitation: frost heave in colder climates where water in the soil seasonally expands as it freezes and then contracts as it melts; settlement in under-consolidated clay soil cases due to poor water pressure dissipation over long periods of time after a construction project increases the overburden pressure such as by adding soil to raise the ground elevation to a desired finish floor elevation; and, collapsible soils cases in which a small reduction in moisture content of some sand configurations with relatively low densities can cause an immediate and dramatic reduction in soil volume. While the focus of this disclosure primarily discusses protection of under-slab utilities from expansive clay soils, the same comments often apply to these other soil conditions which can be equally challenging in areas of the country where expansive clay soils are not present.

Most buildings require one or more utility lines to, for example, provide clean water and remove wastewater with a plumbing system. Utility lines buried in the ground and in contact with expansive soil are subject to stresses from expansive soil. Domestic water pipes are plumbing lines that provide clean water by a pressurized water line. Fire protection pipes are plumbing lines that provide water for automatic fire sprinkler lines by a pressurized water line. A significant amount of water damage often occurs when pressurized water lines break due to expansive soil damage. And, often the stresses from expansive soil are great enough to break these pipes. Expansive soil can push plumbing lines up through the slab, damaging plumbing fixtures and even causing damage to walls. When utilities transporting water in any form leak, especially pressurized water lines, the leaks can cause excessive saturation under a foundation. This saturation often leads to further soil expansion which often causes even greater damage to the foundation and superstructure. Sanitary sewer pipes are plumbing lines that transport wastewater away from plumbing fixtures such as toilets and sinks by gravity, requiring that the lines slope downward to the exterior of the building with sufficient slope. When expansive soil movement causes sanitary sewer lines to shift so that they no longer slope as intended, solids in wastewater often stop in the plumbing and this causes sewage to build up and obstruct the plumbing, which becomes a health, safety and welfare problem for the occupants.

Several techniques have been used in the past to solve problems caused by the swelling and shrinking of expansive soils. Section 1808.6 of the 2021 International Building Code (IBC) provides design requirements for foundations on expansive soil using many older techniques in the prior art. These requirements do not address under-slab utilities but in certain cases they can reduce or even prevent damage to under-slab utilities from volumetric soil changes.

2021 IBC Section 1808.6.3 allows expansive soil to simply be " . . . removed to a depth sufficient to ensure a constant moisture content in the remaining soil", which can protect under-slab utilities if all of the expansive soil is removed to expose dimensionally stable material, such as limestone, if dimensionally stable material happens to exist naturally near the ground surface. However, where such favorable conditions do not exist, the depth of excavation required would often exceed 10 feet below the ground surface. As noted above, there is no sound rationale behind assuming that the depth of wetting will stop at some assumed depth, and the prudent approach is to assume the depth of wetting can occur over the full depth of potential heave. Consequently, a disadvantage of the approach of removing the expansive soil to a sufficient depth, and the reason this approach is often not selected by design professionals in many areas, is that the depth required to sufficiently address the problems associated with expansive soils is not practical and/or more expensive than other options in the prior art. An example of this approach being impractical and/or expensive is when constructing an addition to an existing building and such an operation could undermine the existing foundation. Another example of this approach being impractical and/or expensive is when constructing a new building in a densely populated urban area where the property line is at near the perimeter of the foundation so it does not allow a sufficiently deep vertical retaining wall to be erected without permission of the adjacent property owner, which is often a municipality that uses the adjacent land for a road where they are not inclined to allow disturbing their property. Another disadvantage of this approach is that installing dimensionally stable material such as crushed limestone rock (often called "flex base" and used for road construction) is often more expensive to purchase in areas where expansive clay soils are predominant than other types of fill that cost less but are not as dimensionally stable, such as "select fill" consisting of soil with less expansive properties than the original soil in the ground. If select fill is used in relatively shallow depths, such as a few feet, many geotechnical engineers have found the level of damage to structures associated with the use of the less-desirable material to be tolerated; however, when depths greater than 10 feet are required, many geotechnical engineers have concerns with the cumulative effect of the volumetric changes that can occur in even select fill such as expansive soil swelling and shrinking as well as settlement. Even when rock is encountered, many areas of the county have naturally occurring layers of expansive soil and rock layers alternating, sometimes with high variability over a single building footprint. The intermittent layers of rock can make excavation of the expansive soils to a sufficient depth highly problematic, especially where there are large rock boulders that can be greater than the size of a school bus and much harder than concrete, causing unpredictably long delays in construction when they are encountered. In cases where the slab is placed on the ground after removing expansive soil to a sufficient depth and replacing it with dimensionally-stable material, under-slab plumbing is typically buried in the dimensionally-stable material. However, all of the challenges noted above in removing and replacing expansive soil under slabs are the same challenges in removing and replacing expansive soil under the utilities under those slabs. Therefore, in areas where expansive soil exists without a layer of competent bedrock that is encountered within a few feet of the ground surface and that extends well below 10 feet under the ground surface, the approach of simply removing expansive soil to protect under-slab plumbing is often not possible, not effective, not practical, time-consuming, and/or more expensive than other options in the prior art.

2021 IBC Section 1808.6.3 also allows expansive soil to be " . . . stabilized by chemical, dewatering, presaturation or equivalent techniques."

Presaturation is still commonly used today in many areas, with the theory that pre-swelling the soil will reduce or eliminate the potential heave. This theory is based on an assumption, though, that the moisture will not leave the clay subgrade and cause damage from soil shrinkage; however, this assumption has proven to be false in many cases where long periods of drought and/or tree roots dry out the subgrade under buildings and cause damage to foundations and under-slab utilities.

Dewatering is the opposite of presaturation and is a less common approach to reduce the potential vertical movement of expansive soil because, while in theory this may reduce the shrinkage, many people recognize that if water is introduced to dewatered soil, the soil will swell.

In laboratories, companies that claim to be able to stabilize expansive soil with proprietary techniques often produce laboratory evidence that they can reduce the volumetric changes of soil. These manufacturers do not typically claim to reduce all of the potential volumetric changes of the soil, but rather claim to be able to reduce it to a level where they believe the level of damage to a facility is tolerable. A paper by Petry and Little in the November/December 2002 edition of the Journal of Materials in Civil Engineering, titled "Review of Stabilization of Clays and Expansive Soils in Pavements and Lightly Loaded Structures—History, Practice, and Future" addresses some of the challenges with stabilization techniques and states, "It is always important and will continue to be important to clearly identify the mechanisms of modification and stabilization of clay soils. Only when these have been clearly identified can we address problematic reactions and improve the product." The paper further states, "Although some nontraditional stabilizers are attractive alternatives, some of their producers are overly aggressive in promoting their product. Some of these promotions attack traditional stabilizers in an attempt to discredit them and obtain market share. These attacks often demonstrate a poor level of understanding of the mechanisms involved." And, the paper in summary states, "The paper warns that competent engineers who apply their professional knowledge judiciously must judge the effectiveness and appropriateness of all stabilizers. This knowledge is not cheap but must be gained through a dedicated effort to learn the fundamental concepts of stabilization and to keep abreast of the state of knowledge as it develops nationally and in a given region. This requires dedication to continuing education and a proactive mindset in attitude by the engineer." These comments speak to the difficulty in selecting a proprietary stabilization technique and knowing with confidence that it will be successful. And, again, while some claim to come very close, it is important to remember that these techniques do not completely eliminate any possible soil volume change. An added concern with chemical stabilization techniques can be concerns regarding poteially hazardous chemicals being introduced into the ground.

The prior art also teaches the controlling the moisture content of expansive soil under a foundation. For example, U.S. Pat. No. 4,534,143, issued to Goines et al., discloses a subsurface irrigation system causing water to slowly percolate into the expansive soil supporting a foundation so as to maintain the moisture content of the soil. However, it is virtually impossible for any artificial means of moisture control to maintain absolutely constant moisture contents under a real facility exposed to the highly variable conditions which are common. Moisture migration n partially saturated soil is extremely complex and the mechanisms are only generally understood by limited empirical evidence that supports widely varying theories. What little evidence there is relative to the complexity of the phenomenon actually indicates that moisture migration can occur even if there was a vertical barrier to any moisture migration in or out under the perimeter edge of a foundation, making any attempt at complete moisture control potentially ineffective, with any interior moisture migration as soil conditions reach an equilibrium over time causing volumetric changes considering that in almost all cases on real project there are non-homogenous soil conditions under a building, especially so as the moisture content of soil itself is a common non-homogenous soil condition. U.S. Pat. No. 4,015,432, issued to Ball, discloses a foundation structure supported on expansive soil moistened to its plastic limit. Through a moisture controlling barrier placed around the foundation periphery, moisture can be added in an attempt to ensure that the moisture content of the soil remains at its plastic limit. However, a moisture controlling barrier cannot be reliably effective in all cases as described above. Furthermore, it is only effective even in theory if it is deep enough, and the depth required in some instances, as discussed above considering the depth of the active zone, can be more expensive to construct than other approaches which are more likely to be successful that do not require such a deep excavation.

2021 IBC Section 1806.6.2 allows foundations to be designed as a slab-on-ground foundation, where the entire bottom surface of the foundation, including the slab, is generally supported vertically by the soil. In general, when this approach is taken, any significant concerns with the potential magnitude of damage from volumetric changes in expansive soil are typically addressed in part by attempting to lessen the anticipated level of damage by applying the techniques described above as referenced in 2021 IBC Sections 1808.6.3 and 1808.6.4, and the challenges with those approaches are discussed above. In addition, a primary challenge with installing a slab-on-ground foundation over expansive soils that are not completely removed or completely stabilized is that some level of damage due to expansive soil should be expected. 2021 IBC Section 1806.6.2 refers to design methods that attempt to account for soil-structure interaction, the deformed shape of the soil support as well as center lift and edge lift conditions, all of which note how a foundation will distort in three-dimensional geometry and an attempt is made to limit the distortion to an acceptable level. This is a common approach, especially for residences and small commercial structures built in geographic areas where expansive soils are prevalent, however, damage occurs to both the superstructure and often the under-slab utilities regularly in these types of facilities. Evidence of this is the large number of foundation repair companies that are prevalent in geographic areas where expansive soils are common. If damage occurs to an under-slab utility, the slab can be sawcut and removed immediately above the area of broken utility so that the utility can be repaired and the slab repaired; however, damage to under-slab utilities can and often does occur, requiring expensive repairs.

2021 IBC Section 1808.6.1 provides an alternate to a slab-on-ground foundation by permitting foundations be designed to resist differential volume changes and prevent structural damage to the supported structure. With this alternative approach, "Foundations penetrating expansive soils shall be designed to resist forces exerted on the foundation due to soil volume changes or shall be isolated from the expansive soil."

An older method in the prior art that meets the requirements of 2021 IBC Section 1808.6.1 is to install an elevated foundation with a traditional crawlspace under the floor. When a properly designed crawlspace foundation resists expansive soil forces, the superstructure being elevated by a crawlspace protects the superstructure from expansive soil damage if the height of the crawlspace is greater than the magnitude of the potential vertical upward movement due to volumetric changes of expansive soils. There are two primary plumbing codes used in the United States today: the International Plumbing Code and the Uniform Plumbing Code. Neither of the latest published versions of either code explicitly require isolation of plumbing from expansive soils. And, where under-slab utilities are supported by and buried in an expansive soil material, volumetric soil changes can cause damage to the under-slab utilities, especially where the floor structure is isolated and the differential movement is greater than if the slab was a slab on grade foundation. If under-slab utilities are hung from an elevated floor structure after the elevated floor structure is installed, the under-slab utilities being elevated above an under-utility space protects the under-slab utility from expansive soil damage if the under-utility space is greater than the magnitude of the potential vertical upward movement due to volumetric changes of expansive soils. And, this post-slab isolation approach is actually common in portions of crawlspace foundations where access is provided to the underfloor space after the floor structure is installed by means of an access opening, but this post-slab isolation approach is not typically applied to areas under a slab where the depth of under-slab utilities is deeper than the subgrade of a crawlspace. Many building codes require that underfloor spaces with access openings be considered crawlspaces and be ventilated for the safety of those that enter an under-floor space, either with an unpowered natural ventilation system comprised of sufficiently large openings in appropriate locations or with a mechanical ventilation system. However, a disadvantage of the natural ventilation system is that animals such as snakes, opossums, cats, rats, mice, spiders, termites, bees, . . . etc. can often find access to the under-floor space and create safety hazards for the occupants when they leave the building and an ongoing nuisance for maintenance staff to address these safety hazards. Furthermore, water and/or humidity can often enter through natural ventilation openings and the prescriptively designed natural ventilation openings are sometimes not sufficient to be capable of removing the water and/or humidity, which can create problems with corrosion of structural members, as well as potentially smells and/or fungal growth that can find its way through openings in the slab and create health, safety and welfare concerns. Mechanically ventilated systems are problematic for owners because they can have mechanical failures over time due to wear and tear on moving parts and exposure to the elements, and it is common for occupants and maintenance staff to not realize when these mechanical failures have occurred because occupants generally do not go into under-floor spaces unless there is an event creating a special need such as a maintenance activity. When mechanical ventilation systems stop functioning and there is not a natural ventilation system in place, the problems with moisture accumulation can occur such as corrosion to structural elements that causes safety concerns and mold and smells that enter the occupied space above the floor structure, which can all be dramatic where steel floor structures are used that are not sufficiently protected from corrosion, such as with ungalvanized steel, and when openings such as floor hatches do not have robust and properly functioning seals.

A more recent alternative to a crawlspace type of foundation is the slab-on-voidform foundation type. An advantage of the slab-on-voidform system is that it can cost significantly less to construct than a crawlspace foundation. One reason a slab-on-voidform foundation can cost significantly less is because the floor structure does not require expensive formwork, often regularly spaced unshored steel beams, to span long distances and hold up fresh concrete that has no compressive strength while not deflecting an unacceptable amount. Another reason a slab-on-voidform foundation can cost significantly less is because the height of the under-floor space of a slab-on-voidform foundation needs only to be enough to accommodate the potential vertical movement of expansive soil whereas the height of the under-floor space of a crawlspace foundation must be adequate to meet building code requirements for access and allow workers to do work such as removing any temporary shoring, installing any under-slab utilities that will be installed after a floor structure is in place, as well as inspecting conditions after occupancy and eventually doing repairs; and, the cost of a foundation increases as the height of the gradebeams around perimeter increase due to increases in the height of an under-floor space. And, another reason why the slab-on-voidform system can cost less to construct is that a slab-on-voidform system typically does not have an under-slab drainage system since the under-floor space is not accessible whereas crawlspace foundations typically have a drainage system. And, another reason why the slab-on-voidform system can cost less to construct is that a slab-on-voidform system typically does not have any lighting like is common in many crawlspaces because the under-floor space of a slab-on-voidform foundation is not an accessible space. Another reason why the slab-on-voidform system is preferred over a crawlspace system is that a slab-on-voidform foundation can be installed at the ground level surrounding a building without requiring stairs to raise a floor elevation so as to provide natural ventilation of a crawlspace, if such a system is used. Another reason why the slab-on-voidform system is preferred over a crawlspace is that there is not natural ventilation or mechanical ventilation as described above for crawlspace foundations, and consequently no challenges associated with those systems as described above, as there are with crawlspace foundations. While the slab-on-voidform foundation type is a more recent application than a crawlspace foundation type, slabs with various types of voids that could possibly be considered slab-on-voidform foundations have been installed for over a century. With time, the slab-on-voidform foundation type has evolved and a common manifestation is where drilled piers and grade beams are installed that resist the forces of expansive soil, then a layer of degradable carton voidforms are installed over a subgrade and the voidform system often includes a layer of Masonite at the top, then a vapor barrier such as a plastic sheet is installed over the voidforms, and then slab reinforcement is installed, and then concrete is poured to create the slab of a slab-on-voidform foundation in which the degradable carton voidforms deteriorate sufficiently that the slab is isolated from the expansive soil beneath the under-floor space. One manufacturer of carton voidforms has indicated that they distribute approximately 30 Million square feet of carton voidforms for this type of application every year for new construction in North America. Because there is no means of access to the under-floor space as with a crawlspace foundation, under-slab utilities have historically been supported by and buried in expansive soil when a slab-on-voidform system is used, which can cause damage like has been described above in expansive soil conditions. It is true that moisture can accumulate in an under-floor space of a slab-on-voidform system; however, today many slabs are installed over vapor barriers with tape that adhere to the concrete at the edges of vapor barrier sheets and penetrations to prevent moisture from rising above the vapor barrier in modern slab-on-voidform foundations. Studies have shown that, if there is not a vapor barrier under carton voidforms, a subgrade typically has enough moisture with the moisture associated with fresh concrete as it cures, to cause modern carton voidforms to degrade in an acceptably fast time, several months for example, to lose enough strength that they will crush before telegraphing any loads up from a heaving subgrade, as they are typically not wax impregnated today as in some decades past. A paper by David K. Isbell, PE titled, Performance of Cardboard Carton Forms as presented on Feb. 21, 2001 to the Foundation Performance Association, and previously a part of a conference of the Texas Section of the American Society of Civil Engineers (ASCE) states, "The moisture from the subgrade plus the hydration of the concrete appear to provide adequate deterioration of the boxes." In some climates more than in others, degradable voidforms can be problematic if it rains too frequently or is too humid, because the degradable voidforms can lose their strength before concrete is poured and there have been many collapses of degradable voidforms when contractors have tried to take the risk rather than remove all of the reinforcement and voidforms and start all over again. Primarily for this reason, non-degradable voidform materials used in slab-on-voidform foundations are also in the prior art. In general, with voidforms that have non-degradable components, designers typically specify that they be installed in a manner so that they are capable of crushing under some theory of a crushing mechanism or that they are capable of cutting into a heaving soil under some theory in which the soil will swell in between the non-degradable components of a voidform system.

As an example of one of the more common systems of carton voidforms used today in many parts of the United States to provide temporary support for a slab of a slab-on-voidform foundation, VoidForm® Products, LLC provides a SureVoid® product corrugated paper voidform system with regularly spaced vertical cardboard partitions in a grid pattern with a horizontal layer of cardboard across the top and bottom. Typically, a layer of Masonite is placed over the carton boxes.

As another example of systems in the prior art for supporting slabs of slab-on-voidform foundations, Reliable Void Forms, of Austin, Texas, provides an alternative to the traditional carton void form system. Instead of corrugated paper, Reliable Void Forms uses a molded pulp form made of 100% recycled paper with a consistency and shape similar to an egg carton. Forms are produced in 61 cm×61 cm (24"×24") squares with thicknesses of either 15 cm (6 in) or 20 cm (8 in). During installation, the forms can be cut, trimmed, or grinded to the appropriate shape and size. Unlike cardboard forms, the manufacturer claims these forms can be used in wet or dry conditions. Also, due to their shape and weight, they can easily be shipped, stored, hauled, and manipulated in the field. Once laid out on the site, the concrete is poured over the top. Gradually, over time, the forms will degrade, but until that happens, one theory purports that any soil expansion is isolated within the pockets.

An example of a voidform system with non-degradable components is a partially plastic voidform product by Void-Form® called StormVoid™ which has plastic elements that do not deteriorate like the standard carton SureVoid® products. This means the structural elements (i.e. slabs, grade beams, etc.) must be designed for the potential uplift pressures the form is capable of exerting.

Another example of a voidform system with non-degradable components in the prior are involves the use of a metal wire mesh formed into a volumetric shape as produced by SuperVoid Systems, LLC. In one theory, volumetric changes in the soil could cause the soil to push on the wire mesh, in turn causing the mesh to deform or the soil to push through the mesh. This means the structural elements (i.e. slabs, grade beams, etc.) must be designed for the potential uplift pressures the form is capable of exerting. If a version of the SuperVoid product is used with a horizontal layer of oriented strand board or plywood at the top of the wire mesh, the oriented strand board or plywood is degradable and can lose strength over time, but this is not problematic in and of itself when the SuperVoid system is used as a slab voidform because the slab will have cured by the time the wood material decays.

As there are many advantages with slab-on-voidform foundations, given that non-degradable voidforms can be used where degradable voidforms are not practical due to a wet climate, the primary disadvantage of the slab-on-voidform foundation type has been that there is no method available in the prior art of sufficiently protecting under-slab utilities from volumetric soil changes in a subgrade.

With regard to the protection of under-slab utilities under slab-on-voidform foundations, many slab-on-voidform foundations today are constructed with under-slab utilities being supported by and buried in a subgrade of expansive soil even though there is a known risk that volumetric soil changes could cause damage to a facility. The primary reason that under-slab utilities are still soil-supported is that a technology has not yet emerged in the prior art which provides complete isolation of the utilities from potential volumetric soil changes. Even if access to the under-floor space was provided, because the voidforms do not degrade quickly enough for workers to access an under-floor space without removing the voidforms or because non-degradable voidforms obstruct such access and would require removal, which would be an arduous task, the industry has not yet developed a method of construction with the necessary apparatuses so as to suspend under-slab utilities before a concrete slab of a slab-on-voidform foundation is poured. While there are some disagreements between designers on the relative merits of the theories applied when non-degradable voidforms are used to isolate slabs of a slab-on-voidform system, with regard to various specific types of non-degradable voidform systems, there is a general consensus among design professionals of all design disciplines that absolutely none of these systems are appropriate if non-degradable components of a voidform system can cause soil to impart forces, directly or indirectly through the non-degradable components.

Section 506.1 of the 2021 International Property Maintenance Code (IPMC), for example, requires where it is adopted locally that "Every plumbing stack, vent, waste and sewer line shall function properly and be kept free from obstructions, leaks and defects." And, for example, only a small amount of movement from volumetric soil change is all that it can take to cause a P-trap to crack just enough that the water in the P-trap spills out allowing noxious gases from a sanitary sewer system to enter an occupied space. There have been numerous lawsuits around the country that arise when plumbing is damaged from volumetric soil change soon after a building is occupied and under-slab utilities fail in various ways, especially when owners realize the magnitude of the cost required to repair the under-slab utilities as they can be required by building code to repair. The costs of repairs are so significant because, unlike with a slab on grade or a crawlspace, there is no convenient access to the under-slab utility locations needing repair. One reason it is so expensive to repair an under-slab utility under a slab of a slab-on-voidform foundation is that it is often required to sawcut temporary access openings in the slabs at the intersection of two lines with each line being approximately at the midpoint between a gridline of deep foundation elements such as drilled piers, then excavate by hand to dig laterally and find all locations where plumbing needs to be repaired, often having to walk wheelbarrows of dirt out of a building and dump it outside. If one were to sawcut immediately over any damaged utility location, sawcutting through a typical two-way structurally suspended reinforced concrete slab of a slab-on-voidform foundation, one could easily cause the slab to collapse as they sawcut through portions of the slab between piers that are necessary for structural stability and this does happen from time to time in the industry by accident when contractors think a slab is a slab on ground but find out too late that it is a slab-on-voidform system. Owners are even more angry when they find out that the repairs will not prevent the problem from happening over and over again, potentially, over the life of the facility. Designers in areas where expansive soil often discuss this primary disadvantage of a slab-on-voidform system with Owners before construction, noting that Owners could select a crawlspace option for additional cost if they want the ability to access and even to isolate some portions of the plumbing; however, most owners are unfortunately short-sighted in authorizing a slab-on-voidform system as they are focused on the short-term goal of trying to maximize the floor plan area for their facility's program with a given budget.

For example, in March 2021, the Geoprofessional Business Association (GBA) has published a case study, Case History Number 108, of a S25 Million damage claim made by an owner of a senior-living facility in Colorado in which slab-on-voidform construction was used where under-slab utilities were not sufficiently isolated from expansive soil that damaged the under-slab utilities. About four years after construction was completed and the building was occupied, sanitary sewers began backing up and a powerful stench was permeating the building and the walls and lower-level slab began to show heaving distress. The owner had to move residents out of the building and into suitable temporary housing and they eventually paid a contractor to excavate under the building and install a crawlspace.

As another example, in the United States Court of Federal Claims, Cause No. 09-672C, filed Sep. 7, 2012, which involves a case where under-slab utilities under a slab-on-voidform foundation were damaged by expansive soil because the under-slab utilities were not sufficiently isolated from the damage that expansive soil can cause, the court ruled that the mechanical engineering firm " . . . had a duty to isolate the plumbing from the expansive soil in a way that would accommodate the maximum potential soil heave predicted in the soils reports", noting that " . . . whether willful or not . . . " the mechanical engineering firm " . . . failed to heed the warning and guidance set forth . . . " " . . . in the soils reports' prediction that the soil could heave . . . " " . . . and provided a negligent design in violation of the Contract."

As early as 2007, the Foundation Performance Association (FPA) published a recommendation in their SC-11-0 publication titled Specification and Application of Void Spaces Below Concrete Foundations that "Expansive soils should not support under slab utilities below a Structural Slab" where the industry often refers to a slab of a slab-on-voidform foundation as a structural slab. The publication further states, "Under slab piping must remain stationary with respect to the slab. The distance between the slab and the buried utilities may change as the soil moisture changes. These changes could cause the utility lines to disconnect, start leaking or otherwise fail. There are various methods to accommodate such differential movement by using designs that allow the utilities to adjust to the changing conditions. The piping design beneath the foundation must take into consideration the differential movement between the interior stationary piping and the soil outside the foundation, and any associated bending stresses." The SC-11-0 publication even includes a diagram that diagrammatically shows a hanger assembly, including a traditional clevis hanger supporting an under-slab utility pipe, but the diagram shows the hanger to be either supported by rebar or to be supported by a concrete slab after it is poured and cured, both of which are impossible because the diagram shows both the slab and the rebar being supported by voidforms which are still intact which means that there is no access to install the utility pipe after the slab is poured and it means there was no support to install the utility pipe before the slab was poured. Additionally, the diagram does not show any means for retaining the soil on either side of a utility pipe. The discussion and diagram show the disconnect between what is desired and what limited technology was available in the prior art in 2007. In a 2014 revision to the SC-11 document, numbered SC-11-1, the FPA did not change any of the text cited but even with a revised detail they showed a scenario that is impossible to construct for reasons cited above. Their reference to "various methods to accommodate such differential movement by using designs that allow the utilities to adjust to the changing conditions" is referring to what some in the industry refer to as flexible joints, such as a flexible expansion joint. The FPA's recommendations have been made as a community of primarily geotechnical and structural engineers with the best of intent but with little to no involvement from plumbing designers or contractors that could point out the disconnect in what they are recommending and what construction methods are in the prior art. For example, the problem with a sanitary sewer plumbing design that incorporated flexible expansion joints all along the length of an under-slab utility is that most sanitary sewer systems function by a gravity system that has to slope downward at a minimum slope along the entire length of the plumbing system and, in addition, plumbing codes require specific minimum slopes, so it is not technically feasible to have an underslab utility system with so many flexible expansion joints slope so dramatically that at any point under a slab the subgrade could heave and/or fall without causing a negative slope that would cause the sanitary sewer system to no longer function properly, and furthermore the cost of so many flexible expansion joints would cost more than a crawlspace foundation in many cases such that, even if it were technically feasible for a specific case, it would most likely not be a logical approach compared with a crawlspace foundation. As another example, SC-11-1 diagramatically shows a soil retainer system that has no means of stability to retain the soil.

There have been several attempts to invent methods and apparatuses with a goal being to attempt to isolate under-slab utilities from expansive soils. However, all of these attempts have failed in one form or another to provide an actual means of isolation. When the Structural Engineers Association of Texas (SEAoT) became aware of the concept behind some of the disclosed inventions for novel ways to isolate under-slab utilities, it quickly assembled approximately a dozen engineers including structural engineers, geotechnical engineers and mechanical engineers to review available technologies and make recommendations because they recognized that none of the prior art has been able to sufficiently isolate utilities and utility supports from expansive soil, in contrast to embodiments of the invention disclosed herein. In January 2021, based on the recommendations of the aforementioned group of engineers, SEAoT submitted to the International Code Council (ICC) a code change proposal to the 2024 International Plumbing Code (IPC) that would require an sufficient means of isolating under-slab utilities from expansive soil under slabs that are isolated, consistent with this invention, and would prohibit the majority of prior art methods as they do not sufficiently isolate under-slab utilities. One exception in the prior art is that it would remain permitted to install plumbing and supports after the slab is poured by removing voidforms and post-installing anchors overhead, which is in the prior art but is often thought to be cost-prohibitive for new construction. SEAoT submitted a 14 page document to ICC with the rationale for their proposed code change. The SEAoT document is available at at https://www.iccsafe.org/products-and-services/i-codes/code-development-process/2021-2022-group-a/and is hereby incorporated by reference as if fully set forth herein. At the International Plumbing Code Committee Code Action Hearings, SEAoT's proposed code change was supported by testimony from various mechanical and structural engineers, the Geoprofessional Business Association, the American Institute of Architects and the American Council of Engineering Companies of Texas. The 2024 International Plumbing Code Committee then approved the proposed code change, with some modifications that SEAoT supported that clarified the intent of the proposed code change. And, the change will be a part of the 2024 International Plumbing Code when it is published. While numerous serious attempts have been made in the last several decades, the prior art methods, as described above, do not meet the requirements for isolation as will be set forth in the 2024 IPC.

It may be important to note that, while the United States Court of Federal Claims indicated in the case cited above that the mechanical engineering firm was negligent in designing a soil-supported under-slab utility under a slab-on-voidform foundation for the specific project at issue, there were approximately a dozen engineers assembled by the Structural Engineers Association of Texas, including structural engineers, geotechnical engineers and mechanical engineers, which all indicated in their collective rationale statement to ICC that designing a soil-supported under-slab utilities under a slab-on-voidform foundation was within the standard of care for each of those professions in Texas as of January 2021 when the statement was issued to ICC. The standard of care may change over time to exclude this practice, but this practice is still being used today.

And, while some building officials might interpret current code requirements to prohibit soil-supported utilities under slab-on-voidform where expansive soils are present, the only interpretation of code provisions that applies to any specific project with regard to code compliance is the opinion of the building official with the Authority Having Jurisdiction (AHJ) for that project. There are many projects in Texas where building officials issue building permits without taking any exception to soil-supported under-slab utilities under a slab-on-voidform or a crawlspace foundation, even when they are provided a copy of a soil report indicating that expansive soils are present and documentation indicating that there will remain some potential vertical movement of the subgrade after the building is occupied.

Prior art systems for vertically supporting utilities (including but not limited to sanitary sewer piping) that are designed to be located under structurally suspended concrete slabs over void forms (including but not limited to carton and plastic void forms) bearing on other foundation elements (including but not limited to piers, piles, caissons, footings, and grade beams) without a typical crawl-space access include systems that directly bear on soil within the active zone ("Direct Bear Systems"). In these systems the utilities are laid down directly on top of the soil in the active zone or on top of material (including but not limited to coarse aggregate (rocks), fine aggregate (sand), cemented sand, flowable cementitious fill, road base, lime-stabilized earth) that is laid down directly on top of the soil in the active zone.

The prior art also includes systems that indirectly bear on soil within the active zone ("Indirect Bear Systems"), in which utilities typically hang from above by a threaded rod that is supported by a primary nut bearing on the system (e.g. prior art systems known as PlumbingVoid® and Pipe-Void) which is bearing on soil within the active zone or other material that is bearing on soil within the active zone. The threaded rods typically extend up into the thickness of the concrete slab with some form of anchorage (including but not limited to a secondary nut) so that the slab can act as another support; however, the primary nut stays in place and is not removed because the operations of pouring the concrete slab and allowing it to cure prohibit any kind of convenient access underneath to remove the primary nut. Indirect Bear Systems do not have a reliable means of avoiding the risk that expansive soil could damage under-slab utilities; and, there can even be a risk of a much larger amount of damage than with Direct Bear Systems if any hangers in contact with soil corrode and pipes fall or if any soil retaining systems fail and pipes shift dramatically.

Both Direct Bear Systems and Indirect Bear Systems can allow volumetric changes (vertically and horizontally) in the active zone to cause forces to bear on the utilities which can cause the utilities to shift (including but not limited to deflecting up or down over certain regions of utility piping, breaking utilities, or causing them to leak). The Indirect Bear Systems are not capable of resisting the forces like foundation elements such as drilled piers, driven piles and sufficiently deep footings. When utilities shift too much, the utilities cannot function properly. For example, sanitary sewer piping typically requires sewage flow downhill and any portions that bend after construction, in any direction, can cause sewage to not flow properly. Even if flexible joints are installed in these utilities, the pipes themselves (including but not limited to PVC, cast iron and ductile iron piping) are typically not capable of flexing as much as they may need to flex and maintain a positive slope for drainage. Unlike maintenance of sanitary sewer under crawl-space and slab-on-grade type foundations, maintenance of utilities is relatively difficult and expensive because convenient access directly to or directly above the area of concern cannot be provided, and Indirect Bear Systems often create additional obstacles to such repairs.

It is, therefore, desirable to have a system that does not bear (directly or indirectly) on any soil within the active zone but rather bears on structural elements that are bearing on soil below the active zone and/or are designed to sufficiently resist the vertical forces associated with volumetric changes in the active zone by virtue of their penetration below the active zone.

Additionally, Indirect Bear Systems are generally proprietary systems which require relying on components of the system to retain soil so that soil does not fall, slide, push, deflect, rotate, or otherwise either directly cause forces on the utilities or indirectly by means of becoming a shim where a void was intended (including but not limited to under the utility piping, above the utility piping, on either side adjacent to the utility piping, and related to any permanent system element such as saddles and hangers) to isolate the utility from potential soil-related forces, which can cause utilities to no longer function as intended and require relatively expensive maintenance. One reason these systems typically require that the proprietary components retain soil is that the systems are too wide for the main layer of void forms (immediately under the slab) to structurally span over them and reliably support rebar, workers, and wet concrete until the concrete cures. The problem with these proprietary retaining elements is that these systems have not been designed by structural engineers and there is insufficient evidence that they can reliably retain soil after construction for many common conditions which are necessary for typical construction. For example, a horizontal layer of plywood supports several feet of soil in the SuperVoid system. And, as another example, ½" thick plastic retainer boards with the manufacturer claiming that they are acceptable to a depth of 8 feet but the height of the soil to be retained in not limited, which could lead an installer to install a retaining wall that is 8 feet tall made entirely out of ½" thick plastic retainer board and these systems can fail.

Therefore, there is a need for a system that allows soil retainage aspects to be designed by qualified design professionals for each specific application, using methods in the prior art (including but not limited to temporary vertical cuts in cohesive soil where there is an acceptable factor of safety, sloping the grade to an acceptable stable slope such as the angle of repose for cohesionless soils, and installing permanent concrete retaining walls that become buried underground but do not extend above the bottom of the main layer of void forms immediately under the concrete slab).

Also, Indirect Bear Systems are typically buried under soil as utility lines elevations vary in depth below the slabs, which exposes the hanger (typically a threaded rod) to soil which can corrode the hanger over time if it is made of a corrodible material. The main reason that these systems are buried is that, since they are too wide for boxes above to span over them, they have to support soil above them and retain soil adjacent to them and therefore it is desired to have the soil retaining elements span as short a distance as possible. If the hanger corrodes sufficiently, it can cause the support system to fail which can cause the utilities to not function and require relatively expensive repairs. The primary nut typically needs to only support empty piping before the slab is poured. After the slab is poured and cured, as piping is filled with fluids and emptied during occupancy, the hangers support a larger load than the system supporting the primary nut was designed to support and the hangers begin to support a dynamic (not static) load which can cause failure of hangers upon jarring. Under occupied conditions, these hangers can fail if corroded.

It is, therefore, desirable to have a system that does not allow soil to contact any of the hanger assemblies. Furthermore, generally corrosion resistant materials such as fiberglass, aluminum, stainless steel and galvanized steel are available with for use in this invention to resist any ambient sub-slab moisture for an even longer useful life expectancy.

Also, since Indirect Bear Systems retain soil, the inspections required by the building code are hindered by the soil retaining components of those systems.

A desirable solution, therefore, allows full inspection of piping as required by building codes.

In Indirect Bear Systems, because they retain soil, there is not sufficient height in the systems to accommodate a sufficiently long hinge pipe with void space underneath, a rotating joint at the end of the slab-hung length of utility piping and a rotating and telescoping joint at the soil-supported end of the hinge pipe to transition between the two systems at the exterior of the grade beam. This arrangement is necessary so that, if the potential vertical movement occurs upward, the utility piping will not slope less than the minimum permitted by applicable regulations. If the potential vertical movement downward occurs, then the utility piping will not exceed any maximum slope permitted by applicable regulations.

It is, therefore, desirable to have as system that allows independent soil retaining systems so that a hinge pipe can be installed to successfully transition between slab-hung and soil-supported sections of utility piping and can utilize rotating and telescoping joints available in the prior art.

Also, Indirect Bear Systems are difficult to access after construction if it is necessary to maintain them.

It is, therefore, desirable to have a system that avoids the need for maintenance associated with damage caused by expansive soil, which can happen in the prior art as noted above. It is also desirable to have a system that allows independently designed soil retaining systems so that design professionals can create sufficiently large void spaces along the sides of the utility piping that can be more-easily accessed horizontally through openings in exterior grade beams by removing exterior backfill (rather than cutting temporary access openings vertically into the slabs and hand-digging from the opening to pipe location which can often be far from the nearest potential location for a temporary slab opening).

An example of an Indirect Bear System in the prior art device aimed at addressing the issue of damage caused by expansive soils is the PlumbingVoid® product by VoidForm, which includes a unit having a plurality of members that, when used in combination, is intended to create a self-contained void space for the safe routing of plumbing lines, electrical lines and other conduits underground. The unit includes a plurality of selectively arrayed panel sections coupled together to form a routing path. The panel sections are supported with a plurality of braces/connectors for stability. Additional panels may be added over the top of the panel sections so as to enclose the space. Pipe is laid within the space and elevated as necessary to ensure proper drainage. Elevation is secured through the use of a clevis bracket and threaded rod configured to extend out through the space and panel sections. A fastener and washer combination is used to provide temporary support for the pipe being supported by the braces/connectors. By modifying the panel sections, routes may be customized to accommodate plumbing needs. However, this system does not isolate the utilities from expansive soil because it is an Indirect Bear System and, as noted by SEAoT in their 14 page rationale statement supporting their proposed code change to prohibit Indirect Bear Systems, the PlumbingVoid product does not sufficiently isolate utilities from expansive soil. A common PlumbingVoid detail that has been used has interior spacers "above or below pipe" which can contact the pipe and impart loads onto the piping if the soil swells or shrinks and causes the box to shift up or down more than the gap between the pipe and the interior spacers. No specific elevation for the spacers is provided on the detail and specifiers typically do not specify any clearance dimension above or below the pipe. The purpose of the spacers is to provide an intermediate bracepoint for the retaining boards, which are not designed by an Engineer for the site conditions in the standard product, to prevent excessive deflection which could pinch the pipe and cause damage. For this reason, the interior spacers are typically near the piping and so this is a legitimate concern. In addition, the U-bars at the bottom are often bare steel without any protective coating and in contact with soil such that they could corrode and fail even though they are structurally necessary to keep the two vertical retainer boards separated enough so that they do not fail and pinch the pipes, which could cause the pipes to break. It has been suggested that a "knife-edge" will occur so that no load will push the box up from the bottom; however, SEAoT indicates they believe this is an incorrect theory because, while soil does expand when it gets wet, expansive soil does not become a fluid as is evidenced by the fact that it has sufficient internal compressive strength to impart significant upward pressures and a layer of dry soil can naturally occur over a layer that becomes wet such as with deep seated swell that has been observed in many forensic investigations. The PlumbingVoid® Washer is a large washer that is intended to fold in between two U-Bars when the box is pushed upward when soil swells. Until this folds, there is a load imparted onto the hanger so that it could buckle the hanger, especially if the hanger is about 7 feet long as the manufacturer's detail indicates it is applicable with trenches that are 8 feet deep. If the rod does not fail, the rod will impart load onto the slab that the slab must be designed for. A Structural Engineer designing the slab would need to know the locations of these hangers and design the slab to resist these loads. If the soil shrinks, the soil above the box would weigh down the top of the box, which would not allow failure of the washer and this would create an additional tension on the hanger which it was not designed for. Failure of the rod in tension could cause the plumbing to shift downward and break or require maintenance. If the soil shrinks, the bottom and sides of the box would shift down with the soil whereas the top could be suspended at the original installation elevation. If the vertical legs of the top U-Bars are not long enough, the bottom of the box could slide down enough that the top U-Bars no longer provide sufficient lateral bracing of the vertical retainer boards. If the tops of the vertical retainer board fall inward, the shifting elements could break the plumbing and/or cause shifting that requires maintenance. A ½" thick retainer board is shown typically on each side where the detail indicates there could be 8 feet of hydrostatic soil load from a cohesionless strata; if this retainer board is not thick enough to resist the lateral soil pressures at the depths installed, the retainer board could fail inward and damage a utility pipe. The detail calls for soil to be backfilled against the retaining boards, but equipment loading can be significant. Also, there does not appear to be any typical specification expected for lateral movement associated with swelling in a typical detail that has been used in industry. Swelling of expansive soil is a three-dimensional phenomenon and some lateral movement should be expected which may cause the pipes to pinch and break or service disrupted if there is not sufficient space on each side of the clevis hangers. In applications where the PlumbingVoid® product has been used, the product may not have had sufficient vertical leg length of the U-Bar, minimum clearance above and below the piping, minimum load capacity of the sacrificial washer to support plumbing during initial installation, and maximum ultimate load capacity of the sacrificial washer. A threaded rod and clevis support is shown in the typical detail to be in contact with soil that could cause corrosion if the Mechanical Engineer specifies steel unless it is protected in an approved manner or made of fiberglass. If the hanger and/or clevis support corrodes, the plumbing may shift downward and need maintenance in an area where maintenance is difficult to access. Mis-installations have been encountered in industry indicating that it is difficult for a plumber to understand the structural and geotechnical significance of the small details associated with the customization of the generic assembly for a specific application, thereby foiling the attempt to properly partially isolate the plumbing even further.

Another example of an Indirect Bear System in the prior art device aimed at addressing the issue of damage caused by expansive soils is the PipeVoid System manufactured by SuperVoid in which an expanded metal lath shape supports oriented strand board or plywood under an under-slab utility pipe that is buried in soil over the apparatus. This soil is placed on top of the SuperVoid product and plumbing is placed on that soil, with hangers extending vertically to be received by the slab when the slab is installed. If expansive soil swells under the assembly, the soil can cause the SuperVoid product to lift up, which would cause the soil to lift up, which would cause the plumbing to lift up in places. This uplift can be contrary to the hanger and clevis support which can anchor the pipe at a fixed location at supports, causing distortion in sanitary sewer lines that may cause clogs or break the lines. The SuperVoid product is comprised of expanded metal lath and plywood. It is not likely that the expanded metal lath would corrode sufficiently soon after occupancy. Some have claimed that these products cannot transfer load because they form a "knife edge" where the soil splits as it heaves. This is an invalid theory which assumes soil is a fluid when expansive soil is associated with moisture migration through partially saturated soils that can leave soils near the surface relatively dry as soil deeper down in an expansive strata swell as a "deep seated swell". In reality, just as expansive soil has proven to push piping up when buried, expansive soil can push up on any material. The pressure required to resist all swell in these circumstances if often thousands of pounds per square foot; the metal lath product is not sufficient to resist these loads. If the expanded metal lath compresses like a spring, there still is load that is transferred upward that the plumbing is not designed to accommodate. And, many Mechanical Engineers do not have the training or experience to predict what the stresses and strains in the plumbing would be under these circumstances, much less verify that they will not damage the piping or interrupt service. In addition, if expansive soil swells on each side of the assembly, the soil can cause the plumbing to lift up in places. A typical detail used for the product calls for cohesionless, granular material; however, expansive soil swells laterally and upward, which can cause compression arches to form and transmit load onto the piping, even in cohesionless, granular material. Furthermore, this approach uses plywood to retain the soil above a voidspace but the plywood may decay over time and cause the soil to cave in under the piping, which could allow expansive soil swelling to push pipes upward, even though the hangers and clevis system would resist this upward movement, and also create the plumbing problems described above. If the rod does not fail in buckling, the rod will impart load onto the slab that the slab must be designed for. A Structural Engineer would need to know the locations of these hangers and verify that the slab can resist these loads. If the soil shrinks, the soil above the plumbing could drag down the plumbing which is at fixed elevations at each hanger, which could require maintenance. The plywood is covered on top with a covering, but the bottom is exposed to moisture from the subgrade, which is typically sufficient to degrade carton voidforms soon after construction. In addition, the soil retainers are shown to sit on the ground when installed and not have any extension buried below the trench subgrade. If the expanded metal lath does corrode, the plastic soil retainers on each side do not have sufficient resistance at the bottom to prevent lateral movement caused by soil loading, which could cause material to fill into the proposed voidspace. A galvanized threaded rod and clevis support is shown in contact with soil that could cause corrosion. If the hanger and/or clevis support corrodes, the plumbing may shift downward and need maintenance in an area where maintenance is difficult to access.

Another example of an Indirect Bear System in the prior art device aimed at addressing the issue of damage caused by expansive soils is the PipeVoid System manufactured by SuperVoid in which an expanded metal lath shape supports oriented strand board or plywood over an under-slab utility pipe, wherein various soil materials are installed over the oriented strand board or plywood. In this application, many concerns are similar to those expressed for the above example with the PipeVoid product under the under-slab utility pipe. In this application though, there is a SuperVoid product which provides no voidspace above the plumbing in case the soil shrinks. In this version of the typical detail, it is possible for the plywood to decay at the initial suspension nut which would theoretically allow the system to slip upward. However, a threaded rod as part of a hanger assembly could cause compression on the hanger that could cause it to buckle, especially given the note on the typical detail to not compact soil above the plywood. In this typical detail, the plywood deteriorating could allow soil to fall down under the piping and fill in the voidspace, which would allow expansive soil to heave and cause the plumbing to shift upward. If the soil shrinks, the soil above the box would weigh down the top of the box, which would create an additional tension on the hanger which it was not designed for. Failure of the rod in tension could cause the plumbing to shift downward and break or require maintenance. There does not appear to be any specification in the detail accounting for lateral movement associated with swelling. Swelling of expansive soil is a three-dimensional phenomenon and some lateral movement should be expected which may cause the pipes to pinch and break or service disrupted if there is not sufficient space on each side of the clevis hangers.

Yet other examples of Indirect Bear Systems in the prior art are specified on construction documents issued by Mechanical Engineers, such as installing a strut channel over a narrow trench with a hanger assembly suspended by the strut channel. The soil can collapse into the trench because there is no retaining structure. And, additionally, the channel is bearing on the subgrade which can rise or fall with volumetric soil change, which would cause the loads to transfer to the nut supporting the hanger assembly that would then cause the load to transfer into the slab. The slab would need to be designed for this load and, more importantly, the load can cause the threaded rod of the hanger assembly to buckle, causing the utilities to shift and no longer function as intended.

There is, therefore, a need for a system that provides adequate isolation of under-slab utilities from volumetric soil changes under slabs of slab-on-voidform foundations for many project types in geographic locations where soils undergo volumetric changes after initial construction of a project is complete.

Also, when foundation systems are isolated from expansive soil movement by voidforms or crawl spaces, if one attempts to isolate any slab-hung (at essentially a constant elevation) under-slab utilities (including but not limited to sanitary sewer systems, domestic water lines, fire protection lines, roof drains, natural gas lines, electrical conductors, telecommunications systems, etc. . . . ) from expansive soil, it is necessary to successfully transition utilities to a soil-supported utility condition at the building perimeter.

One challenge to transition when applied to a crawlspace foundation is that, because the site beyond the perimeter of a crawlspace foundation typically has expansive soil which can cause problems as systems must transition from a building condition to a site condition. Consequently, it is common for sanitary sewer plumbing systems to be installed wherein the under-slab plumbing near the perimeter is not hung over an under-utility space but rather buried in the subgrade because main sanitary sewer lines which serve the under-slab utility line are typically very deep considering that traditionally sanitary sewer systems operate by gravity flow where possible. Where under-slab utilities under crawlspace building foundations are not isolated, which can often extend very far into the interior of a building where a progressively deep sanitary sewer main is installed under a building to collect wastewater from many fixtures, expansive soil often causes damage to the under-slab utilities needing repair. Crawlspace foundations are required by the many building codes to have access and ventilation. Where such access and ventilation are provided, it is possible to dig up a buried utility line and repair the line, but clear height conditions are often extremely limited to make the construction as economical, making these utility repairs sometimes more expensive than with a slab-on-grade system, and the repairs are not necessarily permanent because the underlying cause of the problem can continue over and over again with time.

Flexible expansion joints have been used in the prior art, such as those describe in IAPMO PS 51, Industry Standard for Expansion Joints and Flexible Expansion Joints for DWV Piping Systems as published by the International Association of Plumbing and Mechanical Officials (IAPMO), in which DWV Piping refers to drain, waste and vent piping used in sanitary sewer systems. A flexible expansion joint can have a telescoping fitting that allows axial contraction and elongation with a rotating fitting at each end wherein each end rotates, with internal gaskets that can be suitable for sanitary sewer systems and a different arrangement of internal gaskets that can be suitable for pressurized water applications such as domestic water or automatic fire sprinkler water supply pipes. Thus, flexible expansion joints can allow one end of the fixture to be at a constant elevation while the other end can lift or drop vertically, and in theory they can lift or drop the magnitude of the potential vertical movement caused by volumetric soil changes. However, there are challenges with installing such a fixture.

For example, if the flexible expansion joint is buried in soil, expansive soil may cause damage to the length of the pipe between rotating ends, which the pipe is not designed to withstand. Additionally, if the flexible expansion joint is buried in soil, it will reduce the useful life of the fixture compared to unburied conditions because it is has moving parts in soil. Over time, through cyclical flexing, soil particles can intrude and interfere with the intended operation of the moving components. If the flexible expansion joint is buried, it cannot easily be inspected during the life of the facility and replaced as needed. In fact, applicable regulations require certain fixtures like this be accessible for this reason. Also, if the flexible expansion joint is not buried, one end will need to be soil supported. At the soil-supported end, to successfully isolate the fixture from expansive soil, the soil needs to be retained so that the soil does not encroach on the clear vertical distance required under the length of the fixture to allow for the soil to rise the estimated potential vertical movement. The retaining structure, however, cannot be part of the foundation but must rather be soil-supported and allow for the estimated potential vertical movement up or down. At the building perimeter, however, there needs to be a foundation element such as a grade beam, which is to remain at essentially a constant elevation. If one were to simply have soil-supported piping outside of the building extending from an unfilled trench through a vertically slotted hole, the weight of the fixture when being installed or replaced could cause a structural instability which would lift the soil-supported pipe, causing it to rotate which could damage the plumbing and possibly cause injury. Furthermore, in the conditions for the case described above, any pressure on the piping up or down would cause the pipe to push up or down on the soil-retaining system, which can damage the pipe. Also in these conditions, any footing/counter-weight to address or pipe protection system to address issues could change the potential vertical movement of the soil at those elements, which could cause a negative drainage scenario (where water drains to the building instead of away, potentially causing more vertical movement than originally estimated) if the soil at the plan locations of such system has a lower potential vertical movement than the soil around such system. Also, any systems such as those described cannot be bonded to the utility line, which may need to be replaced over the life of the facility. Also, mechanical engineers typically design and specify utilities up to 5 feet from the building perimeter with civil engineers specifying the work beyond, and there is a desire to keep any kind of transition system within this boundary so as to stay within the scope of a single design discipline and avoid the expensive miscoordination that can occur if a site utility plan is designed assuming utilities can be run without consideration of a transition system up to 5 feet away from a building perimeter and there is a conflict discovered after installation of site utilities which requires that an entire site utility system be removed and replaced simply because the industry commonly understands the basic scope of a mechanical engineer designing utilities to end 5 feet away from a building.

Furthermore, methods in the prior art for clamping, such as a standard pipe clamp and standard pipe strap are not sufficient for clamping onto a non-structural pipe and mounting it onto a perpendicular concrete element such as a gradebeam with an over-sized hole so that the clamp can resist axial forces in either direction, transverse forces, and moments to allow a non-structural pipe such as a pvc sanitary sewer pipe can cantilever out to support an end of a flexible expansion joint, especially not a clamp in the prior art that can also be adjusted and remounted.

In the prior art, a standard clamp consists of two halves that are bolted together and, when bolted together, they form a circular opening that can be clamped around a pipe. Each half of the standard clamp has flanges that extend so that, for example, a vertical pipe can be clamped and supported vertically on a horizontal surface but this does not resist upward movement on the pipe and it does not resist transverse movement. In general, it is not typically necessary to anchor anything to a standard clap because the pipe itself can be supported and braced as necessary. In and of itself, a standard clamp is not capable of being bolted to a surface that is perpendicular to the pipe unless potentially bolts are inserted in between gaps between the two halves of the clamp, and in this case the distances of the bolts from the pipe in standard configurations are generally not sufficient to avoid reinforcement in a concrete element and have sufficient edge distance to comply with minimum building code requirements or to provide a sufficiently large enough diameter bolt to be capable of resisting the required forces. For example, most building codes require that plumbing be isolated from any elements with felt or a gap so that the plumbing can be removed and replaced over time if necessary, and the oversizing of the hole for this alone can make it difficult for bolts through the gap between halves of a pipe clamp to be successful, and if the pipe elevation needs to be adjusted after mounting it is likely that the new location will partially overlap with the old bolt and make it necessary to core out the old bolt and make the remediation even more expensive.

A standard pipe strap is a method of mounting a pipe to a surface, however it is only suitable for mounting a pipe that is parallel to a concrete face whereas a pipe needs to cantilever out perpendicular from a foundation element to support a flexible expansion joint in this invention. In the prior art, attempts have been made to try to geometrically arrange a concrete face in parallel with a pipe and use a pair of standard pipe straps so as to accommodate the need for resistance to axial forces, transverse forces and moments and provide construction tolerance in vertical elevation, however such attempts require an elaborate geometry be constructed with a concrete protrusion cantilevered from a foundation for this purpose and the field tolerances on the plan location of such a parallel face must be relatively precise, and this approach has proven difficult in the field because it is not adjustable.

Another problem is that attempting to fabricate some kind of brace in the field raises other concerns. For use with a system that protects plumbing under a slab of a slab-on-voidform foundation, it is necessary by some building code provisions for components subject to corrosion to be protected in an approved manner and not simply be unprotected steel. If a standard pipe clamp is modified in the field by welding it to a support element such as a steel component that is galvanized, the welding process will destroy the galvanized coating that protects the steel from initial corrosion. If a standard pipe clamp is modified in the field by welding it to a support element such as a component that is stainless steel, the welding process will be expensive because a stainless-steel welding operation will need to be set up on a project. Furthermore, it may be difficult to get proper access to do welding, for a welding rod to reach where it needs to reach, and for proper inspection of a weld between a standard clamp in the field and any other component used in an attempt to stabilize a standard pipe clamp. Plastic components can break in the field if overstressed during installation and/or field modification.

There is, therefore, a need for an improved method of transitioning under-slab utilities of isolated foundation systems to soil-supported utility conditions suitable for both crawlspace foundations as well as slab-on-voidform foundations.

Also, voidforms are not sufficiently rigid for a sufficient time to provide support to under-slab utilities under slab-on-voidform foundations before the slab is poured. Therefore, utility suspension systems must bear on the ground. Foundation elements can do this, but they are typically far apart so that a reinforced concrete slab can span between them, which makes it an added cost to install a utility framing system that bears only on foundation elements. Any support that bears on the ground itself is not acceptable if it can allow forces from volumetric soil changes to push/pull on utilities and/or foundations and cause damage.

Therefore, there is a need for a method and system whereby a framing system that is flexibly positioned and does not bear on the ground.

Also, it is necessary to retain soil when supporting under-slab utilities over a voidspace that extends below the main layer of voidforms under a slab-on-voidform foundation slab. And, it is common that under-slab utilities, and voidspaces under those utilities, need to extend below the main layer of voidforms if it is desired to effectively isolate them from expansive soil. Benching soil to retain this soil is problematic because it is time-consuming to map out in 3 dimensional space how to retain soil to protect the distributing piping systems for under-slab utilities which can be complex, and it is time consuming to grade the benched trenches to the proper elevation so that when voidforms are placed the bottom of the slab is at the correct elevation, and soil can slough off into the trench, requiring time-consuming, regular maintenance of the trenches as well as risking loss of support for the boxes above which could require either excavating a wider trench or trying to reconstruct the sloped soil of the original excavation. The time required is a challenge in that it costs a lot for labor but also challenging in that carton voidforms often used in slab-on-voidform foundations need to be placed on a dry subgrade and concrete poured before a rain event occurs (to avoid deterioration of the carton voidforms which could cause the voidforms to collapse when placing fresh concrete, and it can be difficult to find sufficient dry periods in the weather to accomplish all that is needed when the sides of the trenches need to be benched. The only alternative to benching when the utilities are below the bottom of the main layer of voidforms is to install a relatively short retaining structure (often less than 4 feet in height) which can be more expensive than benching if methods of installing a retaining structure in the prior art are used. Retaining structures are expensive to form with formwork and expensive in that they need to extend deep enough below the bottom of the utility trench so as to sufficiently resist overturning and sliding from soil pressures behind the retaining structure as the building codes require retaining structures have a minimum factor of safety of 1.5 against overturning and sliding. These type of retaining structures are typically concrete, reinforced with conventional rebar, that requires additional labor costs, materials costs and time which increases the construction schedule on a project. A challenge with utility trench walls under slab-on-voidform foundations is that the soil is typically a highly expansive clay, which the International Building Code deems "unsuitable" for use behind a retaining structure. Complicating and making retaining structures in the prior art more expensive is the fact that expansive soil can create very large lateral pressures on retaining structures when the expansive soil swells due to moisture content changes, and there is wide disagreement within the Geotechnical Engineering community on how great these pressures are, with some indicating that may be thousands of pounds per square foot. Many Geotechnical Engineers recommend that all expansive soil be removed behind a retaining structure and be replaced with less expansive "select" fill. There has been litigation claiming engineers were negligent for allowing expansive soil backfill behind a retaining structure but not accounting for the amount of rotation that can occur when these walls are embedded in the ground, as is common in the industry. It is also expensive and risky to cut voidforms around intricate spaces of complex plumbing distribution systems in the plumbing trenches. Manufacturers of such voidforms do not recommend overly-cutting the forms because they are designed to collapse in their manufactured "whole" condition. The risk is that the voidforms could collapse when placing concrete.

Therefore, there is a need for an underslab utility suspension system that incorporates improved soil retention suitable for both crawlspace foundations as well as slab-on-voidform foundations.

SUMMARY OF THE INVENTION

The present invention solves the above-described problems. In one aspect, it provides a system and method of using a utility support framing system for slab-on-voidform foundation systems. In another aspect it provides a method and system whereby a framing system for suspending underslab utilities can be flexibly positioned and does not bear on the ground. In another aspect, it provides a method and system that allows soil retainage employing vertical cuts in cohesive soil, sloping the grade to an acceptable stable slope, installing conventional permanent retaining structures and installing inventive mobile retaining walls that are permanent concrete retaining walls that become buried underground but do not extend above the bottom of the main layer of void forms immediately under a concrete slab so as to be capable of sliding when exposed to sufficient lateral expansion pressures from retained soil. The invention also provides a system and method for an under-slab utility suspension system that incorporates improved soil retention suitable for both crawlspace foundations as well as slab-on-voidform foundations. In another aspect, the invention provides a method for successfully transitioning utilities to soil-supported conditions at a building perimeter where a slab-on-voidform foundation or a crawlspace foundation is used. In yet another aspect, it provides for an inventive clamp and method of using the same where the clamp resists axial forces, transverse forces and moments, especially when a pair of the clamps are used in tandem, such as would be necessary for a pipe to cantilever out from a foundation gradebeam that is perpendicular to a utility pipe, and support one end of a flexible expansion joint. In yet another aspect, the invention includes an inventive protective utility counterweight for use around a utility pipe so as to prevent the utility pipe from breaking that is also sufficiently rigid to cantilever support of a utility pipe through an opening in a foundation element, that resists overturning when it cantilevers support of a utility pipe through an opening in a foundation element, and that allows for removal and replacement of a utility pipe.

For purposes of this disclosure, the term slab-on-voidform foundation means a foundation system, for a building, wherein there is a slab located immediately above a voidform system and said slab is capable of structurally spanning over said voidform system after construction of the building is complete, without needing the voidform system to provide any means of structural support. The slab of a slab-on-voidform system is the lowest floor at the floorplan area location of the slab, wherein occupants can either walk directly on the slab or on a flooring system that is installed on top of the slab. The slab of a slab-on-voidform foundation is primarily concrete and is reinforced with conventional reinforcement bars or post-tensioned cables. Examples of buildings that can have slab-on-voidform foundations are government buildings, schools, churches, office buildings, banks, retail stores, parking garages, industrial buildings, agricultural buildings, storage buildings, multi-family facilities and single-family residences.

For the purposes of this disclosure, a slab of a slab-on-voidform foundation is a reinforced concrete slab system that is installed over voidforms and attached to foundation elements. As an example, many slabs of slab-on-voidform foundations are installed in stages, with a vapor barrier placed on top of voidforms, then slab reinforcement installed on reinforcement supports that are placed on top of the vapor barrier, then concrete poured on top of the vapor barrier to encase most or all of the slab reinforcement. Where a vapor barrier is installed immediately under a slab of a slab-on-voidform foundation, the vapor barrier shall be considered a part of the slab. As another example, some slabs of slab-on-voidform foundations are installed in stages, with post-tensioning cables installed on cable supports that are placed on top of voidforms, then concrete poured on top of the voidforms to encase most or all of the slab reinforcement, then post-tensioning cables tensioned.

For purposes of this disclosure, a voidform system is a system that is structurally supported by a subgrade and is capable of structurally supporting a concrete slab of a slab-on-voidform foundation, wherein no part of the voidform system is a foundation element, wherein no part of the voidform system is a framing system, wherein no part of the voidform system is a vapor barrier and related vapor barrier components, wherein the majority of the voidform system is not manually removed after said concrete slab is installed, and wherein the system either partially or completely consists of a configuration of material that is:

- degradable in that said configuration of material loses the majority of its vertical compression capacity after said configuration of material has been exposed to 100% humidity for 120 days, when compared to the vertical compression capacity of the configuration of material with said configuration of material when originally manufactured;
- compressible in that the configuration of material compresses at least ½ inch when a vertical compressive load is applied that is equal to the tributary dead load of the slab plus the tributary portion of the ultimate upward load capacity of the slab 28 days after the concrete is poured for the slab; or
- hollow in that the geometric configuration of material is such that at least 25% of a horizontal cross-section of the void system is open, not any type of solid material.

For the purposes of determining if a majority of a type of formwork is not manually removed in order to determine if a type of formwork meets the definition of a voidform, the formwork is a voidform if it is not removed from a majority (e.g. 51%) of the slab area of the formwork wherein formwork is removed completely between the slab and the subgrade. In a hybrid foundation, consisting of more than one type of formwork, determination if a type of formwork meets the definition of a voidform is made separately for each type of formwork (e.g. areas where temporary lumber shoring has been removed are not relevant to the determination of whether traditional carton voidforms are voidforms).

Examples of voidform systems include degradable corrugated paper voidforms, often with vertical partitions creating a cellular configuration with sets of these cells surrounded by corrugated paper, all produced with varying degrees of moisture protection as follows or in various combinations. "Uncoated" describes corrugated paper voidforms that have no protective material used to either coat or impregnate the forms, and therefore are not protected from water, soil, moisture, insects, or micro-organisms. "Wax Coated" describes a process that is used to coat only the exterior liner surface of corrugated paper voidforms. This process temporarily helps maintain structural integrity, should the corrugated paper voidforms come in contact with moisture before or during the foundation construction. "Wax Impregnated" describes the result of a process that saturates individual papers used to manufacture corrugated paper voidforms with wax. Fully wax impregnated describes the result of a manufacturing process where all paper components (e.g. liners and mediums) are wax impregnated.

Compressible and/or hollow metal voidforms, are lightweight metal components that are fabricated to configure a voidspace system. An example is an expanded sheet metal material that is repetitively slit and pulled to expand into diamond shape open areas leaving connecting strands of metal having an average open space of 75 to 80 percent. The material in one example can be formed into a configuration of corrugated vertical segments. Metal voidforms can be compressible and can be hollow.

Degradable molded paper voidforms, made from 100% recovered paper pulp, recycled paper, and/or recovered Kraft paper slurries that are shaped into a product. Compressible and/or hollow plastic voidforms or compressible and/or hollow hybrid plastic and corrugated paper voidforms, with plastic elements that can be made from up to 100% recycled plastic, often polypropylene. Hybrid plastic and corrugated paper voidforms can consist of vertical plastic partitions creating a cellular configuration with corrugated paper material that surrounds sets of vertical plastic partitions.

Compressible and/or hollow Styrofoam voidforms are molded into an upside-down "U"-shaped or a box-shaped voidform. Compressible Styrofoam voidforms are solid but have sufficient compressibility. They may include compressible conglomerations of smaller particles, such as uncompacted soil, loose sand, uncompacted cinders, and/or styrofoam peanuts, having sufficient compressibility overall in their conglomerated configuration.

Examples of systems that provide formwork over a subgrade but are not voidform systems are:

Slab on metal deck, wherein the metal deck forms the bottom of a slab but it also structurally spans between steel beams that are foundation elements of a composite slab over a conventional crawlspace;

Slab over temporary wooden formwork, wherein the majority of the wooden formwork is manually removed after the slab is installed; and Slab on grade wherein the slab is poured over a vapor barrier sheet or a vapor retarder sheet that covers the ground, wherein the sheet does not sufficiently degrade or compress and is not sufficiently hollow.

For purposes of this disclosure a foundation element is a component of a foundation for a building, not including a slab of a slab-on-voidform foundation, not including a voidform system and not including a framing system. A foundation element is a structural member or connection between structural members, wherein the members are commonly identified or addressed somewhere on foundation drawings or specifications, structural drawings or specifications, or architectural drawings or specifications. Examples of materials that typically comprise a foundation element are concrete, steel, aluminum, masonry, timber, fiber reinforced polymer or a combination of these materials. A foundation element is not a microscopic element, not a theoretically infinitesimally small element, and not a portion of a larger element that is manufactured at one time. A foundation element is necessary for the structural functions of a foundation after construction of the building is complete, wherein a portion or portions of a foundation element may not be necessary but some portion of a foundation element is necessary. Furthermore, foundation elements are configured to be capable of being installed before the slab is installed. Examples of foundation elements are drilled concrete piers, augured cast in place piles, steel piles, helical piles, micropiles, timber piles, pier caps, pile caps, gradebeams or walls that are poured directly on the ground, gradebeams or walls that are poured over a system that is similar to a voidform system for a slab, steel columns and steel beams. Where the primary slab and other concrete elements are integrally poured together at the same time, such as drop panels around drilled concrete piers or thickened slab areas for slab recesses or internal stiffening beams, the other concrete elements that are integrally poured together with the primary slab at the same time are parts of the slab and are therefore not foundation elements.

For purposes of this disclosure, a subgrade within the perimeter of a slab-on-voidform foundation is material over which a voidform system is placed in the construction of a slab-on-voidform foundation, wherein said material is not a part of a foundation element. Examples of subgrade material are clay, sand, silt, rocks, water, naturally occurring organic material, and combinations of these materials. Subgrade material also includes any manufactured materials, other than foundation elements, that are present when a voidform system is placed over the subgrade, with some examples being polyethylene vapor barrier sheeting, polyethylene vapor retarder sheeting, injected lime slurry, injected proprietary chemical slurries, unreinforced concrete slabs-on-grade such as those commonly called "mudslabs", and sometimes debris like in a landfill or existing construction to be abandoned such as an existing reinforced slab-on-grade.

For purposes of this disclosure, a hanger assembly is a system that provides support to an under-slab utility at one point along the length of the utility system, and the hanger assembly is supported by a framing system. A hanger assembly does not include any components of the under-slab utility itself. Common examples of conventional hanger assembly components are adjustable clevis hangers, threaded rods, nuts and washers. Another example of hanger assembly components could be a pipe clamp that is bolted to a framing system, wherein the pipe could be below or above the framing system, noting that it is still a hanger assembly even if the pipe is located above the framing system such that the hanger assembly is not in tension like a conventional threaded rod that supports a pipe below a framing system. Examples of common hanger assembly materials are galvanized steel, stainless steel, aluminum and fiber reinforced polymer.

For purposes of this disclosure, an under-slab utility is a system underneath a slab of a slab-on-voidform foundation, wherein the system transmits something to the occupants from outside of the building, from the occupants to outside of the building, between areas of the building, or between buildings. Examples of such utility systems are sanitary sewer, domestic water, fire protection, natural gas, outside air for ventilation, heated air, cooled air, electricity, and data systems. It is common for an under-slab utility to include a pipe or conductor system that contains what is being transmitted. While under-slab utilities can often span a limited distance between supports, they typically require supports be located much closer together than the distance apart that foundation elements are typically located in a slab-on-voidform foundation.

For purposes of this disclosure a framing system is a system that consists of at least one beam and at least one beam-to-foundation element connection, wherein a beam-to-foundation element connection provides support to a beam. In this disclosure a "beam" is also referred to as a "utility support member." and the terms beam and utility support member are intended to be used interchangeably. A framing system does not include any foundation elements, does not include a slab of a slab-on-voidform foundation, and does not include voidforms. A beam-to-foundation element connection can consist of one or more members and connectors so as to elevate the supports for the beams in the framing system to a specified elevation relative to the foundation elements. A framing system can include at least one beam-to-beam connection, wherein a beam provides support for another beam. Examples of the components of connections can include plates, angles, brackets, post bases, posts, bolts, washers and nuts. Altogether, a framing system is configured to be capable of being supported by at least one foundation element and capable of supporting the weight of an under-slab utility system at the floorplan location or locations where said support is required for the under-slab utility system. Examples of support patterns for beams of a framing system can be beams simply spanning between two supports, beams supported by three or more supports, beams cantilevered off of a fixed support, and beams cantilevered off of a beam that is supported at two points. Examples of point loading on beams for a framing system can be simple or complex, depending on the specific needs of the project, where a beam could only have one point load at a hanger assembly, could have multiple hangers assemblies on one beam, could be supporting another beam that supports hanger assemblies, could be supporting multiple such beams, and could be supporting one or more such beams while also supporting one or more hanger assemblies.

In one embodiment a method of isolating under-slab utilities from a subgrade under a slab of a slab-on-voidform foundation is employed whereby a framing system is attached to one or more foundation elements of said slab-on-voidform foundation wherein said framing system is configured to not be in contact with subgrade. A hanger assembly is used to suspend a segment of a utility line wherein said hanger assembly is configured to be supported by said framing system and also configured to be above said slab, partially or completely embedded in said slab, or below said slab, wherein said hanger assembly is configured so that said hanger assembly and said utility are to not be in contact with said subgrade. Voidforms are placed over said subgrade and a slab is poured over the voidforms.

In another embodiment a method of isolating under-slab utilities from soil under a slab of a slab-on-voidform foundation is employed whereby a temporary support apparatus is used. In an embodiment a temporary support apparatus is comprised of a stake, a rod and an adjustable support nut is secured in a subgrade. Other configurations of a temporary support apparatus could include a frame which is driven into the subgrade and extends above a slab, could include a structure that is placed on a subgrade and extends sufficiently high enough to provide temporary utility support, could include a variation with a two part structure in which a lower part that bears on a subgrade is not removable after slab reinforcement is installed but an upper part is removable after utilities are suspended by permanent components of a slab-on-voidform foundation, could be comprised of materials such as dimensioned lumber, masonry, light gage steel studs, strut channels, and plastic members. In an embodiment, when a vapor barrier is used and temporary members are removed after a vapor barrier is installed, the vapor barrier could be patched where the removal creates a penetration in the vapor barrier. A framing system comprised of utility support members is attached to the temporary support apparatus, wherein said framing system is configured to not be in contact with the subgrade. A hanger assembly is used to suspend a segment of a utility line, wherein the hanger assembly is configured to be supported by the framing system and also configured to be partially or completely embedded in the slab while not being in contact with said subgrade. Voidforms are then placed over the subgrade, slab reinforcement is installed over reinforcement supports, the utility support framing system is tied to the slab reinforcement, and the rod is then removed from said temporary support apparatus. A slab is then poured over the voidforms.

In another aspect, the invention could include a permanent support apparatus that supports under-slab utilities under a slab of a slab-on-voidform foundation wherein the permanent support apparatus is supported by a subgrade but all components of said permanent support apparatus that are below said slab are not in contact with any portion of an under-slab utility or a hanger assembly for an under-slab utility, thereby transferring all forces associated with volumetric soil changes to said slab or foundation elements which will have a significantly greater ability to resist volumetric soil changes than a typical under-slab utility. This could include a stake, a rod and a support nut similar to an embodiment of a temporary support apparatus as described above but wherein the rod is not removed because the slab is capable of resisting the uplift forces associated with expansive soil pushing up on the stakes. In another embodiment, a permanent support apparatus could be comprised of dimensioned lumber, masonry, cold-formed metal framing studs, strut channels and plastic members.

In an embodiment of an apparatus of the invention, first and second members are employed. Each of the first and second members has: a length in the range of 2 to 24 inches; a first side surface having a width in the range of 1 to 2 inches; a second side surface having a width in the range of 1 to 2 inches; a third side surface having a width in the range of 1 to 2 inches. In the apparatus a third member is connected to the first and second members. The third member spans the distance between the first and second members without intermediate support. The third member has: a length in the range of 12 to 30 feet; a first side surface having a width in the range of 1 to 2 inches; a second side surface having a width in the range of 1 to 2 inches; a third side surface having a width in the range of 1 to 2 inches. The first, second, and third members may be composed of steel, stainless steel aluminum, or fiber reinforced polyurethane.

In one embodiment a utility support framing system of the invention comprises strut channel framing, such as produced by Unistrut or Eaton. In an embodiment the concrete foundation, and the utility support framing system is above a vapor barrier over Masonite over void forms over soil. Also, in an embodiment, a layer of void forms immediately under Masonite, which is a part of the voidforms, comprises a main slab void layer. Below the main slab void layer, a lower void space can be comprised of additional layers of void forms. In a preferred embodiment the void forms comprising the main slab void layer, an additional layer of void forms below and soil define an interstitial space. In another embodiment, an interstitial space is defined by Masonite, the void forms comprising the main slab void layer, and an additional layer of void forms below. In an embodiment, the utility support framing system is used to fasten a fiberglass threaded rod from the strut channel into the interior space. In an embodiment the fiberglass threaded rod is used to suspend a fiberglass saddle that holds utility piping.

In practicing an embodiment of the inventive method a utility support framing system is supported vertically only by foundation elements (including but not limited to piers, caissons, piles, mini-piles, grade beams, and footings) which are designed to resist volumetric soil changes (including but not limited to expansive soil, frost heave, collapsible soil, etc. . . . ) in the active zone by sufficient isolation from soil and/or penetration below the active zone.

Further, the utility support system is installed before the utilities, void forms and reinforced concrete slab are installed and the concrete is cured, allowing the utilities to be installed and inspected before the slab is poured.

It also includes a feature that allows the flow line elevations of the utility piping to be adjusted by adjusting (including, but not limited to, turning the supporting nuts in) the hanger assembly after the framing system deflects, before it is inspected.

Further, there are no components concealing or hindering any utility piping from visual inspection, flow line elevation measurement, and adjustment if inspection identifies any construction defects before a utility is inspected.

It is also located in elevation so that it is above the soil supporting the void forms, thereby creating a void to isolate the utilities from soil movement so that the framing does not need to be removed after the slab is poured.

Additionally, it does not include a soil retaining component in the framing or hanger assembly, which allows void forms to be placed on either side of the piping (including but not limited to typical 4" diameter piping at sanitary sewer lines) so that the main layer of slab void forms immediately under the concrete slab can have a gap or bridge themselves over a gap or be bridged over a gap with degradable material such as Masonite.

The utility support framing system can be located in elevation above the voidforms so that the framing generally does not interrupt the void forms.

Further, the utility support framing system can be encased in the concrete slab (including but not limited to locating the framing between the upper and lower reinforcing bar mats that are common in such slabs, allowing for the framing level itself and the associated deflection of the framing to occur without interrupting the reinforcing bars if the slab is designed to be sufficiently thick, with the flexural requirements for reinforcing bars being reduced if the slab is made any thicker than it would otherwise be) to mitigate concerns with corrosion of the framing and also allow rebar to be installed without interruption (including but not limited to locating the framing in the middle portion of structurally suspended slabs which are less stressed in flexure than the upper and lower zones of the slab thickness and can therefore structurally accommodate interruption by the framing as well as utilizing narrow portions of the slab in plan view at discrete points of support such as piers or piles whereby this limits the impact of this framing on the punching shear capacity of the slab).

It prevents any need for soil to contact hanger assemblies, thereby reducing corrosion potential. It further encases the utility support framing system in the concrete slab itself, so that it has the same level of corrosion protection as the concrete reinforcing bars themselves. And, because these are encased in concrete, even if it does corrode, it will not fall down and cause damage (directly by falling, or indirectly by becoming a shin where a void was intended) to the utility piping as occurs with Indirect Bear Systems.

It can also be installed with hanger assembly materials that are more corrosion resistant (including but not limited to fiberglass, stainless steel, aluminum and galvanized steel)

It also allows design professionals to design a soil retention system using any of the methods available to engineers in the prior art (including but not limited to vertical cuts in cohesive soil with an acceptable factor of safety, sloped grades in cohesion less soil based on the angle of internal friction, retaining structures such as concrete walls, sheet piles, or other systems), and can be used where vertical cuts in soil and/or backfill adjacent to void forms that may overtime allow a slope stability failure of the soil to occur if it is far enough away (including but not limited to a certain multiple of the vertical grade change such as 1.5 or 2 times the height of the soil being retained) so that the design professional does not anticipate any soil falling under the utility piping.

The utility support framing system does not bear (directly or indirectly) on any soil within the active zone because the system instead bears on structural elements that are bearing on soil below the active zone and/or are designed to sufficiently resist the vertical forces associated with volumetric changes in the active zone by virtue of their penetration below the active zone.

Also, the invention allows soil retainage to be designed by qualified design professionals for each specific application, using methods in the prior art (including but not limited to temporary vertical cuts in cohesive soil where there is an acceptable factor of safety, sloping the grade to an acceptable stable slope such as the angle of repose for cohesionless soils, and installing permanent concrete retaining walls). In an embodiment, the invention allows this because the main voidforms bear on lower voidforms with a maximum gap that the main layer of voidforms can reliably bridge with degradable material such as carton void forms. For example, 4" diameter PVC sanitary sewer lines can be installed with lower void forms on each side, slotting the void forms to accommodate any saddles and flanges.

Additionally, the invention does not allow soil in a subgrade to contact any of the hanger assemblies. Furthermore, generally corrosion resistant materials such as fiberglass, aluminum, stainless steel and galvanized steel are available with invention to resist any ambient sub-slab moisture for an even longer useful life expectancy.

The invention allows full inspection of piping as required by building codes.

Further, because the invention allows independent soil retaining systems, a flexible expansion joint can be installed to successfully transition between suspended and soil-supported sections of utility piping. Flexible expansion joints utilize rotating and telescoping joints available in the prior art.

Also, the invention avoids the need for maintenance associated with damage caused by expansive soil or any other type of volumetric soil changes, which can happen in the prior art as noted above. It also allows independently designed soil retaining systems, where design professionals can create sufficiently large void spaces along the sides of the utility piping that can be more-easily accessed horizontally through openings in exterior grade beams by removing exterior backfill (rather than cutting holes vertically into the slabs and hand-digging from the opening to pipe location which can often be over 20 feet from the nearest potential location for a temporary slab opening).

An embodiment of the invention comprises of a protective utility counterweight with a larger pipe and encasing the soil-supported utility line in concrete with a felt separation, with sufficient length and diameter of the protective utility counterweight to provide structural stability to cantilever one end through a vertical slot in a foundation element with the vertical slot having sufficient height to accommodate at least the potential vertical movement up or down from initial position, in which a flexible expansion joint is initially installed at a slope that is the minimum slope required by the applicable plumbing code plus the slope required to allow the soil-supported end to rise at least the estimated potential vertical movement, in which the soil is retained by soil retaining boards that are penetrated by the over-sized pipe of the protective utility counterweight, and there is sufficient length and weight of concrete to provide a minimum factor of safety of 1.5 to resist the overturning associated with the full weight of the flexible expansion joint (applicable when the joint is disconnected from the slab-hung end for installation or replacement), and in which the diameter of the concrete in-fill is sufficient to reduce the bearing stress on the utility to a level that will not damage the utility pipe as it pushes up and down on the concrete which in turn pushes up and down on the soil-retention boards. This embodiment utilizing a protective utility counterweight and a flexible expansion joint, with one or more mountable pipe clamps connecting a suspended utility pipe to a foundation element, fully isolates the suspended portions of utilities from expansive soil changes or any other type of volumetric soil changes. Soil is retained from encroaching under the flexible expansion joint with commercially available materials that can horizontally span the vertically slotted hole to accommodate any height of hole required, wherein these boards can slide up and down along the side of the foundation elements. Further, providing a concrete collar around the utility pipe helps to avoid breaking the utility pipe as it engages the soil retention boards. Also, in an embodiment a counter-weight and retention protection collar that is similar in shape to the utility pipe is provided. This reduces the difference in potential vertical movement, relative to the subgrade adjacent to the utility and outside of a building, while also providing a transitional drainage region over the pipe where the pipe itself beyond the concrete encasement reduces the potential vertical movement also and provides a path for positive drainage. Additionally, protecting the utility with felt that allows replacement of the piping in the future may be incorporated. Furthermore, making the length of the concrete encasement approximately 5 or 6 feet allows specification of the system to fall within the industry standard scope of one design professional (a mechanical engineer) rather than two (a mechanical engineer and a civil engineer).

Additionally, practicing one embodiment of the invention, includes installing all of the foundation elements and a suspended structural support for a mountable pipe clamp, with an oversized opening for a fixed elevation building condition utility pipe and an oversized opening for a protective utility counterweight that allows sufficient vertical clearance above and below the protective utility counterweight to accommodate the potential vertical movement. It next involves installing under-slab utility piping under all building areas, and installing one or more mountable pipe clamps on each side of a suspended structural support so that a utility pipe in a building cantilevers away from a suspended structural support while installing under-slab piping, installing this piping and clamps (with sealant around any piping penetrating an exterior grade beam being a preferred example) before pouring a slab of a slab-on-voidform foundation or after installing a floor structure of a crawlspace foundation. The method then requires excavating outside of the foundation element where a protective utility counterweight will be installed, overexcavating away from the foundation element sufficiently so that the protective utility counterweight can be slid into place through a hole in a slidable retainer board. It then requires installing a slidable retainer board, with a hole sized to receive a protective utility counterweight, onto the side of a foundation element over the oversized hole made to receive a protective utility counterweight, surveying the elevation of the cantilevered pipe and then bolting the top of the slidable retainer board at the elevation which will set the hole in the board at the elevation which accommodates the specified initial vertical offset from the cantilevered pipe of the building. The next step requires compacting subgrade materials under the elevation of the proposed bottom of the protective utility counterweight, with bentonite as an example of a subgrade material against the slidable retaining wall, extending 6" for example past the edges of the slidable retainer board, but stopping a few inches below below the proposed bottom elevation of the protective utility counterweight. Then the protective utility counterweight is lowered into the excavation adjacent to the foundation element, using manpower, a forklift and/or a frame with a winch, and while it is suspended by the lowering mechanism, slide the protective utility counterweight through the hole in the slidable retainer board and then install shims to temporarily maintain the correct elevation of the protective utility counterweight relative to the building condition pipe elevation. Locate one set of shims so that they are at the end furthest away from the slidable retainer board and another set at the end inside the oversized hole in a foundation element which the protective utility counterweight cantilevers through. Next, concrete or flowable concrete fill is installed as a leveling bed of subgrade material under the proposed protective utility counterweight between the slidable retainer board and the set of shims furthest from the slidable retainer board, pouring up to a point below the middle of the protective utility counterweight as needed to stabilize the elevation for the current soil conditions. Install bentonite as an example so that the concrete leveling bed does not contact the slidable retainer board itself. Temporary shims are then remove the temporary shims. Soil supported plumbing from the site is then attached to a utility pipe that extends through the protective utility counterweight, cantilever past the end of the protective utility counterweight so as to receive a flexible expansion joint. Subgrade material is then compacted under, around and on top of the protective utility counterweight to achieve the finished subgrade elevation desired outside of the building. Be careful to not change the elevation of the protective utility counterweight during compaction operations, resetting the pipe if it shifts during compaction operations. A flexible expansion joint is then lowered into the gap between the cantilevered building condition pipe and the cantilevered site condition pipe, connecting the flexible expansion joint to each pipe end. Finally an access hatch or door that may be required by building code or desired to allow inspection and maintenance of the flexible expansion joint is installed.

In an another embodiment, stakes and rods are employed so that the stakes can be hammered into the subgrade for a slab-on-voidform foundation before the voidforms are installed, then the rods can be installed so as to provide temporary support for utility framing, bearing on an adjustable nut that can be set at an elevation compatible with the voidforms height and slab thickness. In an embodiment, a headed bolt could be installed into the stakes to protect the rod during hammering and keep soil/debris from getting into the threaded hole, or a smooth hole, at the top of the stake. The headed bolt can then be removed and the main support rods are then installed, with support nut and utility support framing bearing on the support nut. Then the voidforms are installed and reinforcing bars for the slab of the slab-on-void foundation. Then, before concrete is poured, the utility support framing can be tied with wire to the reinforcing bars (which are supported by the voidforms at that point in the method), and, as this makes the rods no longer necessary, the rods can be removed by hand or mechanically by a wrench, or by installing a double nut or a lock nut or a lock nut and a conventional nut on the rods, above the utility support framing members, and turning the double nut assemblage or lock nut so as to unthread the threaded rod from the support nut, and if the hole in the stake is threaded then remove the stake below as well. An open-ended socket wrench can be used for this purpose. And an open-ended box wrench can be used to stabilize the support nut below while turning the double nut assemblage. The small holes in the voidforms can then be patched with plastic sheeting (typically used as a vapor barrier). This solves the above problem by providing support that is temporarily on the ground before voidforms are installed but then removed after voidforms are in place before concrete is poured.

Another embodiment of the invention includes a retaining structure that does not extend below the bottom of the trench so that it is capable of sliding horizontally if expansive soil swells, sliding until the soil has swollen as much as it needs to relieve internal soil pressure build-up. The maximum vertical movement estimated by geotechnical engineers is commonly reported when expansive soils are encountered. An embodiment of the invention includes an approach which provides a gap between the wall and the utilities (and utility supports), so that it will not damage the utilities if the wall slides.

The embodiment allows design and installation without knowing what the expansive soil pressures are because it is designed based on the magnitude of the potential vertical movement, which is commonly reported data, allowing a horizontal gap of that same magnitude which is the maximum possible horizontal movement from expansive soil because volume change is three-dimensional.

Because the system is capable of sliding without damaging utilities, this invention can be approved by building officials as an "alternative method of construction", avoiding the need to resist the overturning and sliding with a factor of safety of 1.5 due to expansive soil swelling, which would otherwise not be permitted by building codes.

The embodiment also takes advantage of the cohesion of the earth common in soil under slab-on-voidform foundations by digging a trench in the soil so that the cohesive soils maintain the shape of the trench long enough for concrete to be poured in the trench. This avoids the costs of constructing formwork for the retaining structure and the costs of removing such formwork.

No reinforcement is necessary with this invention, because the wall is simply a "gravity wall". "Engineered Gravity Wall" retaining structures in the prior art are embedded below the soil on both sides. "Unengineered Gravity Wall" retaining structures that are in the prior art which do not extend below the lower elevation are common for minor "unengineered" retaining walls such as landscaping "railroad tie" timbers or simple border stones laid on the ground with landscaping behind the stones. This invention is constructed similar to an "unengineered gravity wall" used in landscaping but is engineered to be capable of resisting the active soil pressures required by the building code and it forgoes the extension of the wall under the grade of the trench so as to be capable of sliding. It is also different from either style of gravity wall in the prior art because it is earth formed on both side and then excavated on one side to expose the entire height of the wall. It is furthermore different in that there is a gap between the wall and utilities set based on the expansive soil potential vertical movement so as to avoid damaging utilities.

Furthermore, the embodiment allows decking such as plywood or metal deck or plastic form boards to be installed on top of the retaining structures on each side of the plumbing trench, or conventional retaining structures, or ledger supports attached to the side of foundation elements, so as to support carton or other voidforms without the need to cut voidforms around intricate areas of complex plumbing distribution systems. The decking is not attached to the supports so that different systems do not have undesirable forces from expansive soil movement (e.g. a foundation element will not have upward pressures as expansive soil causes a retaining structure to shift upward as the expansive soil swells).

Lower-cost, low strength, flowable concrete fill and/or "lean concrete" without coarse aggregate can also be used with this invention so as to make it easy for "joists" (e.g. horizontal strut channels under decking where the longitudinal axis of utility trenches chang and/or decking needs additional support) to be installed in seats that are formed or cut into the retaining structures so that the joists are not attached to supports but the joists can be attached to the decking. This allows the plumbing elevation to occur immediately below the decking or joists for the decking so as to maximize the suitability for this application to more scenarios on a project as utilities slope in elevation. In practicing the invention a level ground surface is crated by cutting and filling operations. Wall trenches are excavated on each side of proposed utility locations, providing a horizontal clear dimension between the proposed utilities and the proposed walls equal to the potential vertical movement estimated by the geotechnical engineer of record with the depth and width installed to be capable of resisting both overturning and sliding by a factor of safety of 1.5 against the active soil loads required by the building code if the soil between the wall trenches were to be removed. Concrete is poured in the wall trenches. After curing the concrete, soil is excavated between the walls over the full depth of the walls.

Stakes and rods are installed on each side of the concrete walls. The stakes have a sharpened edge at the bottom, are embedded in the soil and they have a smooth or threaded hole in the top. Threaded rods are installed in each stake, and support nuts are installed on each rod. Horizontal strut channel is installed over the support nuts. Hanging pipe supports are installed to suspend utilities over a voidspace equal or greater than the potential vertical movement. Decking is installed over the plumbing trench between the concrete walls and additional framing supports added where necessary support of decking is not provided by walls, with the decking being supported by the concrete walls without attaching decking to the walls. Support may also be provided by installing ledger supports onto the side of foundation elements, without attaching decking to the ledger supports. Voidforms are installed over the walls and decking, with no voidforms necessary under the decking or supports described. Rebar is installed for the slab of the slab-on-voidform foundation, using bar support spacers. Strut channels are tied at each hanger assembly to the rebar in the slab of the slab-on-voidform foundation. The rods are removed from the stakes by preventing rotation of the supporting nuts (e.g. with an open-ended wrench) and rotating the threaded rod by hand, or by installing two nuts at the top and wrenching them together so as to effectively create a temporary bolt-head that can be used to remove the rod more quickly with a power drill and a socket bit. Finally, the concrete foundation is poured. As an example, in an embodiment the web of a strut channel could face downward, leaving an opening at the top of the strut channel that allows concrete to flow into the strut channel as it is mechanically vibrated during concrete placement. This allows the strut channel to function as additional reinforcement in the slab.

The invention can also incorporate installing a novel mountable pipe clamp as shown in the figures, allowing a method and system for resisting axial and transverse forces placed on a pipe that cantilevers from a fixed foundation element to support and connect to a flexible expansion joint that will shift during volumetric soil changes. Installing a pair of mountable pipe clamps as shown in the figures provides a method of resisting moments in such a condition. The pair of mountable pipe clamps can be mounted at any desired elevation and any desired horizontal location perpendicular to the face of the wall from which a pipe cantilevers, for a pipe within an opening of any size or geometry, and can be removed and remounted using other locations of the inventive device for bolt holes that do not interfere with the original bolt locations, avoiding the need for coring an existing bolt. And, as a pair, if the holes in the mountable pipe clamps on each side of a wall are aligned, bolts can be installed that extend through the wall entirely.

Furthermore, installing a mountable pipe clamp on one face of a foundation element will lock a pipe into a position and make it possible for sealant to be added all around the pipe between the pipe and the opening on the other side of the foundation element, before installing the second mountable pipe clamp on that face.

Furthermore, this mountable pipe clamp can allow inspection of any sealant added behind the pipe clamp and a second mountable pipe clamp can be removed to remove old sealant and reapply new ones and then reinstall the mountable pipe clamp. If bolts are used with nuts, the nuts could be removed in such an application so that the bolts and nuts can even be reused after sealant has been replaced.

BRIEF DESCRIPTION OF THE DRAWINGS

FIG. 2 shows a side view of an embodiment of the invention.

FIG. 17 shows a cross sectional view of an embodiment of the invention.

FIG. 18 shows a cross sectional view of an embodiment of the invention.

FIG. 19 shows a cross sectional view of an embodiment of the invention.

FIG. 20 shows a cross sectional view of an embodiment of the invention.

DETAILED DESCRIPTION OF THE DRAWINGS

Figure 1:
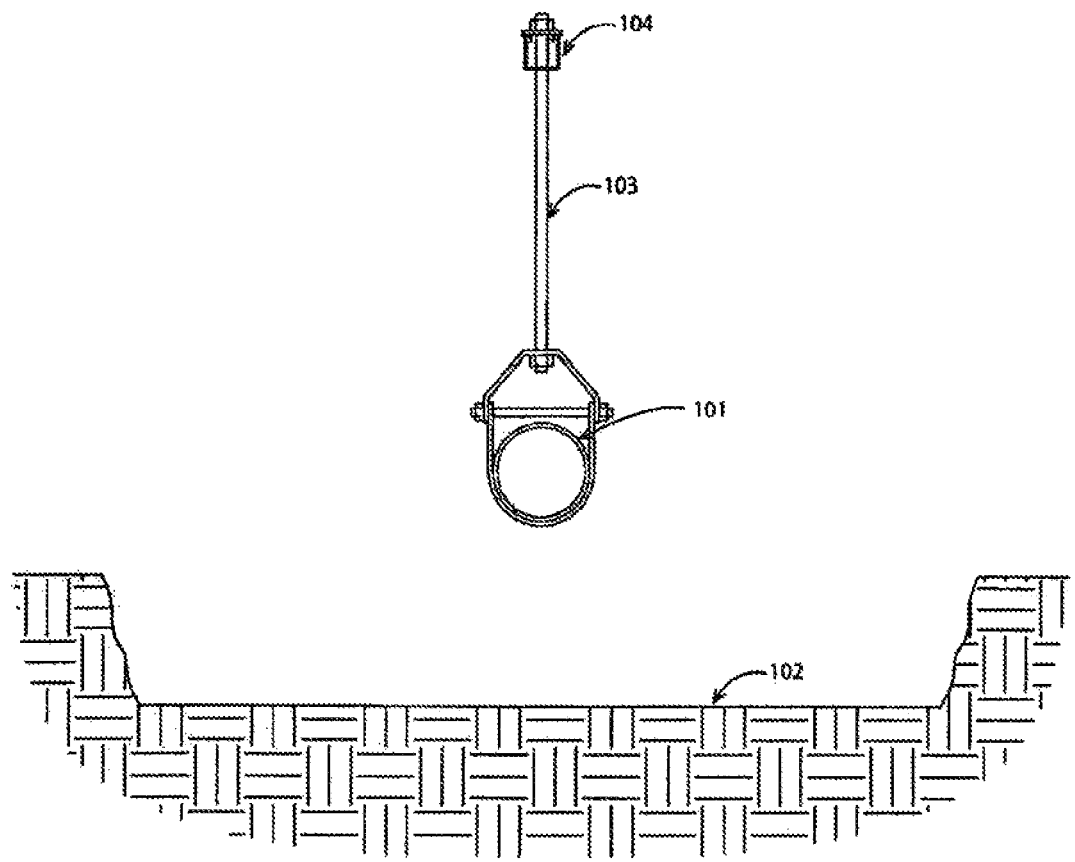
FIG. 1 shows a cross sectional view of an embodiment of the invention.

FIG. 1 shows a cross sectional view of an embodiment of the invention wherein a utility pipe [101] is hanging over a subgrade [102] from one or more hanger assemblies [103].

A hanger assembly [103] is connected to and supported by one or more utility support members [104] of the inventive framing system.

In an embodiment, utility pipe [101] is comprised of polyvinyl chloride, cast iron, or galvanized steel. Furthermore, in an embodiment, utility pipe [101] is a component of a sanitary sewer plumbing system, a domestic water supply system, a fire protection system, a natural gas piping system, an electrical power supply system or a telecommunications system.

Furthermore, in an embodiment, hanger assembly [103] is comprised of galvanized steel, stainless steel or plastic. Also, in an embodiment, hanger assembly [103] includes a partially or completely threaded rod with a nut and washer configurable above a utility support member [104] wherein the threaded rod hangs from the utility support member [104] and could include a clevis hanger that holds a utility pipe [101] with a nut under a portion of a clevis hanger wherein the clevis hanger hangs from the threaded rod and the elevation of the clevis hanger can be adjusted by turning a nut above a utility support member [104].

In an embodiment, a utility support member [104] is comprised of ungalvanized steel, galvanized steel, stainless steel or plastic. Furthermore, in an embodiment, utility support member [104] could be a strut channel with 12 gage thickness and regularly spaced slotted holes in the web of the strut channel. Alternatively, in an embodiment, utility support member [104] could be a hollow, rectangular steel tube. Also alternatively, in an embodiment, utility support member [104] could be rebar such as might be used as slab reinforcement for a concrete slab. As an example, in an embodiment a washer, as part of a hanger assembly, above a utility support member [104] could be a strut channel saddle washer if the utility support member [104] is a strut channel.

Also, in an embodiment, the difference in elevation between the bottom of a hanger assembly [103] and a subgrade [102] could be established to protect a utility pipe [101] by being greater than or equal to the potential vertical movement of the subgrade [102] due to volumetric changes of the subgrade as estimated by a geotechnical engineer.

FIG. 2 shows a side view of an embodiment of the invention as shown in FIG. 1.

Figure 3:
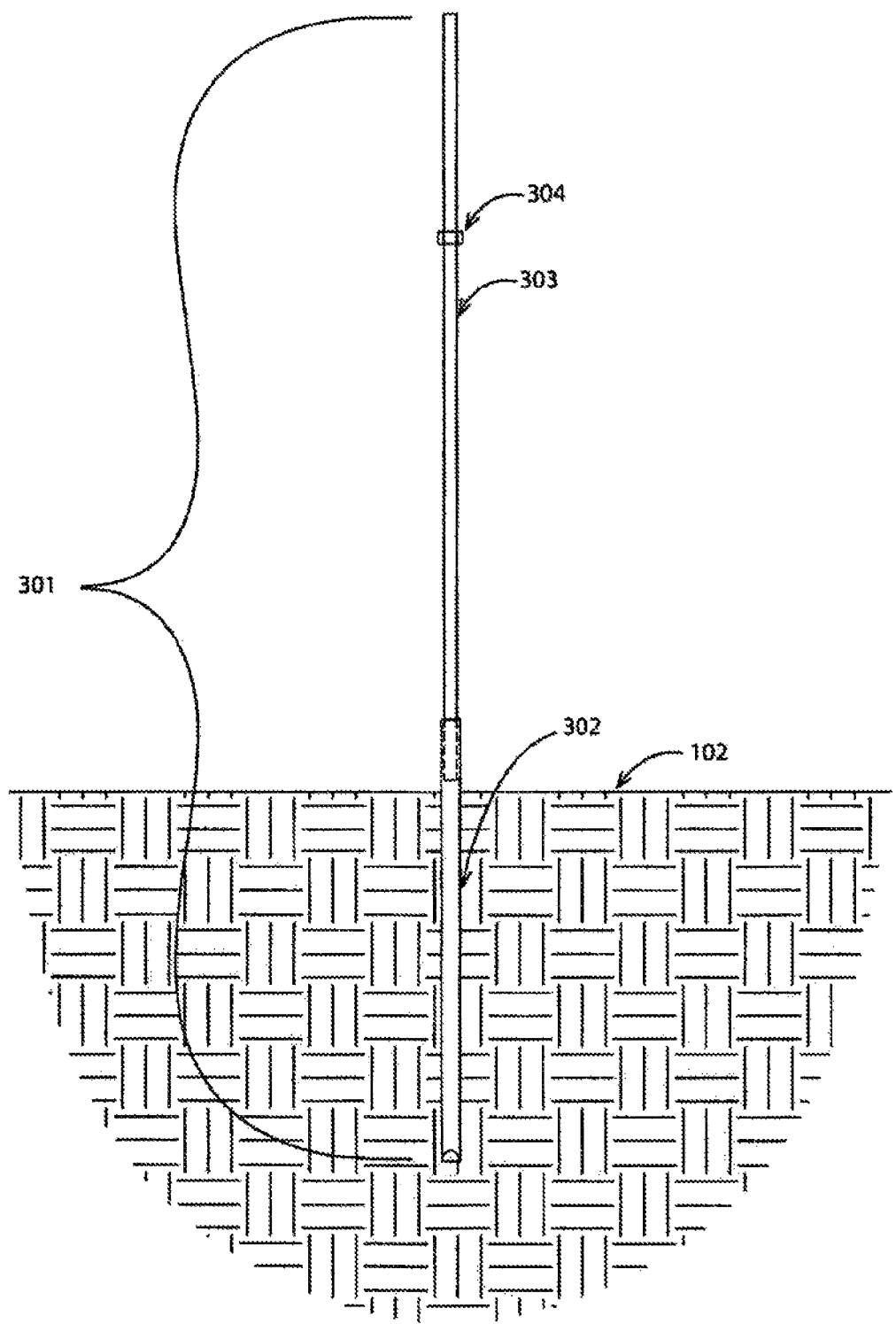
FIG. 3 shows a partial side view of an embodiment of the invention.

FIG. 3 shows a partial side view of an embodiment of the invention wherein an inventive temporary support apparatus [301] includes an inventive stake [302], a threaded rod [303] and an adjustable support nut [304]. In practicing an embodiment of a method of the invention, the inventive stake [302] is driven into a subgrade [102]. A threaded rod [303] is inserted into a hole at the top of an inventive stake [302] wherein the inventive stake [302] provides support for the threaded rod [303]. An adjustable support nut [304] is connected to and supported by the threaded rod [303].

In an embodiment, the inventive stake [302] has a sufficiently long length such that it can be driven into a subgrade [102] to a sufficient depth that provides a desired or greater level of rigidity for use in the inventive temporary support apparatus [301]. Also, in an embodiment the inventive stake [302] has a sufficiently short length so that, after the inventive stake [302] is driven into a subgrade [102] to a sufficient depth that provides a desired or greater level of rigidity for use in the inventive temporary support apparatus [301], the inventive stake [302] could be driven further if necessary so that the top of the inventive stake [302] will not extend above the subgrade [102] more than the difference between a specified height of voidforms proposed under a slab of a slab-on-voidform foundation and the potential vertical movement estimated by a geotechnical engineer for the subgrade [102].

In an embodiment of a method of the invention, a threaded rod [303] is inserted into the inventive stake [302] after the inventive stake [302] is driven into a subgrade. The elevation of an adjustable support nut [304] is adjusted to a desired elevation by turning an adjustable support nut [304] after the threaded rod [303] is inserted into the inventive stake [302] after the inventive stake was previously driven into a subgrade [102], thus adjusting for a specific embedment depth of the inventive stake [302] into the subgrade [102].

In an embodiment, the inventive stake [302] is comprised of steel. Further, in an embodiment, the inventive stake [302] is 18 inches long. In embodiments, the inventive stake [302] has a round cross sectional shape or a rectangular cross sectional shape. As an example, the inventive stake [302] can have a round cross sectional shape with an outer diameter that is ¾ inches with a round hole that is 2½ inches deep and ½ inches in diameter. In another example, the inventive stake [302] could have an unthreaded hole with smooth sides. Further, in an embodiment, the inventive stake [302] could have a threaded hole. Also, in an embodiment the inventive stake [302] could have a "v" shaped bottom with two sloped surfaces that form a linear edge along the bottom. In other embodiments, the inventive stake [302] could have a single-sloped bottom, a flat bottom, a conical bottom that forms a pointed tip, or a hemispherical shaped bottom.

Further, in embodiments, the threaded rod [303] is completely threaded or partially threaded. Furthermore, the threaded rod [303] could have a consistent diameter inclusive of any threads over the length of the threaded rod [303] or it could have varying diameters, inclusive of any threads, allowing an adjustable support nut [304] to slide without turning where the diameter of the threaded rod is greater than the diameter of portions of a threaded rod [303]. Furthermore, in an embodiment the threaded rod [303] is comprised of ungalvanized steel or galvanized steel. Further, the adjustable support nut [304] may be comprised of ungalvanized steel or galvanized steel.

Figure 4:
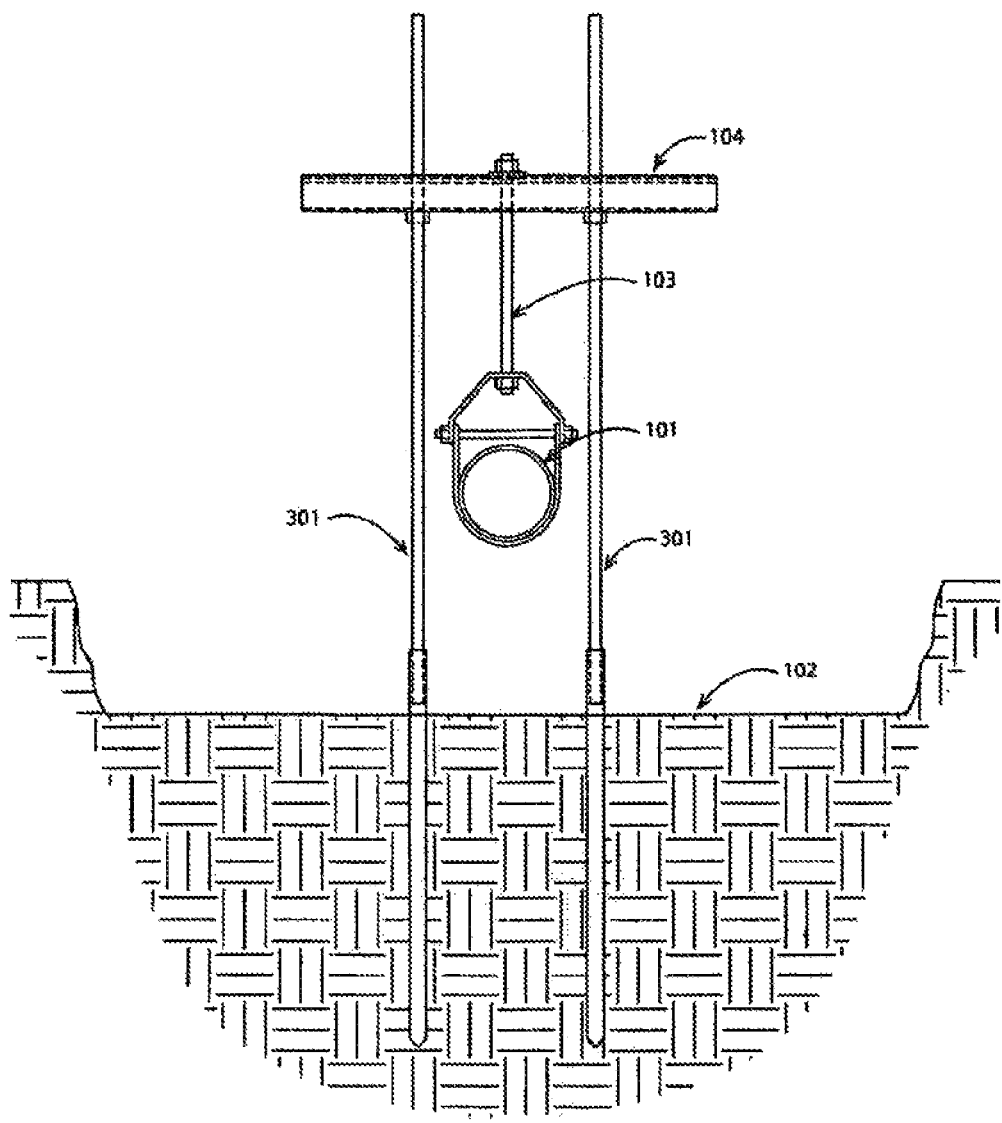
FIG. 4 shows a cross sectional view of an embodiment of the invention.

FIG. 4 shows a cross sectional view of an embodiment of the invention wherein a utility pipe [101] is hanging over a subgrade [102] from one or more hanger assemblies [103]. The hanger assembly [103] is connected to and supported by one or more utility support members [104] of the inventive framing system. In the embodiment, one or more utility support members [104] of the inventive framing system are supported, partially or completely, by one or more inventive temporary support apparatuses [301]. In the embodiment, the subgrade [102] is be benched so as to create a plumbing trench with steps in the sides of the plumbing trench arranged geometrically in a manner that is compatible with placement of rectangular voidforms on the subgrade [102] and also prevents an unacceptable amount of subgrade [102] material from entering the space under a utility pipe [101] or a hanger assembly [103] after a concrete slab of a slab-on-void foundation is poured.

Figure 5:
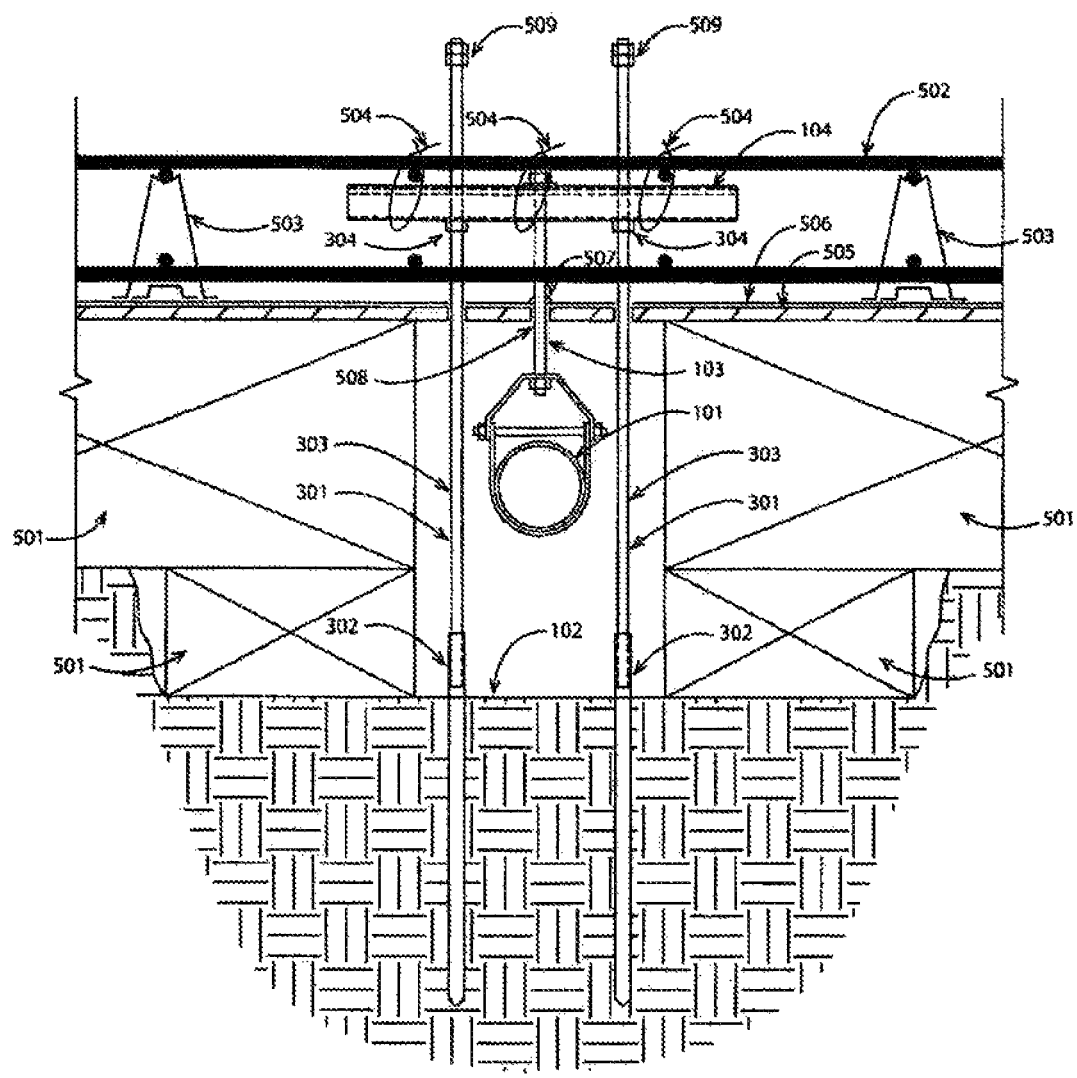
FIG. 5 shows a cross sectional view of the embodiment of the invention.

FIG. 5 shows a cross sectional view of the embodiment of the invention shown in FIG. 4 after voidforms [501] are installed, after slab reinforcement [502] is installed, wherein slab reinforcement [502] is supported by one or more reinforcement supports [503] that are supported by voidforms [501], after one or more utility support members [104] of the inventive framing system are tied to the slab reinforcement [502] with tie wire (or other similar fastener such as, but not limited to, zip ties, bailing wire, reinforcement ties, string or the like) [504] so as to stabilize the utility support member [104] in preparation for removing portions of any inventive temporary support apparatuses [301] before a concrete slab of a slab-on-voidform foundation is poured as well as in preparation for any static water pressure testing of one or more utility pipes [101] before a concrete slab of a slab-on-voidform foundation is poured.

In an embodiment, the voidforms [501] are comprised of a wax coated cardboard, plastic, or a hybrid of plastic materials and degradable materials, if sufficient separation is provided between voidforms [501] and any utility pipes [101] as well as between voidforms [501] and any hanger assemblies [103]. Further, in an embodiment, a protective voidform sheathing [505], as a component of the voidforms, could be installed at the top of the voidforms [501] over any spaces between voidform [501] components installed to accommodate any hanger assemblies [103], and utility pipes [101] and any inventive temporary support apparatuses [301]. Also in an embodiment, the degradable protective voidform sheathing [505] could be $9/32$ inches thick oriented strand board with sufficient structural span rating to be capable, for the required spans, of supporting the loads associated with pouring a concrete slab of a slab-on-voidform foundation or $9/32$ inches thick plywood with sufficient structural span rating to be capable, for the required spans, of supporting the loads associated with pouring a concrete slab of a slab-on-voidform foundation.

Furthermore, by way of example, vapor barrier [506], as part of the slab, could be installed over the voidforms [501] or could be capable of adhering to the bottom of a concrete slab so that it will remain in the installed position after any degradable voidforms [501] degrade. As an example, sealant [507], as part of a vapor barrier [506] which is part of a slab, could be installed around any holes [508] where components of the hanger assembly [103] where the hanger assembly [103] penetrates a vapor barrier [506], with the sealant [507] penetrating into any threads of a component of a hanger assembly [103].

As an example, the tie wire [504] material could be steel wire commonly used to tie reinforcement for reinforced concrete construction. Also as an example, slab reinforcement [502] could be #5 reinforcing bars at 12 inches on center each way at the top of a slab and #5 reinforcing bars at 12 inches on center each way at the bottom of a slab. As an example, reinforcement supports [503] could be individual wire reinforcement supports at 3 feet on center each way under each mat of slab reinforcement.

As an example, double nut [509] could be installed at the top of any temporary support apparatuses [301] to effectively create a bolt head that allows convenient removal of portions of the temporary support apparatus before a concrete slab of a slab-on-voidform foundation is poured. Also, in an embodiment, a lock nut could be installed at the top of any temporary support apparatuses [301] to effectively create a bolt head that allows convenient removal of portions of the temporary support apparatus before a concrete slab of a slab-on-voidform foundation is poured.

In an embodiment, before a concrete slab of a slab-on-voidform foundation is poured, any threaded rods [303] and adjustable support nuts [304] that are part of the inventive temporary support apparatus [301] could be removed by preventing rotation of the adjustable support nuts [304] at a constant elevation while turning the threaded rods [303] until the threaded rods [303] completely rise up above a utility support member [104], removing the threaded rods [303] and the adjustable support nuts [304] so that the threaded rods [303] do not transfer any loads to the foundation from volumetric soil changes, leaving the inventive stake [302] in the subgrade [102].

Figure 6:
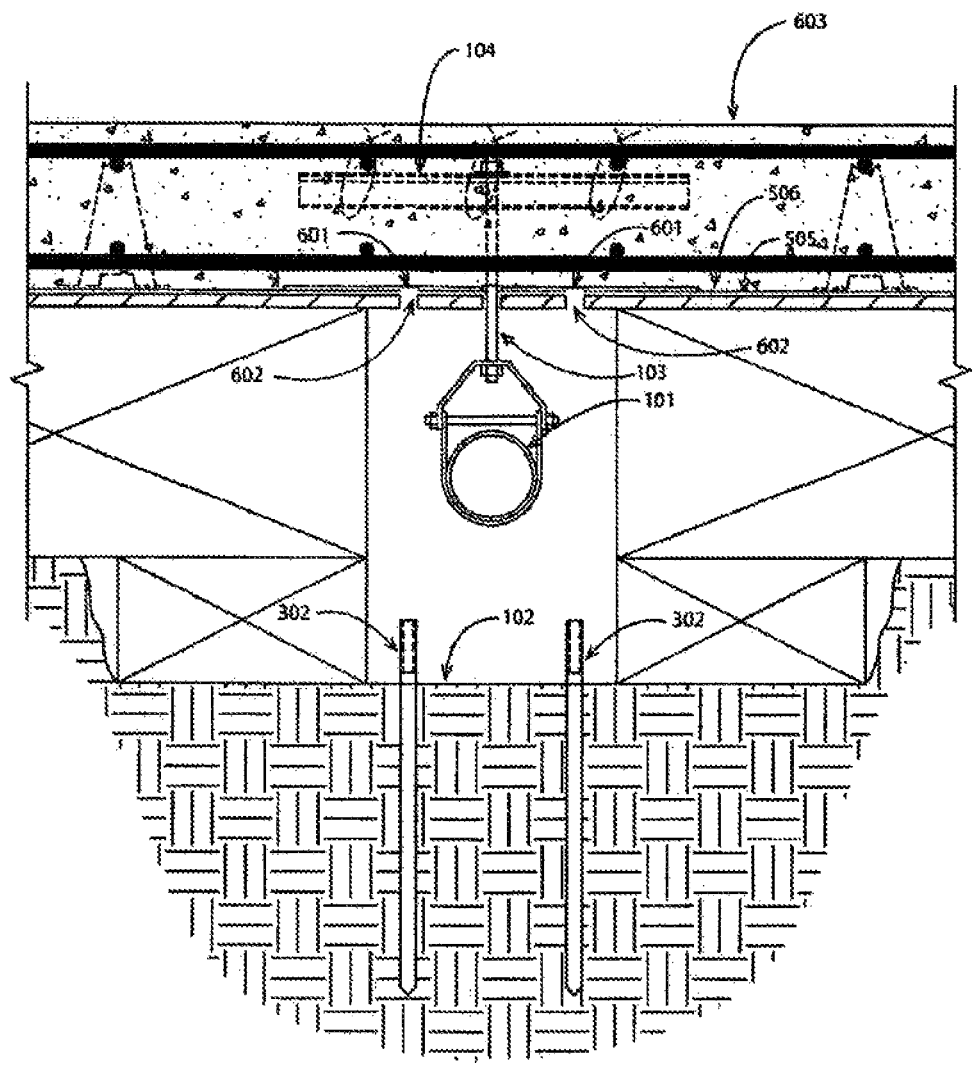
FIG. 6 shows a cross sectional view of an embodiment of the invention.

FIG. 6 shows a cross sectional view of an embodiment of the invention shown in FIG. 5 after removal of components as described for FIG. 5, leaving any inventive stakes [302] in the subgrade [102], after installing vapor barrier patches [601], as part of the vapor barrier [506] which is a part of the slab [603] of a slab-on-voidform foundation, over any vapor barrier holes [602], and after pouring a concrete slab [603] of a slab-on-voidform foundation.

Figure 7:
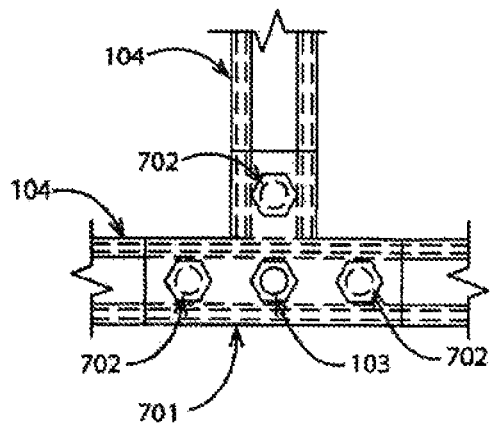
FIG. 7 shows a plan view of an embodiment of the invention.

FIG. 7 shows a plan view of an embodiment of the invention wherein a utility support member [104] of the inventive framing system is connected to and supported by another utility support member [104] of the inventive framing system with one or more connectors [701] secured by one or more bolts [702]. In an embodiment, the connectors [701] could be a pair of matching horizontal plates above and below the utility support member [104] which are compatible with the utility support member [104]. Also, in an embodiment, the connection could consist of welding utility support members [104] together in lieu of using a bolt. Additionally, in an embodiment, a hanger assembly [103] could be supported by a connector [701].

Figure 8:
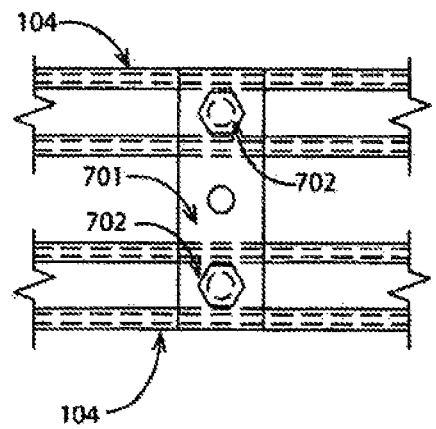
FIG. 8 shows a plan view of an embodiment of the invention.

FIG. 8 shows a plan view of an embodiment of the invention wherein a utility support member [104] of the inventive framing system is connected with a connector [701] and bolts [702] to utility support members [104] of the inventive framing system so that the two members act compositely with greater strength and stiffness than one member. In an embodiment, a pair of strut channels that are parallel could be connected with a regularly spaced connector [701] that is a plate compatible with strut channel framing above and below the pair of strut channels, allowing a flatter cross sectional geometry than combining the two strut channels with one on top of the other, as the flatter cross sectional geometry is more compatible with the invention to allow the utility support members [104] to be located between the upper and lower mats of reinforcement. In an embodiment, more than two strut channels acting as utility support members [104] could be connected [701] in a similar manner to maintain a relatively flat cross-sectional geometry so as to not require a thicker slab of a slab-on-voidform foundation.

Figure 9:
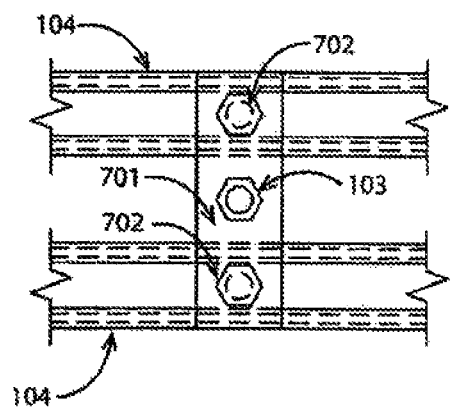
FIG. 9 shows a plan view of an embodiment of the invention.

FIG. 9 shows a plan view of an embodiment of the invention wherein utility support members [104] connected with connectors [701] and bolts [702] to act compositely as shown in FIG. 8 wherein a hanger assembly [103] supported by the connector [701]. As an example, a pair of parallel utility support members acting compositely are spaced to allow for a hanger assembly [103] to be hanging from the center of gravity of the composite combination of utility support members, which avoids twisting the utility support members [104].

Figure 10:
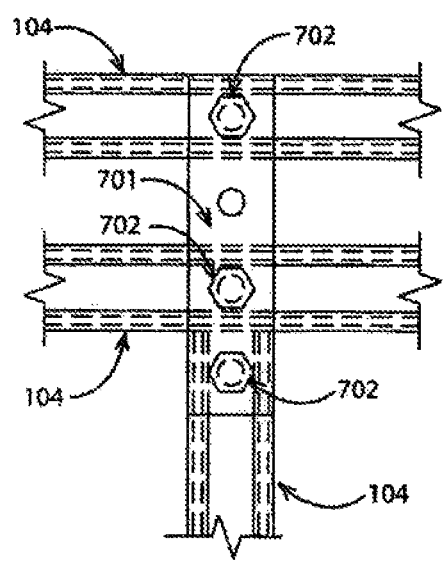
FIG. 10 shows a plan view of an embodiment of the invention.

FIG. 10 shows a plan view of an embodiment of the invention wherein a utility support member [104] could be connected to and supported by a composite of utility support members [104] which are connected as shown in FIG. 8 with a connector [701] and bolts [702].

Figure 11:
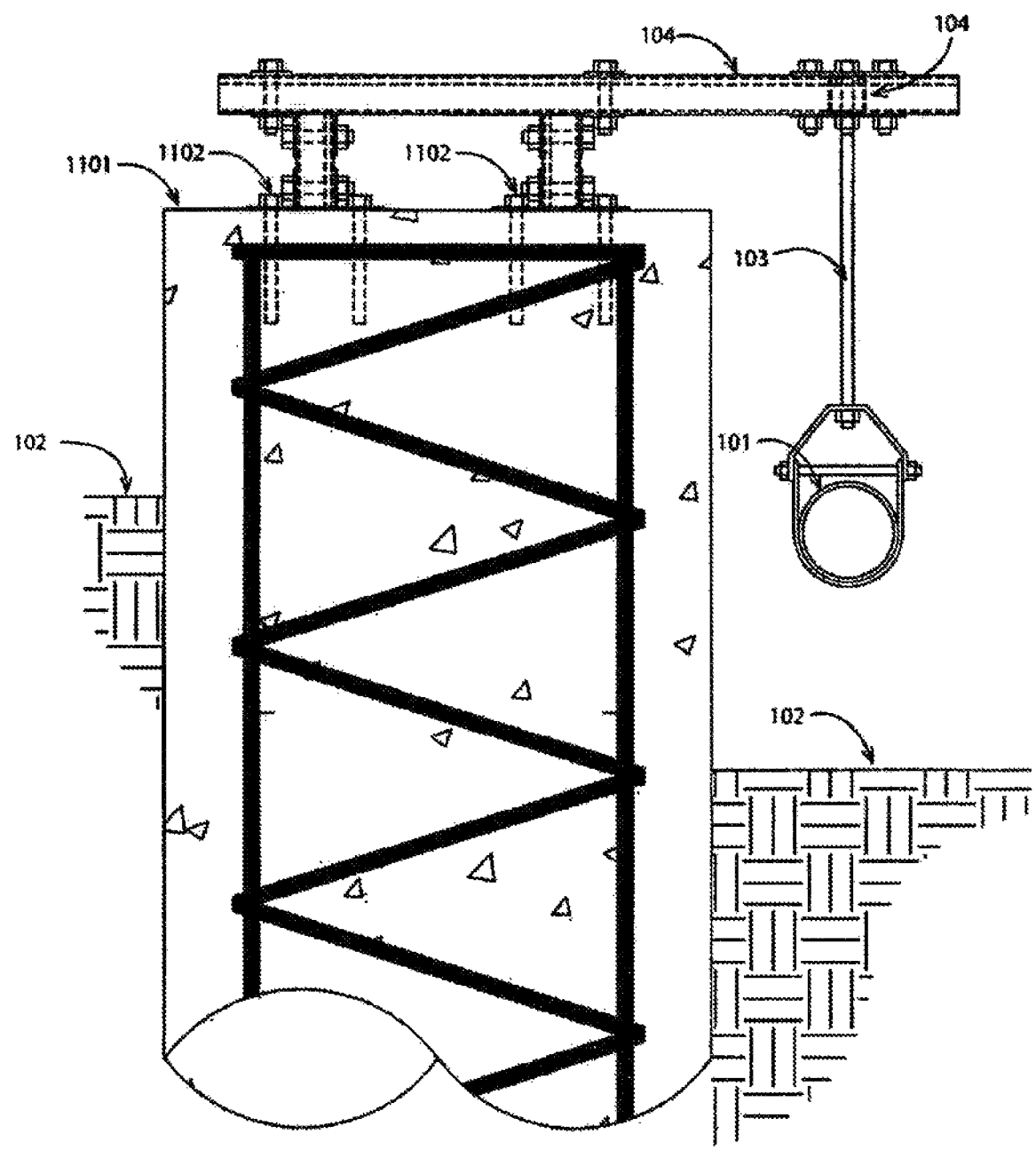
FIG. 11 shows a side view of an embodiment of the invention.

FIG. 11 shows a side view of an embodiment of the invention wherein one or more utility support members [104] are connected to and supported by one or more foundation elements [1101] with one or more post-installed elevation support connectors [1102] so that the one or more utility support members [104] cantilever and support a hanger assembly [103] as well as a perpendicular utility support member [104] so that the utility pipe [101] is not in contact with the subgrade [102]. As an example, a post-installed elevation support connector [1102] could include strut channel post bases, angles and bolts that are compatible with strut channel framing, and post-installed anchors into one or more foundation elements [1101]. Additionally, in an embodiment a foundation element could be a drilled and reinforced concrete pier.

Figure 12:
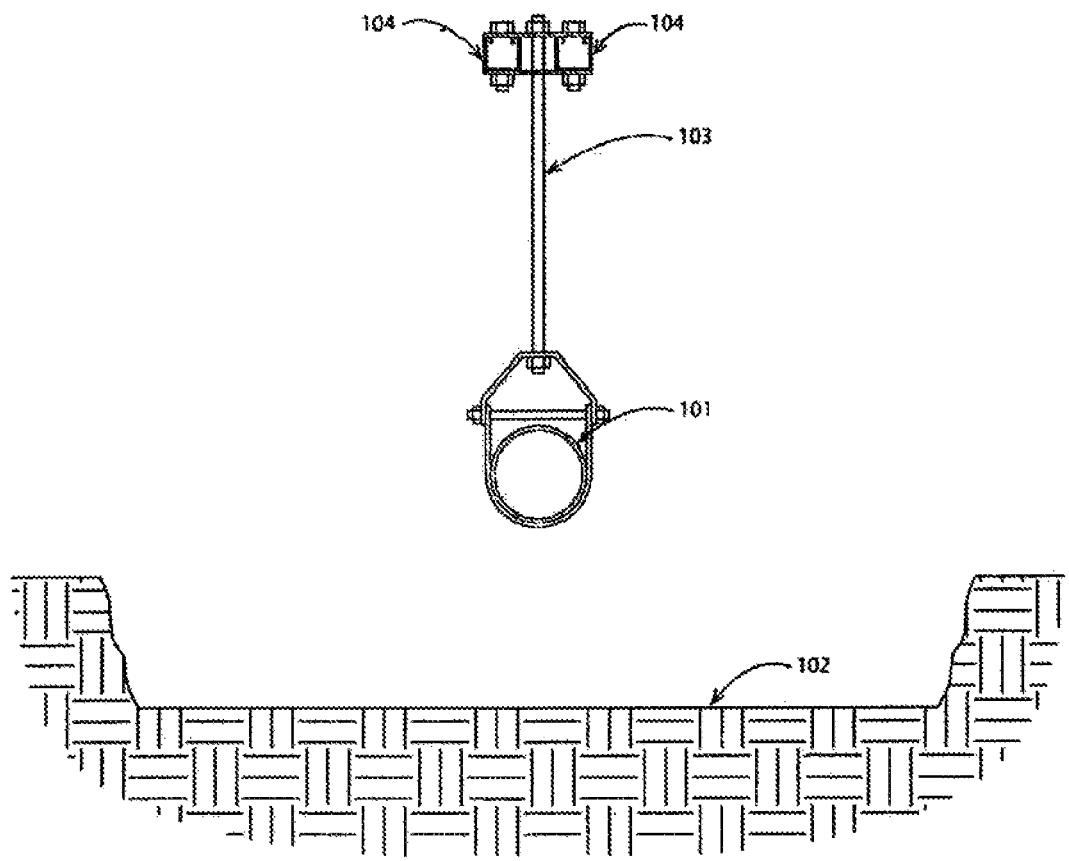
FIG. 12 shows a cross sectional view of an embodiment of the invention.

FIG. 12 shows a cross sectional view of an embodiment of the invention similar to that shown in FIG. 1 but with two composite utility support members [104] of the inventive framing system attached by connectors [701].

Figure 13:
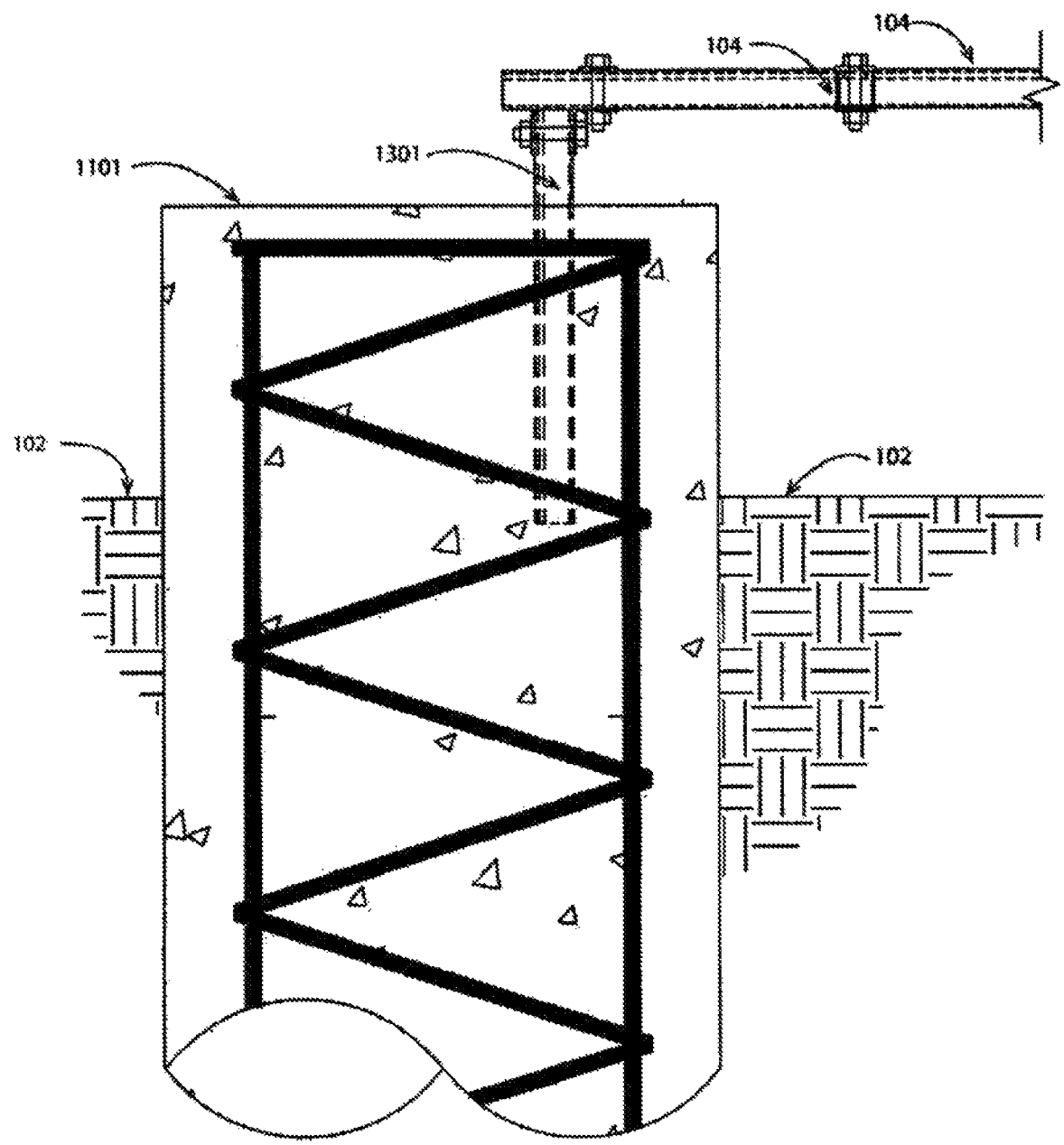
FIG. 13 shows a side view of an embodiment of the invention.

FIG. 13 shows a side view of an embodiment of the invention wherein one or more wet-set elevation support connectors [1301] are set into the fresh concrete when one or more foundation elements [1101] are poured, and one or more utility support members [104] extends to another support, with a utility support member [104] being connected to and supported by a utility support member [104] which is supported by a foundation element [1101]. The one or more utility support members [104] are connected to and supported by one or more elevation support connectors [1301] so that the elevation of one or more utility support members [104] can be adjusted to a desired elevation. As an example, a utility support member supported by a foundation element [1101] on one end could be supported on another end by another foundation element [1101] as shown in FIG. 13. As an example, a utility support member supported by a foundation element [1101] on one end could be supported on another end by another utility support member [104].

Figure 14:
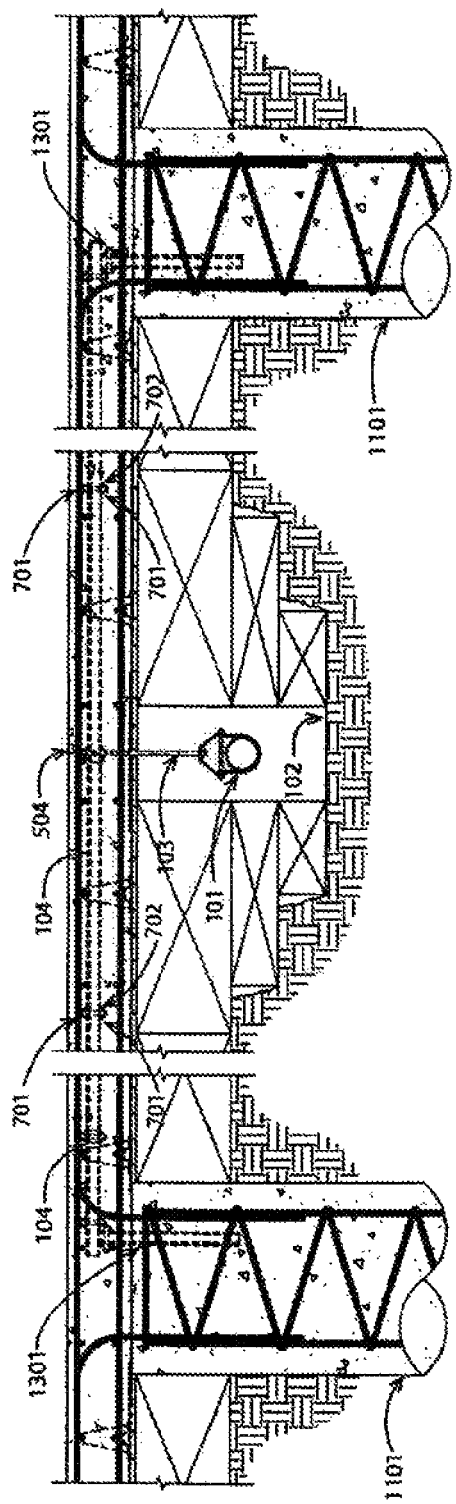
FIG. 14 shows a cross sectional view of an embodiment of the invention.

FIG. 14 shows a cross sectional view of an embodiment of the invention wherein one or more utility support members [104] of the inventive framing system are shown to span structurally between two foundation elements [1101] without any need for intermediate support, supporting the loads of one or more hanger assemblies [103], the loads of one or more utility pipes [101], and the loads of other utility support members [104] that are connected to and supported by the one or more utility support members [104] that span between the two foundation elements. As an example, a pair of parallel utility support members [104] could be made into a composite structural element with periodically spaced connectors [701] and bolts [702] as shown in FIG. 8 with connectors [701] on both the top and bottom of the utility support member [104] as shown in FIG. 14, with a nut attached to a bolt [702] that is used to make the pair act compositely. In an embodiment the conditions at each foundation element [1101] as shown in FIG. 14 are similar to the conditions shown in FIG. 13. As an example, in an embodiment the conditions at the hanger assembly [103] as shown in FIG. 14 are similar to the conditions shown in FIG. 6 but tie wire [504] could be installed to connect a utility support member [104] to reinforcement [502] so as to stabilize the hanger assembly [103] so that the utility pipe [101] could be static water tested without the additional weight of the water causing deflection of the utility support members [104] spanning long distances between foundation elements [1101] which would cause a change in the flow line elevations of the utility pipes [101] that may be unacceptable in that the changes in flow line elevations may impair the functionality of the utility pipe [101]. In another example, one or more utility support members [104] can be at a height determined by vertical support member [1301] so that the elevation of the utility support members [104] is between the upper and lower mats of reinforcement [502] where the utility support members [104] can be cast permanently into the slab [603] of a slab-on-voidform foundation without impairing the ability of the reinforcement [502] and the slab [603] to function structurally as the slab [603] structurally spans between foundation elements [1101] over a subgrade [102] without being in contact with a subgrade [102].

Figure 15:
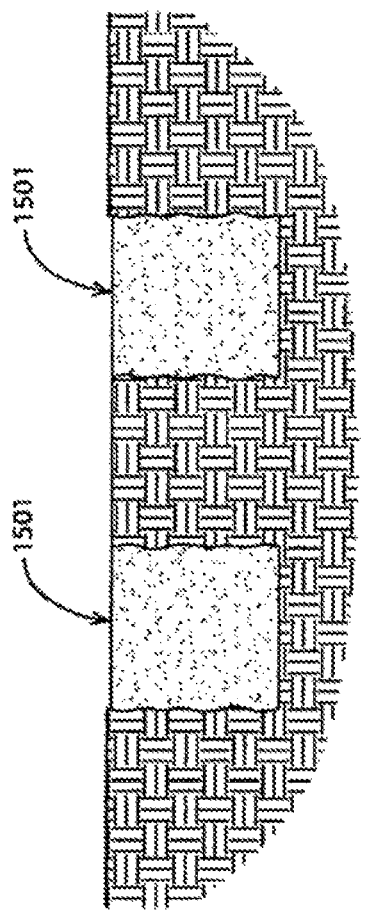
FIG. 15 shows a cross sectional view of an embodiment of the invention.

FIG. 15 shows a cross sectional view of an embodiment of the invention wherein one or more inventive mobile retaining walls [1501] are economically earth-formed by excavating and filling the excavation with concrete. In an embodiment there is a mobile retaining wall [1501] on each side of a proposed plumbing trench. As an example, the mobile retaining wall [1501] has a cross sectional geometry that is at least as wide as it is tall, which prevents the mobile retaining wall [1501] from tipping over when functioning as a retaining wall that has lateral expansive soil pressures. Furthermore, in an embodiment the mobile retaining wall [1501] is comprised of flowable concrete fill with at least 110 pounds per cubic foot density and no course aggregate, concrete with at least 140 pounds per cubic foot density and no course aggregate or concrete that is unreinforced.

Figure 16:
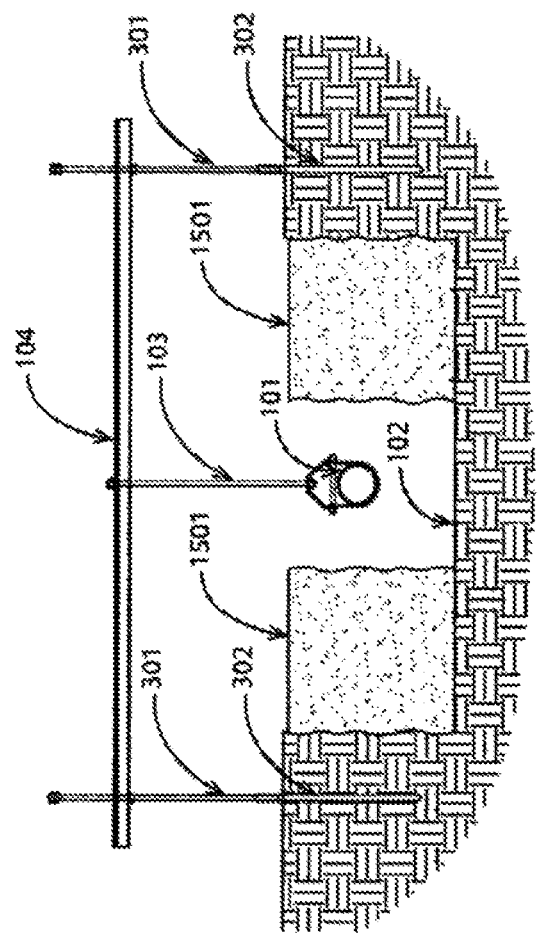
FIG. 16 shows a cross sectional view of an embodiment of the invention.

FIG. 16 shows a cross sectional view of an embodiment of the invention wherein a utility pipe [101] is hanging over a subgrade [102] from one or more hanger assemblies [103], similar to that shown in FIG. 4. A hanger assembly [103] is connected to and supported by the one or more utility support members [104] of the inventive framing system, similar to that shown in FIG. 4. In an embodiment, one or more utility support members [104] of the inventive framing system is supported, partially or completely, by one or more inventive temporary support apparatuses [301], similar to that shown in FIG. 4. As an example, a subgrade [102] could be excavated adjacent to one or more inventive mobile retaining walls [1501] so as to create a plumbing trench arranged geometrically in a manner that is compatible with placement of rectangular voidforms [501] on a subgrade [102] and also prevent subgrade [102] material from entering the space under a utility pipe [101] or a hanger assembly [103] after a concrete slab of a slab-on-void foundation is poured. In an embodiment, one or more inventive stakes [302] which are part of one or more inventive temporary support apparatus [301] could be driven into one or more mobile retaining walls [1501] instead of a subgrade [102]. Also, in an embodiment, utility support members [104] could structurally span between foundation elements [1101] as shown in FIG. 14, over a plumbing trench that is created by excavating adjacent to one or more mobile retaining walls [1501] rather than benching the sides of a plumbing trench.

FIG. 17 shows a cross sectional view of an embodiment of the invention similar to that shown in FIG. 5 but with a plumbing trench that is created by excavating adjacent to one or more mobile retaining walls [1501], rather than benching the sides. In an embodiment, decking [1701] could be installed over mobile retaining walls [1501] so as to create a support system for voidforms [501] above decking [1701], which reduces or eliminates a need to cut voidforms around complex utility pipe [101] configurations below decking [1701] and thereby reduces the number of days between rain events necessary to allow for any degradable voidform installation above decking [1701] if decking [1701] material is sufficiently rigid. Decking [1701] has gaps to allow for penetrations such as hanger assemblies [103]. In an embodiment, voidforms [501] could be degradable carton voidforms and decking [1701] material could be degradable plywood. In another embodiment, voidforms [501] could be plastic voidforms and decking [1701] material could be plastic. In yet another embodiment, voidforms [501] could be a hybrid of plastic and carton material and decking [1701]

could be galvanized corrugated metal deck. As another example, voidforms [501] could be degradable carton voidforms and decking [1701] material could be nondegradable.

FIG. 18 shows a cross sectional view of an embodiment of the invention similar to that shown in FIG. 6 but with a plumbing trench that is created by excavating adjacent to one or more mobile retaining walls [1501], rather than benching the sides without impairing the utility pipe [101] or hanger assembly [103].

FIG. 19 shows a cross sectional view of an embodiment of the invention as shown in FIG. 18 wherein voidforms [501] and decking [1701] could be degradable and after any degradable material has degraded and a reduction in subgrade [102] volume has occurred.

FIG. 20 shows a cross sectional view of an embodiment of the invention similar to that shown in FIG. 18 wherein voidforms [501] and decking [1701] are degradable after the after any degradable material has degraded and an increase in subgrade [102] volume has occurred without impairing the utility pipe [101] or hanger assembly [103]. In an embodiment, the mobile retaining walls [1501] are installed adjacent to plumbing trenches, mobile retaining walls [1501] are allowed to slide laterally if lateral forces from volumetric soil change exceed the sliding resistance of the mobile retaining wall as a gravity wall system. In an embodiment, the horizontal distance of separation between a utility pipe [101] and a mobile retaining wall [1501] could be greater than or equal to the potential vertical movement estimated by a geotechnical engineer so as to protect the utility pipe [101] from the effects of volumetric changes in soil.

Figure 21:
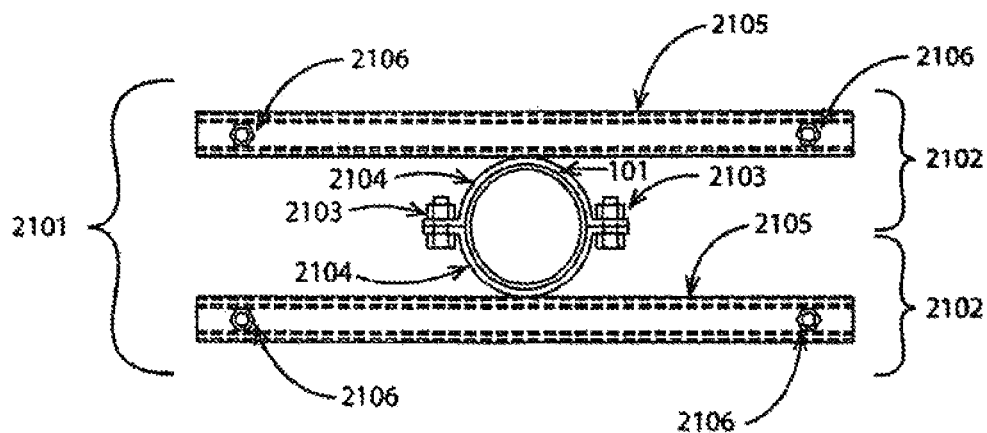
FIG. 21 shows an elevation view of an embodiment of the invention.

FIG. 21 shows an elevation view of an embodiment of the invention wherein an inventive mountable pipe clamp [2101] suitable for supporting a utility pipe [101] and simultaneously clamping onto utility pipe [101] to prevent vertical and horizontal movement of utility pipe [101] when the inventive mountable pipe clamp [2101] is mounted onto a structure with a utility opening that is larger than the utility pipe [101] to allow construction tolerance and code-required felt so that the utility pipe [101] can be removed and replaced. The inventive clamp [2101] is suitable for preventing rotation of a utility pipe [101] about a transverse axis of a utility pipe [101] when an inventive mountable pipe clamp [2101] is installed on two sides of a structure so as to create a moment arm of resistance against overturning. As an example, two mounting components [2102] together could comprise an inventive mountable pipe clamp [2101] when bolted together with two clamping bolt and nut assemblies [2103]. In an embodiment, mounting components [2102] could consist of half of a standard pipe clamp [2104] that is the appropriate geometry to cradle a utility pipe [101] and a mounting arm [2105].

In an embodiment, the inventive mountable pipe clamp [2101] is comprised of stainless steel, galvanized steel, or plastic. Also, in an embodiment, the mounting arm [2105] could be a strut channel with regularly spaced slotted holes in the web of a strut channel allowing convenient options for mounting onto a structure a sufficient distance away from the edge of a utility opening. As an example, a half of a standard pipe clamp [2104] could be welded to a mounting arm [2105] to create a mounting component [2102]. Also, as an example, a mounting arm [2105] and components that have a similar shape to half of a standard pipe clamp [2104] could be fabricated as one plastic component.

Figure 22:
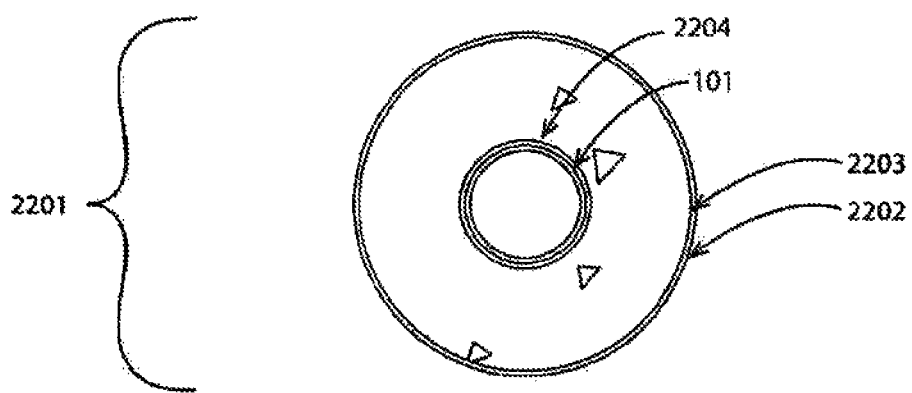
FIG. 22 shows a cross sectional view of an embodiment of the invention.

FIG. 22 shows a cross sectional view of an embodiment of the invention wherein an inventive protective utility counterweight [2201] provides a protective collar around a utility pipe [101] so as to prevent the utility pipe [101] from breaking under certain loads, is sufficiently rigid to cantilever support of a utility pipe [101] through an opening in a foundation element [1101], is sufficiently long and heavy to resist overturning when it cantilevers support of a utility pipe [101] through an opening in a foundation element [1101], and allows removal and replacement of a utility pipe [101]. In an embodiment, the inventive protective utility counterweight [2201] could consist of an outer pipe [2202] with a larger diameter than a utility pipe [101] wherein the outer pipe [2202] is infilled with counterweight material [2203] around a protective sheathing [2204] that acts as a bond breaker between the counterweight material [2203] and a utility pipe [101].

Figure 23:
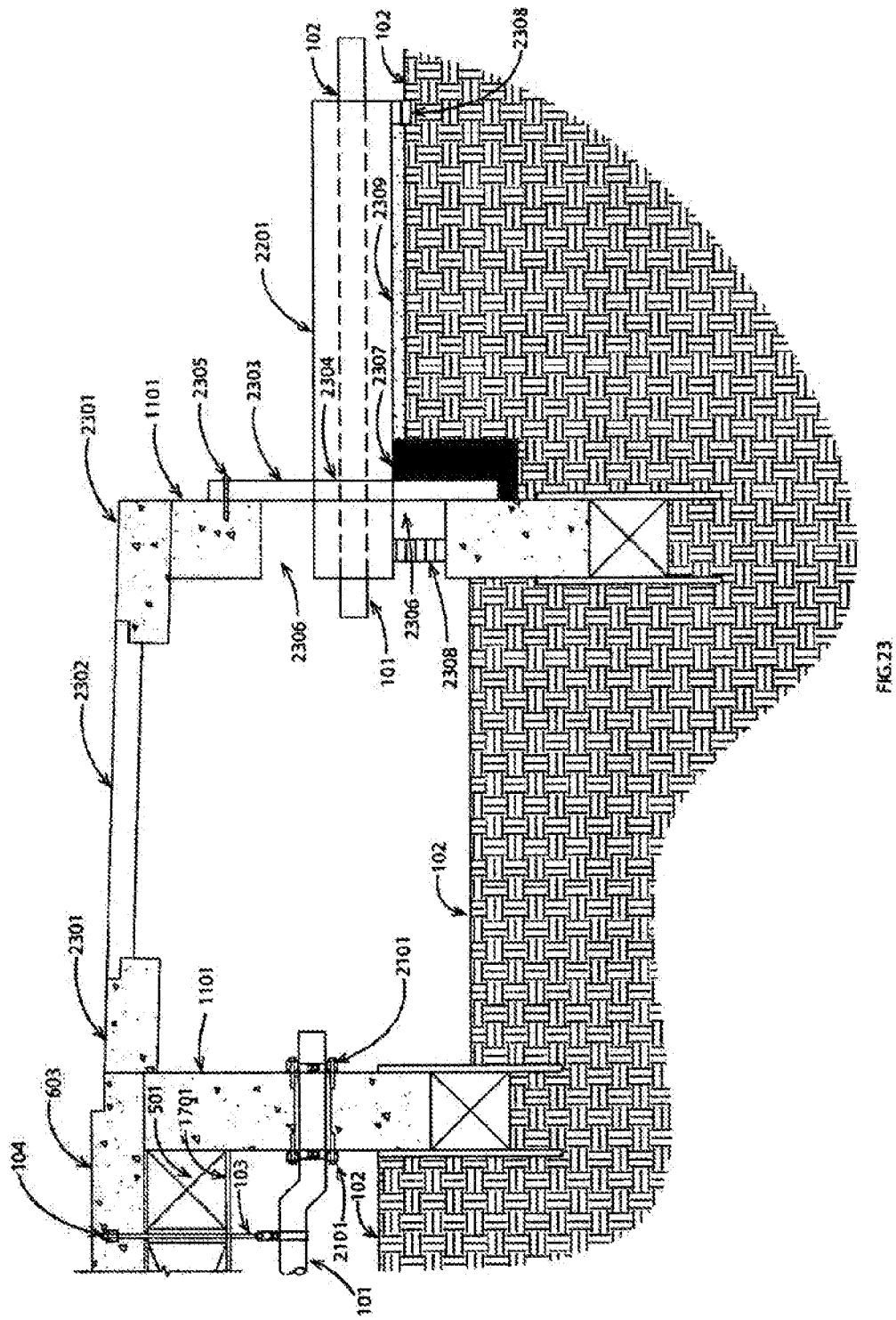
FIG. 23 shows a cross sectional view of an embodiment of the invention.

FIG. 23 shows a cross sectional view of an embodiment of the invention wherein a vault capable of housing a transition of utility pipes [101] from a building where a utility pipe [101] is supported similar to the conditions shown on FIG. 18 transitioning to where the utility pipe [101] is supported by an inventive protective utility counterweight [2201] that is supported by a subgrade [102] and can rise or fall if a subgrade experiences volumetric changes.

In an embodiment, the vault is comprised of foundation elements [1101] and reinforced concrete as the vault top [2301]. In another embodiment, the vault consists of reinforced concrete grade beams with a vault top [2301] that is poured over temporary formwork which is removed from the vault by an access opening [2302] which can be used for periodic inspection and maintenance. As another example, the access opening [2302] could be a manhole. As another example, the access opening [2302] could be an access door. In another embodiment, one or more foundation elements [1101] forming the perimeter of the vault could be one or more reinforced concrete grade beams or walls. It also incorporates a slidable soil retainer [2303], which is a soil retainer capable of retaining soil and sliding up or down along the face of a foundation element [1101] if a subgrade [102] experiences volumetric changes. As an example, the slidable soil retainer [2303] could be comprised of plastic. In another an example, the slidable soil retainer [2303] could have horizontally oriented flutes to span horizontally across an opening in the foundation element [1101]. In another example, the slidable soil retainer [2303] is comprised of concrete.

FIG. 23 shows an embodiment of the invention after the building is complete and the installation of the site has occurred up to the point in time that the inventive protective utility counterweight [2201] has been installed. In FIG. 23 an embodiment of the invention is shown wherein the inventive mountable pipe clamp [2101] has been installed on both sides of a foundation element [1101] so that a utility pipe [101] cantilevers into the vault. FIG. 23 shows an embodiment of the invention wherein a slidable soil retainer [2303], with a counterweight hole [2304] in it capable of accommodating the diameter of an inventive protective utility counterweight [2201], is initially bolted [2035] to a foundation element [1101] of the vault so that the slidable soil retainer [2303] can be temporarily fixed at a proper initial elevation to receive a flexible expansion joint that will transition the utility pipe [101] from the building to the site, with the slidable soil retainer [2303] being bolted [2305] to the foundation element [1101] before backfilling against the slidable soil retainer [23003]. FIG. 23 shows an embodiment of the invention after a slidable soil retainer [2303] is bolted [2305] to a foundation element [1101]. Subgrade [102] material is backfilled up to an elevation which is necessary for the inventive protective utility counterweight [2201] to be at a proper elevation to receive a flexible expansion joint and be located in a vertically slotted opening [2306] in a foundation element [1101] with sufficient clearance above and below the portion of the inventive protective utility counterweight [2201] that cantilevers through the vertically slotted opening [2306].

As an example, backfill material [2307], as part of a subgrade [102], against the slidable soil retainer [2303] could be expansive material that is capable of expanding when exposed to moisture so that it seals off gaps that may allow moisture to enter the vault and be capable of expanding with a subgrade [102] that is capable of experiencing volumetric changes. As another example, backfill material [2307] against the slidable soil retainer could be bentonite extending 6 inches past the edges of the slidable soil retainer [2303] and extending 8 inches away from the exterior face of a foundation element [1101]. Also, in an embodiment, an inventive protective utility counterweight could be suspended by chains from a forklift and lowered to the correct elevation, slid through the counterweight hole [2304] of the slidable soil retainer [2303], and then shims [2308] could be installed under the ends of one or more inventive protective utility counterweights [2201] so that a levelling bed [2309], as part of a subgrade [102], can be poured under the bottom of the inventive protective utility counterweight [2201]. In another example, levelling bed [2309] could be comprised of concrete, flowable concrete fill, or gravel.

Figure 24:
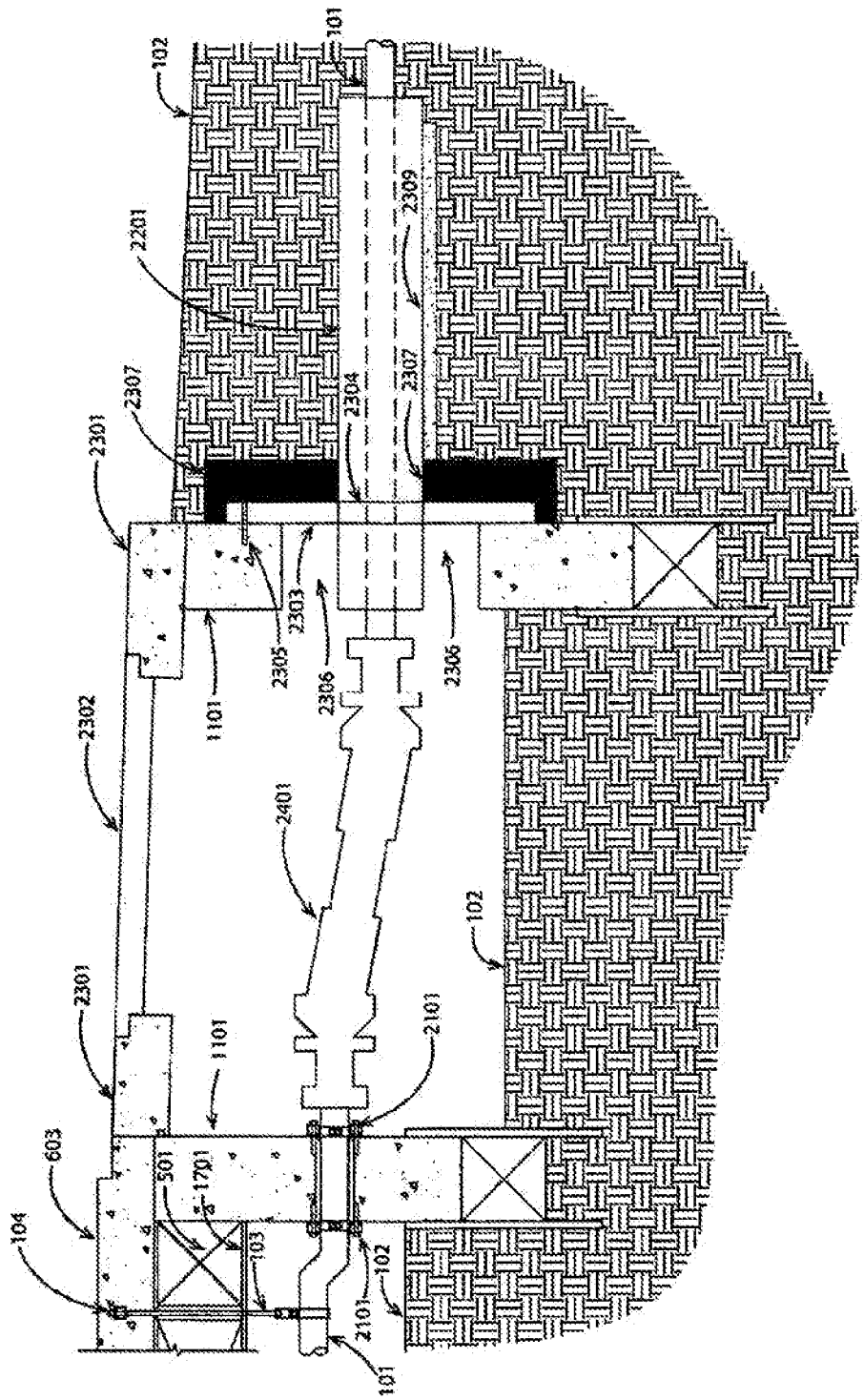
FIG. 24 shows a cross sectional view of an embodiment of the invention.

FIG. 24 shows a cross sectional view of an embodiment of the invention wherein a vault is capable of housing a transition of utility pipes [101] from a building where the utility pipe [101] is supported as shown on FIG. 18 to the utility pipe [101] being supported by an inventive protective utility counterweight [2201] that is supported by a subgrade [102] and can rise or fall if a subgrade experiences volumetric changes. As an example, in an embodiment a flexible expansion joint [2401] allows for rotation at each end of the flexible expansion joint [2401] as well as telescoping capability in and out axially along the longitudinal axis of the flexible expansion joint [2401] so that the horizontal distance between the ends of the initial installation of the flexible expansion joint [2401] could be constant while the vertical distance, the difference in elevation, between the ends of the initial installation of a flexible expansion joint [2401] could change by increasing and decreasing in dimension within the limits of functionality for the flexible expansion joint [2401] such as the maximum vertical offset from a horizontal position for a particular flexible expansion joint. In an embodiment, the flexible expansion joint [2401] could be installed with the vertical distance between the ends of the flexible expansion joint [2401] equal to the sum of the minimum required vertical fall to comply with applicable building code regulations and half of the maximum vertical offset from a horizontal position for a particular flexible expansion joint, allowing the site condition to rise half of the reserve vertical offset capacity and to fall half of the reserve vertical offset capacity. In an embodiment, the flexible expansion joint [2401] could be installed to maximize the reserve upward vertical offset capacity by installing the elevation of an inventive protective utility counterweight [2201] at the steepest possible slope that the flexible expansion joint can provide, giving sufficient clearance above the inventive protective utility counterweight [2201] in the vertical slotted opening [2306]. As an example, in an embodiment a flexible expansion joint [2401] could be installed to maximize the reserve downward vertical offset capacity by installing the elevation of an inventive protective utility counterweight at the most shallow slope allowed by applicable building code regulation, giving sufficient clearance under the inventive protective utility counterweight [2201] in the vertical slotted opening [2306].

In an embodiment, the vault is comprised of foundation elements [1101] and a reinforced concrete slab as the vault top [2301]. In another embodiment, the vault is comprised of reinforced concrete grade beams with a vault top [2301] that is poured over temporary formwork which is removed from the vault by an access opening [2302] which can be used for periodic inspection and maintenance. In another embodiment, the access opening [2302] could be a manhole. In another embodiment, the access opening [2302] could be an access door. In another embodiment, one or more foundation elements [1101] forming the perimeter of a vault could be one or more reinforced concrete grade beams or walls. Also, slidable soil retainer [2303] is a soil retainer capable of retaining soil and sliding up or down along the face of a foundation element [1101] if a subgrade [102] experiences volumetric changes.

Also, FIG. 24 shows an embodiment of the invention after the building is complete and a flexible expansion joint [2401] has been installed. FIG. 24 shows an embodiment of the invention wherein an inventive mountable pipe clamp [2101] has been installed on both sides of a foundation element [1101] so that a utility pipe [101] cantilevers into the vault. FIG. 24 also shows an embodiment of the invention wherein a slidable soil retainer [2303], with a counterweight hole [2304] in it is capable of accommodating the diameter of an inventive protective utility counterweight [2201], after initially installing the inventive protective utility counterweight [2201] but before installing any subgrade [102] material over the inventive protective utility counterweight, one or more temporary bolts [2035] that were used to hold a slidable soil retainer [2303] in position are exposed by pulling back the slidable soil retainer [2303] and then one or more temporary bolts [2035] are cut back to the face of a foundation element [1101] of the vault so that a slidable soil retainer [2303] can slide up or down without engaging any remaining portions of temporary bolts [2035] left in an foundation element [1101]. In an embodiment, a flexible expansion joint [2401] is connected to utility pipe at one end of the vault from the building and connected to utility pipe at the other end of the vault from the site. In an embodiment, a flexible expansion joint [2401] could transition one or moreutility pipes [101] from the building to the site, with one or more slidable soil retainers [2303]. As an example, shims [2308] installed to facilitate installation of the inventive protective utility counterweight are removed and subgrade (102) material is backfilled. FIG. 24 shows an embodiment of the invention wherein after any bolts [2305] connecting a slidable soil retainer [2303] to a foundation element [1101] are removed, subgrade [102] material is backfilled up to a final grade.

As an example, backfill material [2307], as part of a subgrade [102], against the slidable soil retainer [2303] could be expansive material that is capable of expanding when exposed to moisture so that it seals off gaps that may allow moisture to enter the vault and be capable of expanding with a subgrade [102] that is capable of experiencing volumetric changes. As another example, backfill material [2307] against the slidable soil retainer could be bentonite extending 6 inches past the edges of a slidable soil retainer [2303] and extending 8 inches away from the exterior face of a foundation element [1101].

Figure 25:
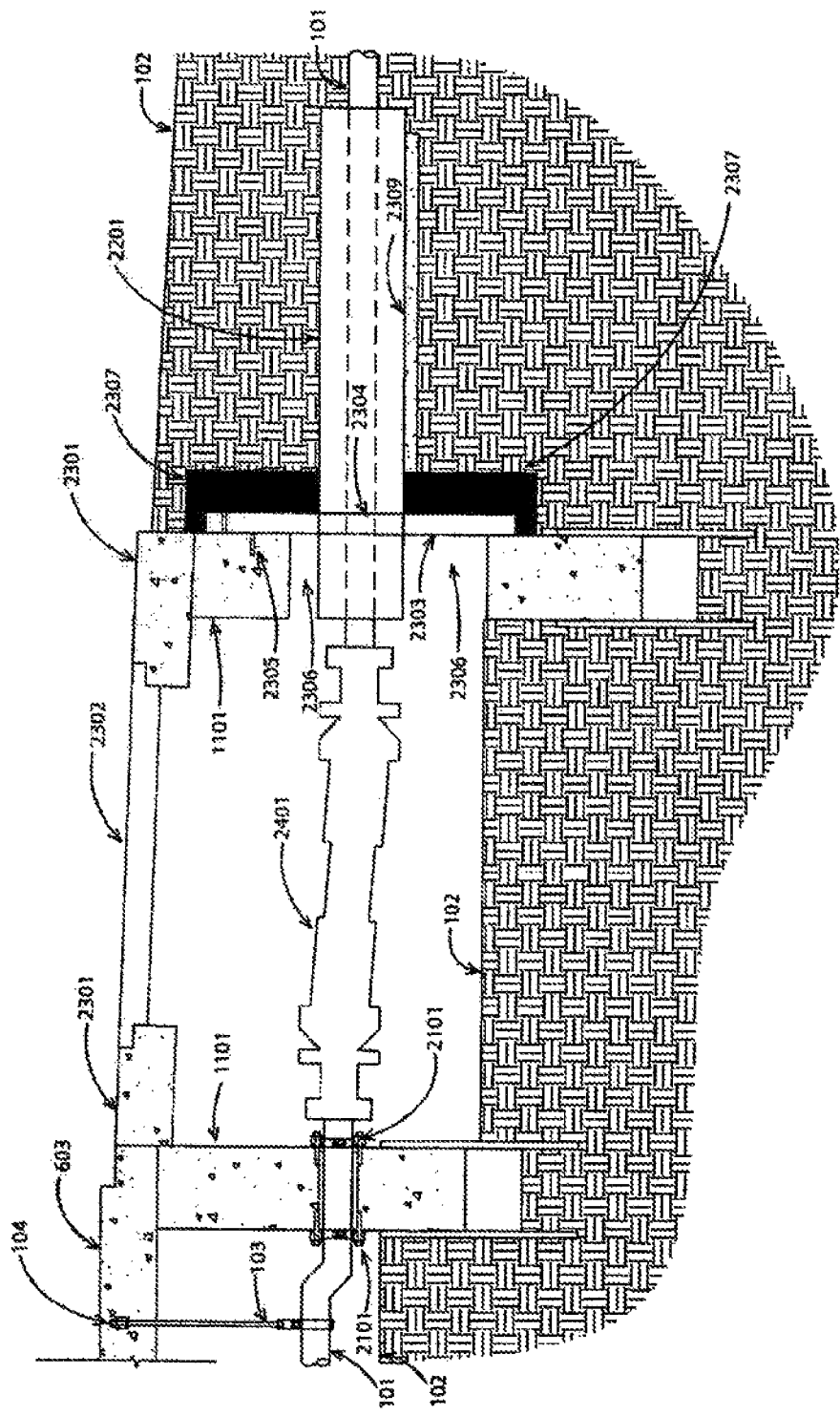
FIG. 25 shows a cross sectional view of an embodiment of the invention.

FIG. 25 shows a cross sectional view of an embodiment of the invention similar to FIG. 24, however FIG. 25 shows soil conditions after an increase in soil volume has occurred and the volumetric soil change does not cause any impairment of the function of the utility pipe [101]. As an example, FIG. 25 shows conditions in an embodiment if degradable voidforms [501] are used with degradable deck [1701] and soil expansion occurs over time after degradable voidforms [501] and degradable deck [1701] degrade and are no longer present.

Figure 26:
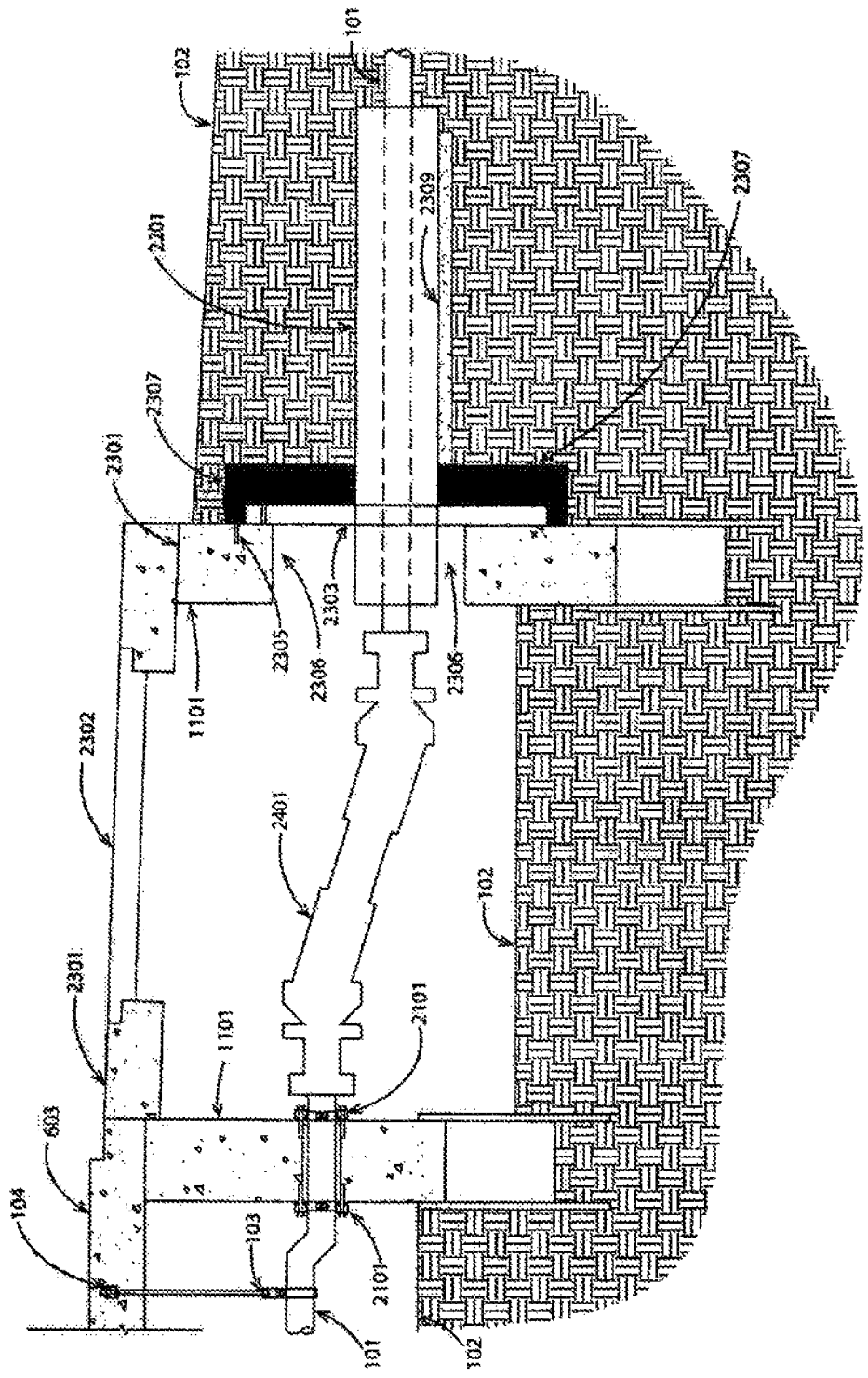
FIG. 26 shows a cross sectional view of an embodiment of the invention.

FIG. 26 shows a cross sectional view of an embodiment of the invention similar to FIG. 24, however FIG. 26 shows soil conditions after a decrease in soil volume has occurred and the volumetric soil change does not cause any impairment of the function of the utility pipe [101]. As an example, FIG. 26 shows conditions in an embodiment if degradable voidforms [501] are used with degradable deck [1701] and soil expansion occurs over time after degradable voidforms [501] and degradable deck [1701] degrade and are no longer present.

Figure 27:
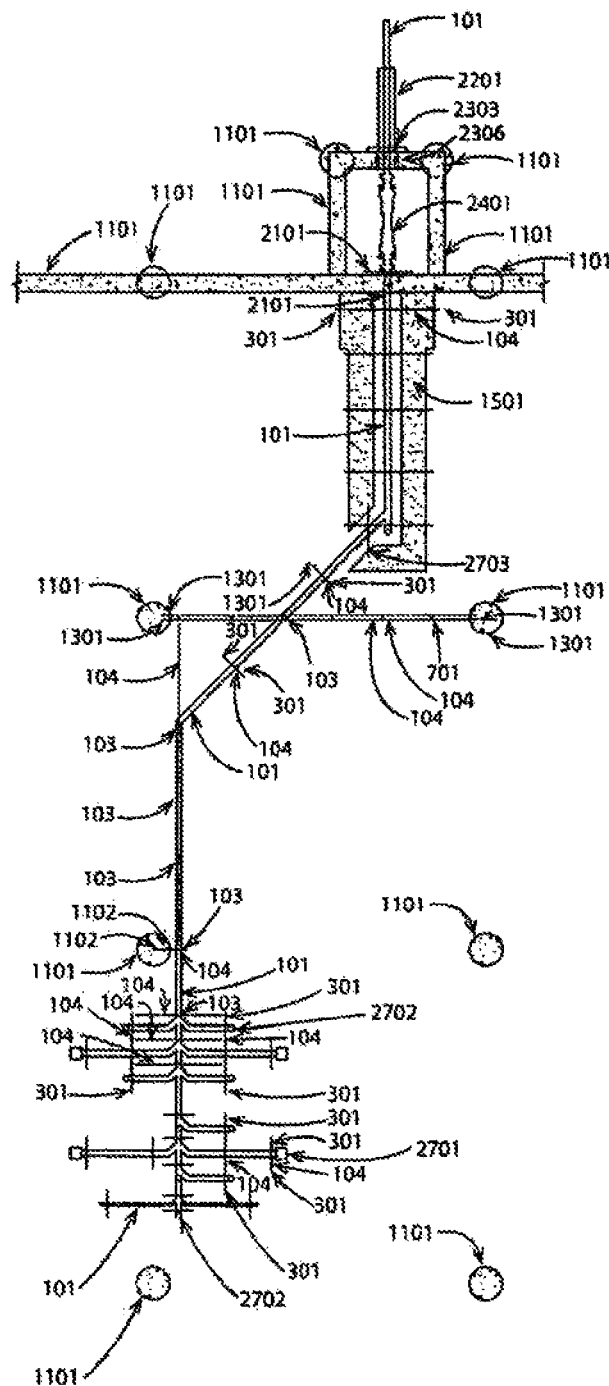
FIG. 27 shows a plan view of embodiments of the invention.

FIG. 27 shows a plan view of an embodiment of the invention wherein degradable voidforms [501] could be used.

Further, FIG. 27 shows a plan view of an embodiment of the invention wherein one or more utility pipes [101] are hanging from one or more hanger assemblies [103] and one or more hanger assemblies [103] are connected to and supported by one or more utility support members [104] of the inventive framing system, as also shown in FIGS. 1, 2, 4-6, 11, 12, 14, 16-20 and 23-26.

FIG. 27 further shows an embodiment wherein a utility pipes [101] form a system that could be used for a sanitary sewer plumbing system of a men's restroom with 2 water closets and 2 urinals, and a women's restroom with 4 water closets, and each restroom having sinks, floor drains and clean outs as could be required by a locally adopted building code or desired by an owner. As an example, utility pipes [101] could be arranged in a complex three-dimensional geometry. In another example, utility pipes [101] could create a partial slab penetration [2701] wherein one or more utility pipes [101] extend partially through a slab. As an example, in an embodiment the partial slab penetration [2701] could occur at a floor drain. As another example, a utility pipe [101] could create a full slab penetration [2702] wherein the utility pipe [101] extend completely through the slab. As another example, a full slab penetration [2072] could occur at a water closet. As another example, a full slab penetration [2072] could occur at a urinal. Also, in an embodiment, a full slab penetration [2072] could occur at a sink. As another example, in an embodiment, a full slab penetration [2072] could occur at a clean out. Also, a full slab penetration [2072] could occur at a vent pipe. For examples with utility types other than sanitary sewer plumbing, in an embodiment a full slab penetration [2072] could occur at a domestic water pipe. Also, as an example with utility types other than sanitary sewer plumbing, in an embodiment a full slab penetration [2072] could occur at an automatic fire sprinkler pipe. Also, as an example with utility types other than sanitary sewer plumbing, in an embodiment a full slab penetration [2072] could occur at a natural gas pipe. As another example with utility types other than sanitary sewer plumbing, in an embodiment a full slab penetration [2072] could occur at an electrical service pipe. Also, as an example with utility types other than sanitary sewer plumbing, a full slab penetration [2072] could occur at a telecommunications cable. As an additional example with utility types other than sanitary sewer pluming, a full slab penetration [2072] could occur at a duct for a heating, ventilation or air conditioning system. Also, as an example, in an embodiment one or more utility pipes [101] that extend partially or fully through the slab could be tied to one or more utility support members [104] placed nearby the partial slab penetration [2701] or full slab penetration [2702] so as to prevent a vertical utility pipe [101] from leaning over before the concrete for the slab [603] is poured.

As another example, hanger assemblies [103] could occur at every plan view intersection of a utility pipe [101] and a utility support member [104]. Also, in an embodiment, hanger assemblies [103] could occur periodically where utility pipes [101] are under and parallel with a utility support member [104], at a spacing that is less than or equal to the maximum permitted spacing of supports for a utility pipe [101]. As an additional example, hanger assemblies [103] could occur periodically where utility pipes [101] are under and parallel with a composite assembly created by one or more utility support members [104] with connectors [701], with the hanger assemblies occurring at a spacing that is less than or equal to the maximum permitted spacing of supports for a utility pipe [101] and the connectors [701] occurring periodically along the length of the composite assembly.

As another example, FIG. 27 shows 10 round foundation elements [1101] that could be 24 inch diameter drilled shaft reinforced concrete piers, with 8 of the piers on a consistent grid with each other, and these 8 piers geometrically creating three distinct, not overlapping, rectangular bays each representing an area of a building floor plan with a pier at every corner of each bay, with the three bays shown in FIG. 27 referred to herein as an exterior-most bay closest to the flexible expansion joint [2401] shown, an interior-most bay furthest from the flexible expansion joint [2401] shown and a center bay between the exterior-most bay and the interior-most bay.

The interior-most bay shown in FIG. 27 shows a plan view of an embodiment of the invention wherein one or more utility support members [104] as part of the inventive framing system are supported by one or more inventive temporary support apparatuses [301] as shown in FIG. 4-6, allowing a high degree of flexibility in placing one or more inventive temporary support apparatuses [301] so as to work around closely spaced utility pipes, especially where they could be relatively close in elevation to the bottom of the slab [603] of a slab-on-voidform foundation, as a higher elevation of utility pipes [104] generally makes installation of the invention more economical and practical.

The center bay of FIG. 27, which is referenced herein to include an area near the boundary of the center bay and the interior-most bay as well as an area near the boundary of the center bay and the exterior-most bay, shows a plan view of an embodiment of the invention wherein one or more utility support members [104] as part of the inventive framing system are supported by one or more other utility support members [104], wherein connectors [701] would be used as shown in FIGS. 7 and 10. In the embodiment the center bay of FIG. 27 shows a plan view of the invention wherein one or more utility support members [104] as part of the inventive framing system are supported by one or more foundation elements [1101], as shown in FIGS. 11, 13 and 14. Utility support members [104] could be supported in some locations by one or more inventive temporary support apparatuses [301] and in other locations by one or more other utility support members [104] and in other locations by foundation elements [1101]. Also, in an embodiment, embodiment shown in the center bay could be more economical than the approach shown in the interior-most bay because the approach shown in the center bay has significantly fewer inventive temporary support apparatuses [301], considering that while the inventive temporary support apparatuses [301] can reduce the length of utility support member [104] material required the inventive temporary support apparatuses [301] also create obstacles to placing voidforms [501] which makes the voidforms more expensive to coordinate before fabrication of the voidforms [501] or to customize the geometry of the voidforms [501] in the field, so it can therefore be more economical to minimize the use of inventive temporary support apparatuses [301] when there is a single utility pipe [101] in a relatively large area.

As an example, in an embodiment at the area near the boundary between the exterior-most bay and the center bay, FIG. 27 shows a plan view of an embodiment of the invention wherein one or more utility support members [104] are connected with one or more other parallel utility support members [104] to create a composite assembly that can structurally span between supports, as shown in FIGS. 8, 13 and 14, using connectors as shown in FIG. 8, so as to provide a greater strength and stiffness than would be provided with a single utility support member [104] while maintaining a relatively flat cross sectional geometry so that the assembly of utility support members [104] can be located between an upper layer and a lower layer of reinforcing bars [502] in a slab [603] of a slab-on-voidform system, which could assist in making the design of the slab [603] more economical as it could avoid a need to make the slab [603] thicker to accommodate a taller cross sectional geometry of an assembly of utility support members [104].

As an example, in an embodiment the exterior-most bay of FIG. 27 shows a plan view of an embodiment of the invention wherein relatively deeper elevations of one or more utility pipes [101] could be accommodated by installing one or more inventive mobile retaining walls [1501] to retain soil, as shown in FIGS. 15-20, where this approach could be more economical than excavating and maintaining a wide and deep trench in which the subgrade [102] is benched as shown in FIGS. 4-6 and 14.

In an embodiment, a decking support member [2703] could be used as part of the decking [1701]. As examples, the decking support member [2703] could be a light gage steel strut channel. Also as an example, in an embodiment the decking support member [2703] could be supported at each end by one or more inventive mobile retaining walls [1501] wherein a notched seat for a decking support member [2703] is created. As an additional example, in an embodiment the decking support member [2703] could be supported at each end by one or more inventive mobile retaining walls [1501] wherein a notched seat for a decking support member [2703] is created by grinding with a hand-held power grinder into an inventive mobile retaining wall [1501]. As an additional example, a decking support member [2703] could provide support to decking [1701] but not be mechanically joined to decking [1701]. As another example, in an embodiment a decking support member [2703] could be mechanically joined, such as with screws, to decking [1701] where decking [1701] is not mechanically joined to both an inventive mobile retaining wall [1501] and a foundation element [1101], as the inventive mobile retaining wall [1501] is designed to rise and fall with volumetric soil changes whereas a foundation element [1101] is designed to resist forces associated with volumetric soil changes.

As an example, FIG. 27 shows a plan view of an embodiment of the invention wherein a vault as shown in FIGS. 23-26 houses a transition supports of utility pipes [101] from a building to a site by virtue of a flexible expansion joint [2401] that is secured in place to prevent lateral movement in either plan view direction, prevent vertical movement, and prevent rotation about a transverse axis of a utility pipe [101] by a pair of mountable pipe clamps [2101] that are capable of resisting the lateral forces and movements induced by a flexible expansion joint [2401] during installation and during use of the invention after construction if soil changes in volume, as a flexible expansion joint [2401] has internal gaskets that create some friction as a flexible expansion joint telescopes in and out axially and rotates at each end. In an example, the transition of support conditions could occur under the slab [603] of a slab-on-voidform foundation. Furthermore, in an example, the transition of supports could occur outside of the plan view of a slab [603] of a slab-on-voidform foundation. As an example, the transition of support conditions could occur partially under the slab [603] of a slab-on-voidform foundation and partially outside of the plan view of a slab [603] of a slab-on-voidform foundation. As an additional example, FIG. 27 shows a plan view of an embodiment of the invention wherein a slidable soil retainer [2303] and an inventive protective utility counterweight [2201] provide sufficient support for the site condition end of a flexible expansion joint [2401], as shown in FIGS. 23-26.

Figure 28:
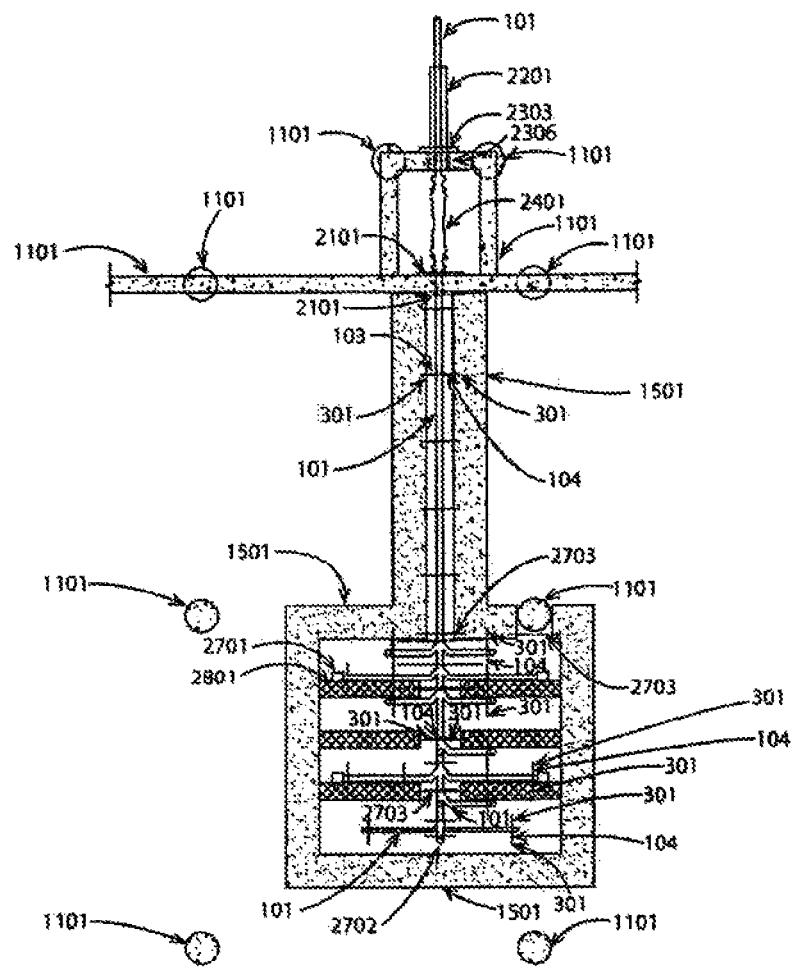
FIG. 28 shows a plan view of embodiments of the invention.

FIG. 28 shows a plan view of an embodiment of the invention similar to the exterior-most bay of FIG. 27 wherein voidforms [501] with non-degradable components could be used for an entire utility pipe [101] system as inventive mobile retaining walls [1501] are installed to retain the subgrade [102] and support decking [1701] as shown in FIGS. 17-20, which could require that the elevations of the utility pipes [101] be lower than possible at the interior-most bay of FIG. 27 where decking [1701] is not used, even where the utility pipe [101] is near a partial slab penetration [2701] or full slab penetration [2702] and otherwise the utility pipe [101] could be higher, allowing for more flexibility in scheduling construction to avoid delays caused by rain damaging degradable voidforms [501] or risks that damp degradable voidforms [501] could collapse when concrete for a slab [603] is poured in geographic areas or periods of time where rain occurs more frequently, even though the material cost of non-degradable voidforms [501] could be higher than the cost of degradable voidforms [501]. In an embodiment decking [1701] as shown in FIGS. 17 and 18 could be non-degradable material that provides a permanent support for voidforms [501] with non-degradable components above the decking [501], as degradable decking [1701] could deteriorate over time and allow any voidforms [501] with non-degradable components above the decking [501] to fall into the plumbing trench and possibly create a mechanism that could transfer forces to utility piping from volumetric soil change which could damage and/or impair the function of a utility pipe [101].

As an example, FIG. 28 shows a plan view of an embodiment of the invention wherein intermediate trench walls [2801] within the plumbing trench could provide intermediate support for decking [1701] so as to reduce the length of the span that the decking [1701] would need to accommodate otherwise. Additionally, as an example, intermediate trench walls [2801] could be one or more walls as tall as adjacent inventive mobile retaining walls [1501]. Also, in an embodiment, intermediate trench walls [2801] could be a framing system of beams and columns as tall as adjacent inventive mobile retaining walls [1501]. As an additional example, intermediate trench walls [2801] could be dry-stacked unreinforced and ungrouted concrete masonry units. As an example, in an embodiment intermediate trench walls [2801] could be dry-stacked unreinforced and ungrouted concrete masonry units with a nominal height to width ratio of 2 to 1. As an example, intermediate trench walls [2801] could be comprised of unreinforced ungrouted masonry. Also, in an embodiment, intermediate trench walls [2801] is comprised of unreinforced grouted masonry. Also, in an embodiment, intermediate trench walls [2801] material could be reinforced masonry. In an embodiment intermediate trench walls [2801] could be comprised of stainless steel. Also, as an example, in an embodiment intermediate trench walls [2801] could be a framing system of stainless steel strut channel beams and columns. In another embodiment intermediate trench walls [2801] could be comprised of galvanized steel. Also, as an example, in an embodiment intermediate trench walls [2801] could be a framing system of galvanized strut channel beams and columns. Also, as an example, intermediate trench walls [2801] could be comprised of plastic. As an additional example, in an embodiment intermediate trench walls [2801] is comprised of degradable material such as wood if degradable voidforms [501] and degradable decking [1701] are used above the degradable intermediate trench walls [2801]. As an additional example, in an embodiment intermediate trench walls [2801] could be supported by a foundation that supports the intermediate trench walls [2801]. As an additional example, in an embodiment vertical elements such as columns that are part of one or more intermediate trench walls [2801] could be supported by a foundation that supports the intermediate trench walls [2801]. As an additional example, in an embodiment one or more intermediate trench walls [2801] could be modified geometrically to not interfere with one or more inventive temporary support apparatuses [301] that could be located in plan view such that they would otherwise interfere.

Figure 29:
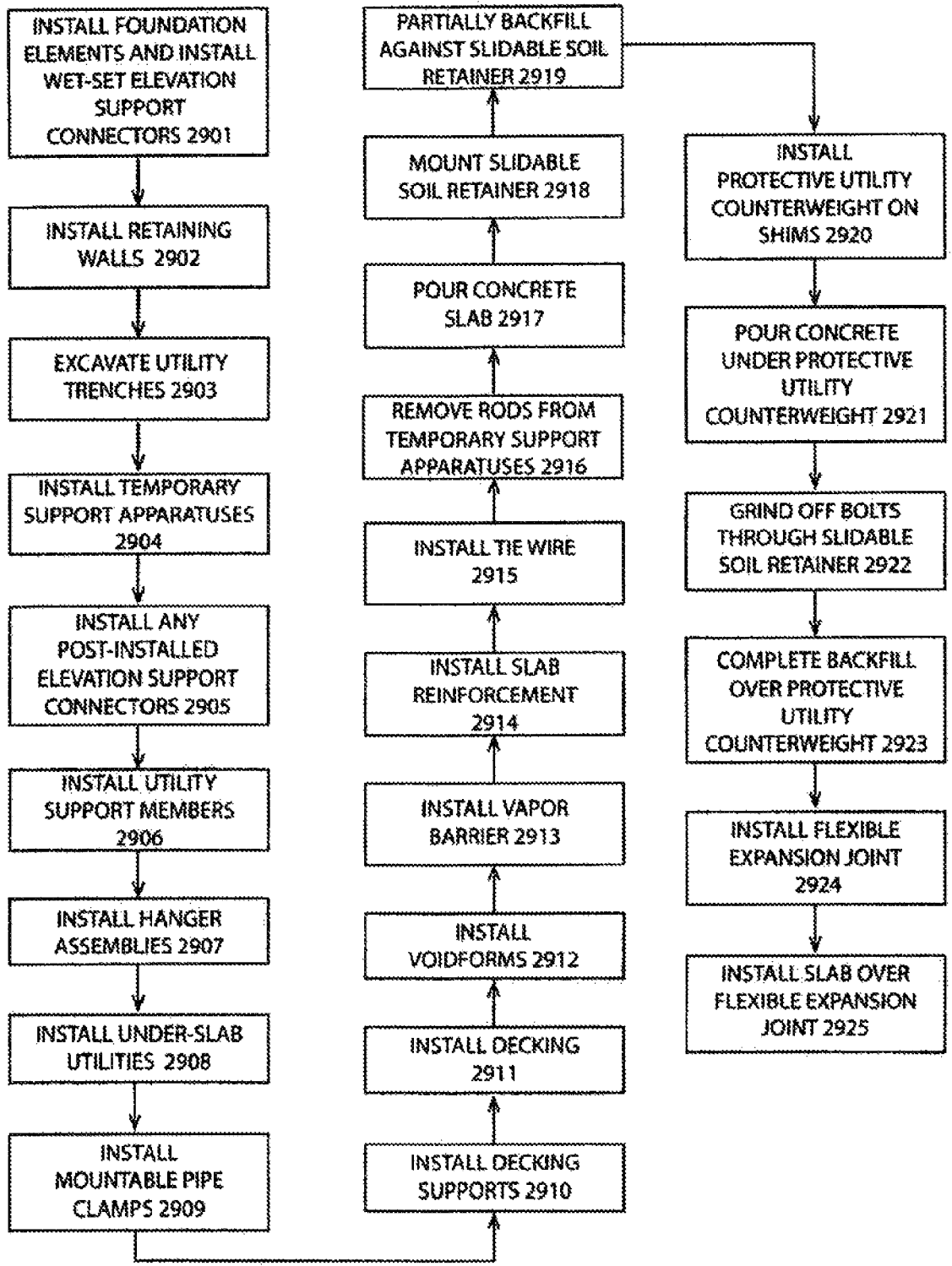
FIG. 29 describes methods of the invention.

FIG. 29 describes methods of the invention. At Step 2901 piers, pier caps and grade beams are installed and wet-set elevation support connectors are wet-set in concrete where desired. In Step 2902 utility retaining walls are installed where it will be desired to retain soil with a retaining structure adjacent to on each side of the proposed utility as required, such as allowing a proposed clear dimension from soil under and adjacent to the utility and hanger assemblies equal to or greater than the potential vertical movement. In Step 2903, utility trenches are excavated, allowing a proposed clear dimension from soil under and adjacent to the utility and hanger assemblies equal to or greater than the potential vertical movement, benching along the length of the utility trenches as required where soil is not retained by retaining structures, extending. In Step 2904, temporary support apparatuses are installed. In Step 2905, post-installed elevation support connectors are installed. In Step 2906, utility support members are installed as part of the utility support framing system that is capable of supporting hanger apparatuses where necessary to support an under-slab utility. In Step 2907, hanger assemblies are installed so that they are supported by the utility framing system. In Step 2908, under-slab utilities are installed so that the utilities are supported by the hanger assemblies. In Step 2909, where under-slab utilities penetrate gradebeams at the perimeter of slab-on-voidform slab areas, install a mountable pipe clamp on each side of the gradebeam so as to connect the utility at the penetration to the gradebeam and provide sufficient anchorage so that the utility can cantilever past the gradebeam. In Step 2910, any additional decking supports required are installed where required to support proposed decking, including any intermediate support walls, any intermediate support beams and any ledgers attached to foundation elements. In Step 2911, decking is installed over retaining walls and other decking supports such as intermediate support walls, intermediate support beams and ledgers attached to foundation elements. In Step 2912, voidforms are installed. In Step 2913, vapor barriers and components of vapor barrier systems are installed, including components around penetrations by hanger assemblies through the vapor barrier. In Step 2914, slab reinforcement is installed over reinforcement supports that bear on the vapor barrier. In Step 2915, tie wire is installed to connect utility support members to stabilize them so that they will not move substantially after removal of the rods from temporary support apparatuses or during a concrete pour. In Step 2916, rods from temporary support apparatuses are removed. In Step 2917, the concrete of the slab is poured. In Step 2918, an excavation is made to access the vertically slotted opening in a foundation element which will receive a protective utility counterweight and the slidable soil retainer which retains soil from entering the vertically slotted opening is bolted to the foundation elements at the top of the slidable soil retainers. In Step 2919, backfill with subgrade material, including bentonite against the slidable soil retainer is installed to raise the subgrade elevation to the bottom of the hole in the slidable soil retainer. In Step 2920, the protective utility counterweight is installed in the correct position and placed on shims at each end of the protective utility counterweight. In Step 2921, concrete is poured under the protective utility counterweight in between the slidable soil retainer and the shims furthest from the foundation element with the vertically slotted opening and the shims are removed from under the protective utility counterweight. In Step 2922, the bolts connecting the slidable soil retainer to a foundation element are ground back so as to allow the slidable soil retainer to slide in the future if expansive soil causes the elevation of the slidable soil retainers to rise or fall. In Step 2923 subgrade material is backfilled to raise the subgrade elevation over the protective utility counterweight to the final grade elevations, including bentonite immediately against the slidable soil retainer. In Step 2924, the flexible expansion joint is installed. In Step 2925, the slab over the flexible expansion joint is formed with temporary shoring that is removed after the slab is poured, and the slab includes a means of access such as a manhole cover or door.

Figure 30:
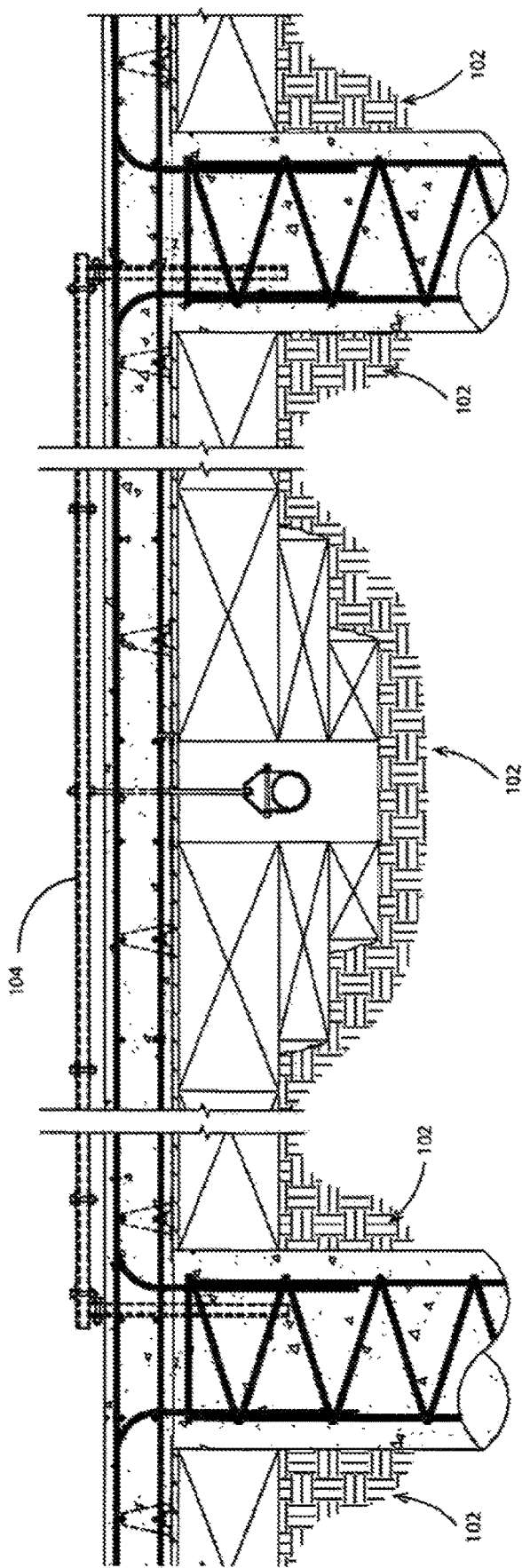
FIG. 30 shows an embodiment of the invention wherein the utility support member is above the slab.
Figure 31:
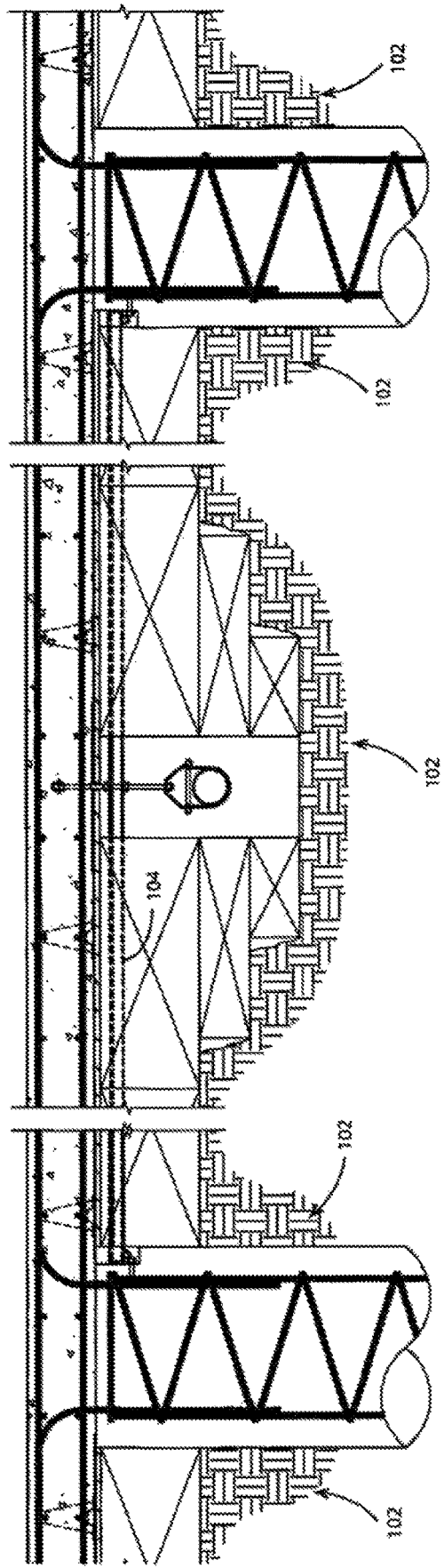
FIG. 31 shows an embodiment of the invention wherein the utility support member is below the slab.

FIG. 30 shows an embodiment of the invention wherein the utility support member is above the slab. FIG. 31 shows an embodiment of the invention wherein the utility support member is below the slab.

Numerous embodiments are described in this disclosure and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The invention claimed is:

1. A method of isolating under-slab utilities from a subgrade under a slab of a slab-on-voidform foundation comprising:
   a. attaching a framing system to one or more foundation elements of said slab-on-voidform foundation wherein said framing system is configured to not be in contact with the subgrade;
   b. using a hanger assembly to suspend a segment of said under-slab utilities prior to pouring concrete of the slab of the slab-on-voidform foundation wherein said hanger assembly is configured to be supported by said framing system and said hanger assembly is also configured to not be in contact with said subgrade;
   c. wherein the framing system is comprised of one or more utility support members connected to and supported by one or more elevation support connectors that are connected to and/or supported by one or more foundation elements; and
   d. wherein said slab is poured over degradable voidforms.

2. The method of claim 1 wherein the under-slab utilities are not in contact with said subgrade.

3. The method of claim 1 wherein at least one of the one or more utility support members is connected to and supported by one or more additional utility support members.

4. The method of claim 1 wherein the one or more of the utility support members structurally span between two or more foundation elements without any need for intermediate support.

5. The method of claim 1 wherein two or more of the utility support members are connected to form one or more composite utility support members.

6. The method of claim 1 wherein two or more of the utility support members are connected to form a composite utility support member wherein the two or more of the utility support members are connected side by side such that at any given transverse cross section the top of the composite utility support member is at the same elevation as the top of each component utility support member.

7. The method of claim 1 wherein one or more of the one or more utility support members is connected to slab reinforcement by a tie wire.

8. The method of claim 1 wherein said framing system is configured so that said one or more utility support members are partially embedded in said slab.

9. The method of claim 1 wherein said framing system is configured so that said one or more utility support members are completely embedded in said slab.

10. The method of claim 1 wherein said framing system is configured to be completely encased in concrete.

11. The method of claim 1 wherein said framing system is configured so that said one or more utility support members are above said slab.

12. The method of claim 1 wherein said framing system is configured so that said one or more utility support members are below said slab.

13. The method of claim 1 wherein said framing system is configured so that said one or more utility support members are below said slab and said hanger assembly extends vertically into said slab.

14. The method of claim 1 wherein said framing system is configured so that said one or more utility support members are below slab reinforcement.

15. The method of claim 1 wherein said framing system is configured so that said one or more utility support members are above slab reinforcement.

16. The method of claim 1 wherein said framing system is configured so that said one or more utility support members are between upper and lower mats of slab reinforcement.

17. The method of claim 1 wherein said under-slab utility is plumbing and said framing system is configured so that all of said one or more utility support members, without any intermediate support, are between upper and lower mats of slab reinforcement after said hanger assembly and said plumbing is installed but before any plumbing is filled with water.

18. The method of claim 1 wherein two or more of the utility support members are connected with one or more connectors to form one or more composite utility support members wherein said hanger assembly is supported by one of said one or more connectors.

19. The method of claim 1 wherein the smallest distance between the subgrade and the hanger assembly is greater than or equal to the potential vertical movement of the subgrade.

20. A framing system for suspending under-slab utilities under a slab of slab-on-voidform foundation comprising:
   a. one or more elevation support connectors configured to be wet-set into or post-installed onto one or more foundation elements of said slab-on-voidform foundation, wherein a slab of the slab-on-voidform foundation is to be poured over degradable voidforms;
   b. said elevation support connectors each comprising a strut channel having a length of 2-24 inches;
   c. one or more utility support members each comprising a strut channel having a length of 12-30 feet;
   d. each of said elevation support connectors connected to one or more utility support members; and
   e. said one or more utility support members configured to attach to a hanger assembly.

21. The system of claim 20 wherein the elevation support connectors and the utility support connectors have regularly spaced slotted holes in the web of the strut channel.

22. The system of claim 20 wherein one or more connections between one or more elevation support connectors and one or more utility support members comprises an angle that is bolted to an elevation support connector and bolted to a utility support member.

23. The system of claim 20 wherein one or more connections between one or more elevation support connectors and one or more utility support members comprises an angle that is welded to an elevation support connector and welded to a utility support member.

24. The system of claim 20 wherein one or more elevation support connectors is welded to one or more utility support members.

25. The system of claim 20 wherein an end of one or more utility support members is connected to an end of another utility support member by a bolted splice connector.

26. The system of claim 20 wherein two or more parallel utility support members are aligned with the tops of the utility support members being at the same elevation and the utility support members being connected to each other so as to create a composite utility support member.

27. The system of claim 20 wherein at least one of the one more utility support members is oriented with the web at the bottom.

28. The system of claim 20 further comprising one or more tie wires configured to connect at least one of the one or more utility support members to slab reinforcement.

29. A method of isolating under-slab utilities and under-slab portions of hanger assemblies from a subgrade under a slab of a slab-on-voidform foundation, wherein said utilities are installed before said slab is poured, comprising the following steps:
- a. first:
  - i. securing in a subgrade one or more temporary support apparatuses configured to support one or more utility support members;
  - ii. using one or more hanger assemblies to suspend one or more segments of utilities;
    - wherein said one or more hanger assemblies are supported by at least one of said one or more utility support members; and
    - wherein said one or more hanger assemblies and said one or more segments of utilities are not in contact with said subgrade;
  - iii. installing voidforms over said subgrade wherein said voidforms are configured to not be supported by said segment of said utilities; and
  - iv. installing one or more reinforcing bars supported by said voidforms;
- b. second, transferring support of said one or more utility support members from said one or more temporary support apparatuses to said one or more reinforcing bars by attaching said one or more utility support members to one or more of said one or more reinforcing bars; and
- c. third, pouring the slab of the slab-on-voidform foundation over said one or more segments of utilities.

30. A method of isolating under-slab utilities and under-slab portions of hanger assemblies from a subgrade under a slab of a slab-on-voidform foundation, wherein said utilities are installed before said slab is poured, comprising the following steps:
- a. first:
  - i. installing a framing system that is configured to be supported by one or more foundation elements
    - wherein said framing system is comprised of one or more utility support members; and
    - wherein said framing system is not supported in the space between any foundation elements other than where supported by said one or more foundation elements;
  - ii. installing one or more hanger assemblies that are configured to be supported by said one or more utility support members wherein said one or more hanger assemblies are not supported below said one or more utility support members;
  - iii. installing one or more segments of utilities that are configured to be supported by said one or more hanger assemblies;
- b. second, installing degradable voidforms over said subgrade wherein said degradable voidforms are configured to not be supported by said one or more segments of utilities;
- c. third, pouring said slab of the slab-on-voidform foundation wherein said slab is configured so that said hanger assemblies are not supported below said one or more utility support members.

* * * * *